(12) United States Patent
Orlowski

(10) Patent No.: US 11,671,638 B2
(45) Date of Patent: Jun. 6, 2023

(54) MEASURING VIDEO VIEWING

(71) Applicant: Comcast Cable Communications, LLC, Philadelphia, PA (US)

(72) Inventor: Robert Alan Orlowski, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/532,563

(22) Filed: Nov. 22, 2021

(65) Prior Publication Data
US 2022/0103881 A1 Mar. 31, 2022

Related U.S. Application Data

(63) Continuation of application No. 17/159,974, filed on Jan. 27, 2021, now Pat. No. 11,218,755, which is a
(Continued)

(51) Int. Cl.
*H04N 21/25* (2011.01)
*H04N 21/2543* (2011.01)
(Continued)

(52) U.S. Cl.
CPC ............ *H04N 21/25* (2013.01); *H04H 60/31* (2013.01); *H04H 60/33* (2013.01); *H04H 60/64* (2013.01);
(Continued)

(58) Field of Classification Search
None
See application file for complete search history.

(56) References Cited

U.S. PATENT DOCUMENTS 5,374,951 A 12/1994 Welsh
5,589,892 A 12/1996 Knee et al.
(Continued)

FOREIGN PATENT DOCUMENTS

CN 102236867 A 11/2011
EP 1995878 A2 11/2008
(Continued)

OTHER PUBLICATIONS

Cisco Systems, Inc., "Channel Viewership Analyzer", 2009, Web page: http://www.cisco.com/en/US/prod/collateral/video/ps9119/ps9883/7016867.pdf, pp. 1-2.
(Continued)

*Primary Examiner* — Fernando Alcon
(74) *Attorney, Agent, or Firm* — Banner & Witcoff, Ltd.

(57) ABSTRACT

A computer-implemented method of using video program viewer interaction data that has been loaded to a media measurement database as input to a measurement engine which then calculates Linear, DVR, and VOD asset viewing activity at three levels: (a) Video Program, (b) Video Program Airing, (c) Video Program Airing Segment, where each level provides summary metrics for groupings of Demographic, Geographic, and/or Device Characteristic, and also second-by-second viewing metrics, including counting advertising impressions, within the Demographic, Geographic, Device groupings. System also accounts for reduced value of ad viewing when viewer is using trick plays or when viewer delays viewing recorded content. Together these metrics provide detailed information on customer viewing behavior which can be used to drive business decisions for service providers, advertisers and content producers. Additionally, a viewing histogram analysis is produced.

52 Claims, 83 Drawing Sheets

Related U.S. Application Data continuation of application No. 13/567,073, filed on Aug. 5, 2012, now Pat. No. 10,945,011, which is a continuation-in-part of application No. 12/981,301, filed on Dec. 29, 2010, now Pat. No. 8,365,212.

(51) Int. Cl.
   *H04H 60/33* (2008.01)
   *H04H 60/66* (2008.01)
   *H04N 21/658* (2011.01)
   *H04N 21/258* (2011.01)
   *H04N 21/845* (2011.01)
   *H04H 60/31* (2008.01)
   *H04H 60/64* (2008.01)
   *H04N 21/442* (2011.01)

(52) U.S. Cl.
   CPC .......... *H04H 60/66* (2013.01); *H04N 21/252* (2013.01); *H04N 21/2543* (2013.01); *H04N 21/25891* (2013.01); *H04N 21/44222* (2013.01); *H04N 21/44226* (2020.08); *H04N 21/6582* (2013.01); *H04N 21/8456* (2013.01)

(56) References Cited

U.S. PATENT DOCUMENTS

| | | |
|---|---|---|
| 5,790,935 A | 8/1998 | Payton |
| 5,872,588 A | 2/1999 | Aras et al. |
| 6,286,005 B1 | 9/2001 | Cannon |
| 6,449,350 B1 | 9/2002 | Cox |
| 6,820,277 B1 | 11/2004 | Eldering et al. |
| 7,383,243 B2 | 6/2008 | Conkwright et al. |
| 7,490,045 B1 | 2/2009 | Flores et al. |
| 7,509,663 B2 | 3/2009 | Maynard et al. |
| 7,590,993 B1 | 9/2009 | Hendricks et al. |
| 7,614,064 B2 | 11/2009 | Zigmond |
| 7,729,940 B2 | 6/2010 | Harvey et al. |
| 7,930,391 B1 | 4/2011 | Holt |
| 8,001,561 B2 | 8/2011 | Gibbs et al. |
| 8,079,054 B1 | 12/2011 | Dhawan et al. |
| 8,108,886 B1 | 1/2012 | Murahashi et al. |
| 8,214,867 B2 | 7/2012 | Hudspeth |
| 8,280,996 B2 | 10/2012 | Lu et al. |
| 8,351,645 B2 | 1/2013 | Srinivasan |
| 8,352,984 B2 | 1/2013 | Gogoi et al. |
| 8,365,212 B1 | 1/2013 | Orlowski |
| 8,365,213 B1 | 1/2013 | Orlowski |
| 8,453,173 B1 | 5/2013 | Anderson et al. |
| 8,548,991 B1 | 10/2013 | Zamir et al. |
| 8,694,396 B1 | 4/2014 | Craner et al. |
| 8,739,197 B1 | 5/2014 | Pecjak et al. |
| 8,745,647 B1 | 6/2014 | Shin et al. |
| 8,924,993 B1 | 12/2014 | Niebles Duque et al. |
| 8,949,873 B1 | 2/2015 | Bayer et al. |
| 8,959,540 B1 | 2/2015 | Gargi et al. |
| 9,277,275 B1 | 3/2016 | Arini |
| 9,363,464 B2 | 6/2016 | Alexander |
| 9,420,320 B2 | 8/2016 | Doe |
| 9,794,360 B1* | 10/2017 | Farhangi ............... H04L 65/401 |
| 9,854,292 B1* | 12/2017 | Matthews ........... G06F 16/2455 |
| 9,883,233 B1* | 1/2018 | Barton .................. H04H 60/61 |
| 10,070,177 B1* | 9/2018 | Gupta .................. H04N 21/812 |
| 10,089,592 B2 | 10/2018 | Orlowski |
| 10,440,428 B2 | 10/2019 | Orlowski |
| 10,645,433 B1 | 5/2020 | Orlowski |
| 10,945,011 B2 | 3/2021 | Orlowski |
| 11,012,726 B2 | 5/2021 | Orlowski |
| 11,212,565 B2 | 12/2021 | Orlowski |
| 11,218,755 B2 | 1/2022 | Orlowski |
| 11,240,539 B1* | 2/2022 | Joshi .................. H04N 21/812 |
| 2002/0055854 A1 | 5/2002 | Kurauchi et al. |
| 2002/0056087 A1 | 5/2002 | Berezowski et al. |
| 2002/0059576 A1 | 5/2002 | Feininger et al. |
| 2002/0062393 A1 | 5/2002 | Borger et al. |
| 2002/0083451 A1 | 6/2002 | Gill et al. |
| 2002/0104083 A1 | 8/2002 | Hendricks et al. |
| 2002/0129368 A1 | 9/2002 | Schlack et al. |
| 2002/0144262 A1 | 10/2002 | Plotnick et al. |
| 2002/0194196 A1 | 12/2002 | Weinberg et al. |
| 2003/0020744 A1 | 1/2003 | Ellis et al. |
| 2003/0046696 A1 | 3/2003 | Mizuno et al. |
| 2003/0088715 A1 | 5/2003 | Chaudhuri et al. |
| 2003/0115585 A1 | 6/2003 | Barsness et al. |
| 2003/0145323 A1 | 7/2003 | Hendricks et al. |
| 2003/0149988 A1 | 8/2003 | Ellis et al. |
| 2003/0172374 A1 | 9/2003 | Vinson et al. |
| 2003/0174160 A1 | 9/2003 | Deutscher et al. |
| 2003/0237095 A1 | 12/2003 | Srinivas |
| 2004/0019899 A1 | 1/2004 | Pelletier |
| 2004/0215698 A1 | 10/2004 | Bertin |
| 2004/0268226 A1 | 12/2004 | McMullin |
| 2005/0060745 A1 | 3/2005 | Riedl et al. |
| 2005/0086110 A1 | 4/2005 | Haley et al. |
| 2005/0149964 A1 | 7/2005 | Thomas et al. |
| 2005/0204387 A1 | 9/2005 | Knudson et al. |
| 2005/0229199 A1 | 10/2005 | Yabe |
| 2005/0235307 A1 | 10/2005 | Relan et al. |
| 2005/0286860 A1 | 12/2005 | Conklin |
| 2006/0015891 A1 | 1/2006 | Lazzaro et al. |
| 2006/0075420 A1 | 4/2006 | Ludvig et al. |
| 2006/0075421 A1 | 4/2006 | Roberts et al. |
| 2006/0168609 A1 | 7/2006 | Chen |
| 2006/0184961 A1 | 8/2006 | Lee et al. |
| 2006/0223495 A1 | 10/2006 | Cassett et al. |
| 2007/0067794 A1 | 3/2007 | Russell et al. |
| 2007/0074258 A1 | 3/2007 | Wood et al. |
| 2007/0092204 A1 | 4/2007 | Wagner et al. |
| 2007/0124756 A1 | 5/2007 | Covell et al. |
| 2007/0136753 A1 | 6/2007 | Bovenschulte et al. |
| 2007/0157249 A1 | 7/2007 | Cordray et al. |
| 2007/0157260 A1 | 7/2007 | Walker |
| 2007/0186228 A1 | 8/2007 | Ramaswamy et al. |
| 2007/0214483 A1 | 9/2007 | Bou-Abboud |
| 2007/0271300 A1 | 11/2007 | Ramaswamy |
| 2007/0283409 A1 | 12/2007 | Golden |
| 2007/0288950 A1 | 12/2007 | Downey et al. |
| 2008/0077951 A1 | 3/2008 | Maggio et al. |
| 2008/0127252 A1 | 5/2008 | Eldering et al. |
| 2008/0300965 A1 | 12/2008 | Doe |
| 2009/0007171 A1 | 1/2009 | Casey et al. |
| 2009/0052864 A1 | 2/2009 | Ohde |
| 2009/0070798 A1 | 3/2009 | Lee et al. |
| 2009/0077577 A1 | 3/2009 | Allegrezza et al. |
| 2009/0077579 A1 | 3/2009 | Li et al. |
| 2009/0094630 A1 | 4/2009 | Brown |
| 2009/0100456 A1 | 4/2009 | Hughes |
| 2009/0133047 A1 | 5/2009 | Lee et al. |
| 2009/0150224 A1 | 6/2009 | Lu et al. |
| 2009/0150814 A1 | 6/2009 | Eyer et al. |
| 2009/0172725 A1 | 7/2009 | Heilbron et al. |
| 2009/0183210 A1 | 7/2009 | Andrade |
| 2009/0193460 A1 | 7/2009 | Barnett |
| 2009/0268905 A1 | 10/2009 | Matsushima et al. |
| 2009/0313232 A1 | 12/2009 | Tinsley et al. |
| 2009/0327208 A1 | 12/2009 | Bittner et al. |
| 2010/0043021 A1 | 2/2010 | Torsiello et al. |
| 2010/0088716 A1 | 4/2010 | Ellanti et al. |
| 2010/0145791 A1 | 6/2010 | Canning et al. |
| 2010/0161492 A1 | 6/2010 | Harvey et al. |
| 2010/0211439 A1 | 8/2010 | Marci et al. |
| 2010/0235852 A1 | 9/2010 | Mears |
| 2010/0262986 A1 | 10/2010 | Adimatyam et al. |
| 2010/0330954 A1 | 12/2010 | Manning Cassett et al. |
| 2011/0069940 A1 | 3/2011 | Shimy et al. |
| 2011/0072448 A1 | 3/2011 | Stiers et al. |
| 2011/0110515 A1 | 5/2011 | Tidwell et al. |
| 2011/0126241 A1 | 5/2011 | Beattie, Jr. et al. |
| 2011/0145847 A1 | 6/2011 | Barve et al. |
| 2011/0289524 A1 | 11/2011 | Toner et al. |
| 2011/0307913 A1 | 12/2011 | Wang et al. |
| 2011/0321077 A1 | 12/2011 | Wang et al. |
| 2012/0005527 A1 | 1/2012 | Engel et al. |
| 2012/0079518 A1 | 3/2012 | Wan et al. |

(56) References Cited

U.S. PATENT DOCUMENTS

| | | | |
|---|---|---|---|
| 2012/0151511 A1 | 6/2012 | Bernard et al. | |
| 2012/0191815 A1 | 7/2012 | Tabbal et al. | |
| 2012/0222058 A1 | 8/2012 | el Kaliouby et al. | |
| 2012/0240143 A1 | 9/2012 | Mathews | |
| 2012/0254911 A1 | 10/2012 | Doe | |
| 2012/0260278 A1 | 10/2012 | Lambert et al. | |
| 2012/0278161 A1 | 11/2012 | Lazzaro | |
| 2012/0278179 A1 | 11/2012 | Campbell et al. | |
| 2012/0278828 A1 | 11/2012 | Yazdani et al. | |
| 2012/0296909 A1 | 11/2012 | Cao et al. | |
| 2012/0304210 A1 | 11/2012 | Zaslavsky et al. | |
| 2012/0304211 A1 | 11/2012 | Berezowski et al. | |
| 2013/0007789 A1 | 1/2013 | Wang et al. | |
| 2013/0024901 A1 | 1/2013 | Sharif-Ahmadi et al. | |
| 2013/0124309 A1 | 5/2013 | Traasdahl et al. | |
| 2013/0145385 A1 | 6/2013 | Aghajanyan et al. | |
| 2013/0173765 A1 | 7/2013 | Korbecki | |
| 2013/0198125 A1 | 8/2013 | Oliver et al. | |
| 2013/0247081 A1* | 9/2013 | Vinson | H04N 21/254 725/14 |
| 2013/0283304 A1 | 10/2013 | Wan et al. | |
| 2013/0346154 A1* | 12/2013 | Holz | G06Q 30/0201 705/7.33 |
| 2014/0075465 A1 | 3/2014 | Petrovic et al. | |
| 2014/0109124 A1 | 4/2014 | Morales et al. | |
| 2014/0150005 A1 | 5/2014 | Kalmes et al. | |
| 2014/0181019 A1 | 6/2014 | Bajaria et al. | |
| 2014/0359649 A1 | 12/2014 | Cronk et al. | |
| 2015/0113153 A1 | 4/2015 | Lin | |
| 2015/0128162 A1 | 5/2015 | Ionescu | |
| 2016/0261655 A1* | 9/2016 | Aggarwal | H04L 65/4053 |
| 2017/0289226 A1* | 10/2017 | Deshpande | H04N 21/25866 |
| 2018/0007431 A1* | 1/2018 | Sidhu | H04N 21/44226 |
| 2019/0378164 A1* | 12/2019 | Eich | H04N 21/4784 |
| 2019/0379938 A1* | 12/2019 | Salo | H04N 21/252 |
| 2020/0296456 A1* | 9/2020 | Yungster | H04H 60/31 |
| 2021/0058670 A1* | 2/2021 | Benamrouche | H04N 21/4334 |
| 2021/0158391 A1 | 5/2021 | Sheppard et al. | |
| 2021/0240681 A1 | 8/2021 | Algranati et al. | |
| 2022/0084052 A1 | 3/2022 | Sheppard et al. | |
| 2022/0150581 A1* | 5/2022 | Sidhu | H04L 63/1483 |
| 2022/0159326 A1 | 5/2022 | Sheppard et al. | |
| 2022/0182722 A1* | 6/2022 | Bolivar | H04N 21/23418 |
| 2022/0256219 A1 | 8/2022 | Saafi | |
| 2022/0286722 A1* | 9/2022 | Milavsky | H04N 21/242 |
| 2022/0303618 A1 | 9/2022 | Whitely et al. | |
| 2022/0383350 A1* | 12/2022 | Keshavan | H04N 21/6582 |

FOREIGN PATENT DOCUMENTS

| | | |
|---|---|---|
| WO | 98/31114 A1 | 7/1998 |
| WO | 2012162693 A1 | 11/2012 |
| WO | 2013033123 A2 | 3/2013 |

OTHER PUBLICATIONS

INEOQUEST Technologies, Inc., "Switched Digital Video Solutions", http://www.ineoquest.com/switched-digital-video-solutions, Dec. 28, 2010, pp. 1-2.

Motorola, Inc., Solutions Paper, "Implementing Switched Digital Video Solutions", http://www.motorola.com/staticfiles/Business/Products/_Documents/_Static%20files/SDV%20Implementation%20Solutions%20paper%20-555998-001-a.pdf?localeId=33, Copyright 2008, p. 6.

Strickland, Jonathan, "How Switched Digital Video Works", Nov. 20, 2007. HowStuffWorks.com. <http://electronics.howstuffworks.com/switched-digital-video.htm>, pp. 1-4.

RENTRAK Corporation, Television, TV Essentials, Web source: http://www.rentrak.com/section/media/tv/linear.html, Feb. 1, 2011, p. 1.

Wayne Friedman, Rentrak's 'Stickiness' Mines TV Value on Granular Level, MediaPost, Jan. 27, 2010, Web source: http://www.tvb.org/media/file/TVB_Measurement_Rentraks_Stickiness_Mines_TV_Value_on_Granular_Level_1-27-10.pdf.

Rentrak Corporation, Reaching Your Target Audience Using Viewership Segments, Rentrak Case Studies, http://rentrak.com/downloads/Viewership_Segment_Case_Study.pdf, Oct. 18, 2013, p. 1-2.

Rentrak Corporation, Reaching Your Target Audience Using Commercial Ratings and Pod Analysis, Rentrak Case Studies, http://www.rentrak.com/downloads/Commercial_and_Pod_Analysis_Case_Study.pdf, Oct. 18, 2013, p. 1-2.

Rentrak Corporation, Rentrak Overview: Exact Commercial Ratings®, http://www.rentrak.com/downloads/Exact_Commercial_Ratings_Presentation.pdf, Jan. 22, 2013, p. 1-30.

Tim Brooks, Stu Gray, Jim Dennison, "The State of Set-Top Box Viewing Data as of Dec. 2009", STB Committee of the Council for Research Excellence. Research Report, Feb. 24, 2010, http://researchexcellence.com/stbstudy.php, pp. 1-9.

FourthWall Media, Product information from web page, MassiveData™, http://www.fourthwallmedia.tv, Oct. 18, 2013, p. 1.

Cisco Systems, Inc., "Network Efficiency with Switched Digital", Web page: http://www.cisco.com/en/US/products/ps9258/index.html, accessed Oct. 13, 2014, 2 pages.

Cisco Systems, Inc., "Access Viewership Data, Monitor Performance", Web page: http://www.cisco.com/en/US/products/ps9122/index.html, accessed May 20, 2013, 1 page.

Extended European Search Report—EP 14183827.6—dated Oct. 23, 2014.

Extended European Search Report—EP 14182927.5—dated Dec. 16, 2014.

Terry A. Welch, Sperry Research Center, "A Technique for High-Performance Data Compression," 1984.

Extended European Search Report, EP Application 14186382.9, dated Feb. 4, 2015.

Response to European Search Report—EP Appl. 14182927.5—submitted Sep. 4, 2015.

Response to European Search Report—EP 14183827.6—dated Sep. 10, 2015.

Response to EP Search Report—EP 14186382.9—dated Sep. 29, 2015.

EP Office Action—EP App 14182927.5—dated Mar. 31, 2016.

Konstantin Shvachko et al.: "The Hadoop Distributed File System", Mass Storage Systems and Technologies (MSST), 2010 IEEE 26th Symposium on, IEEE, Piscataway, NJ, USA, May 3, 2010 (May 3, 2010), pp. 1-10, XP031698650, ISBN: 978-1-4244-7152-2.

Anonymous: "Apache Hadoop", Sep. 5, 2013 (Sep. 5, 2013), XP055394634, Retrieved from the Internet: URL: https://en.wikipedia.org/w/index.php?title=Apache_Hadoop&oldid=571641303 [retrieved on Jul. 28, 2017].

Aug. 4, 2017—(EP) Office Action—App No. 14183827.6.

May 22, 2018—European Office Action—EP 14183827.6.

Mark Landler, Digital TV Converter Boxes to Expand Cable Offerings, 1996, The New York Times.

Mar. 22, 2019—EP Office Action—EP 14186382.9.

Nov. 10, 2020—CA Office Action—CA 2,864,621.

Nov. 6, 2020—EP Office Action—EP 14186382.9.

Jan. 12, 2021—Canadian Office Action—CA 2,860,802.

Jan. 13, 2021—Canadian Office Action—CA 2,861,861.

Jun. 23, 2021—Canadian Office Action—CA 2,864,621.

Jun. 22, 2021—European Office Action—EP 14186382.9.

Nov. 3, 2021—Canadian Office Action—CA 2,860,802.

Nov. 5, 2021—Canadian Office Action—CA 2,861,861.

Dec. 9, 2021—European Office Action—14186382.9.

U.S. Appl. No. 14/020,778, Measuring Video-Program Viewing, filed Sep. 6, 2013.

U.S. Appl. No. 14/037,352, Data Translation for Video-Viewing Activity, filed Sep. 25, 2013.

U.S. Appl. No. 14/608,929, System and Method for Analyzing Human Interaction with Electronic Devices that Access a Computer System Through a Network, filed Jan. 29, 2015.

U.S. Appl. No. 14/608,960, System and Method for Measuring Television Advertising and Program Viewing at a Second-by-Second Level and for Measuring Effectiveness of Targeted Advertising, filed Jan. 29, 2015.

(56) References Cited

OTHER PUBLICATIONS

U.S. Appl. No. 16/032,414, Measuring Video-Asset Viewing, filed Jul. 11, 2018.
U.S. Appl. No. 16/549,440, Measuring Video-Program-Viewing Activity, filed Aug. 23, 2019.
U.S. Appl. No. 17/533,375, Measuring Video-Content Viewing, filed Nov. 23, 2021.
Jan. 3, 2023—EP Office Action—EP App. No. 14186382.9.

* cited by examiner

FIG. 2

Summary Information

| Specification Name: | Video Viewing Analysis Data Structure |
|---|---|
| Computer Program Name: | DVR-REC-PLAYBACK-ACTIVITY-ANAL |
| Record description: | Video Viewing Analysis Data Structure is a data structure that records the second-by-second viewing activity of this video program airing based on a Linear Viewing Session or a DVR Playback Session or a VOD viewing session. |

Data Structure

| | NAME (4000) | TYPE (4002) | SIZE (4004) | DESCRIPTION (4006) |
|---|---|---|---|---|
| 4010~ | PAA-VIDEO-PROGRAM-ID | NUMBER | 9 | For Linear, this is populated from: Video Viewing Event File FIG 15-A IN-VP-VIDEO-PROGRAM-ID 4105. For DVR and VOD, this is populated from FIG 15-B: IN-VP-VIDEO-PROGRAM-ID 4805 |
| 4013~ | PAA-VIEWING_ACTIVITY_TYPE | CHAR | 3 | For Linear, this is populated from: Video Viewing Event File FIG 15-A IN-VIEWING_ACTIVITY_TYPE 4108. For DVR and VOD, this is populated from FIG 15-B: IN-VIEWING_ACTIVITY_TYPE 4808 |
| 4015~ | PAA-VP-DURATION-IN-SECONDS | NUMBER | 5 | For Linear, this is populated from: Video Viewing Event File FIG 15-A IN-VP-DURATION-IN-SECONDS 4110. For DVR and VOD, this is populated from FIG 15-B: IN-VP-DURATION-IN-SECONDS 4810 |
| 4020~ | PAA-VP-MIN-SECS-FOR-EXPOSURE | NUMBER | 5 | For Linear, this is populated from: Video Viewing Event File FIG 15-A IN-VP-MIN-SECS-FOR-EXPOSURE 4115. For DVR and VOD, this is populated from FIG 15-B: IN-VP-MIN-SECS-FOR-EXPOSURE 4815 |

FIG. 2 - Continued

| | | | | |
|---|---|---|---|---|
| 4025~ | PAA-VIDEO-PROGRAM-AIRING-ID | NUMBER | 9 | For Linear, this is populated from: Video Viewing Event File FIG 15-A IN-VP-VIDEO-PROGRAM-AIRING-ID 4120. For DVR and VOD, this is populated from FIG 15-B: IN-VP-VIDEO-PROGRAM-AIRING-ID 4820. |
| 4030~ | PAA-RECORD-PLAYBACK-SESSION-ID | NUMBER | 9 | For Linear, this is populated from: Video Viewing Event File FIG 15-A IN-DVR-RECORD-PLAYBACK-SESSION-ID 4140.<br><br>For DVR and VOD, this is populated from FIG 15-B: IN-DVR-RECORD-PLAYBACK-SESSION-ID 4885. |
| 4035~ | PAA-PLAYBACK-DURATION-IN-SECS | NUMBER | 5 | For Linear, this is populated from: Video Viewing Event File FIG 15-A IN-DRP-PLAYBACK-DURATN-IN-SECS 4145. For DVR and VOD, this is populated from FIG 15-B: IN-DRP-PLAYBACK-DURATN-IN-SECS 4900. |
| 4037~ | PAA-HOUSE-DEVICE-VIEWER | NUmber | 9 | For Linear, this is populated from: Video Viewing Event File FIG 15-A IN-HOUSE-DEVICE-VIEWER-ID 4122. For DVR and VOD, this is populated from FIG 15-B: IN-HOUSE-DEVICE-VIEWER-ID 4822 |
| 4040~ | PAA-HOUSE-DEMOGRAPHIC-CODE | Char | 8 | For Linear, this is populated from: Video Viewing Event File FIG 15-A IN-HDVR-HOUSE-DEMOGRAPHIC-CODE 4125. For DVR and VOD, this is populated from FIG 15-B: IN-HDVR-HOUSE-DEMOGRAPHIC-CODE 4845 |

FIG. 2 - Continued

| | | | | |
|---|---|---|---|---|
| 4045~ | PAA-HOUSE-GEOGRAPHIC-CODE | Char | 8 | For Linear, this is populated from:<br>Video Viewing Event File FIG 15-A<br>IN-HDVR-HOUSE-GEOGRAPHIC-CODE 4130.<br>For DVR and VOD, this is populated from FIG 15-B:<br>IN-HDVR-HOUSE-GEOGRAPHIC-CODE 4850 |
| 4050~ | PAA-VIDEO-VIEW-DEVICE-TYPE-CD | Char | 8 | For Linear, this is populated from:<br>Video Viewing Event File FIG 15-A<br>IN-HDVR-VIDEO-VIEW-DEV-TYPE-CD 4135.<br>For DVR and VOD, this is populated from FIG 15-B:<br>IN-HDVR-VIDEO-VIEW-DEV-TYPE-CD 4855 |
| | The following fields occur 14400 times within the context of a Video Program Airing further identified as to the viewer attributes of House Demographic code, House Geographic Code, and Video Viewing Device Type Code. The 14400 seconds allows for second by second viewing of a program that may be up to 4 hours in length.<br>Claims Reference: The 14400 occurrences provide Video Viewing Analysis Data Structure Buckets representing individual parts of video content for which viewer interactions may be tracked. Within the Buckets there are individual fields for tracking activity during each part of content represented by the Bucket.<br>Claims Reference: By putting the Buckets in the same Data Structure as child members to the Video Viewing Analysis Data Structure Identifying Fields, this creates the correlation between the Identifying Fields and the Buckets.<br>Claims Reference: The following fields are Activity Fields in the Video Viewing Analysis Data Structure Buckets. | | | |
| 4053~ | PAA-VIDEO-CONTENT-PART | number | 99999 | The video content part.<br>Claims Reference: This is the part of the video content represented in the Bucket. See definitions:<br>Individual part of video content. |
| 4054~ | PAA-VIDEO-CONTENT-PART-ID | number | 99999 | The video content part identifier. This can be an index, or a subscript, or a data value that can be used to identify the bucket.<br>Claims Reference: This is the means to identify the part of the video content being represented in the Bucket. |

FIG. 2 - Continued

| | | | | |
|---|---|---|---|---|
| 4055~ | PAA-PLAYBACK-SECOND-TALLY | number | 99V99 | This value records the score assigned to the viewer interaction.<br><br>Claims Reference: This is the viewer interaction score assigned to the viewer interaction which occurred during the part of the video content represented in the bucket. |
| 4060~ | PAA-PLAYBACK-SECOND-MODE | Char | 2 | For Linear, this is populated from:<br>Video Viewing Event File FIG 15-A<br>IN-DRP-PLAYBACK-MODE-CODE 4150.<br>For DVR and VOD, this is populated from FIG 15-B:<br>IN-DRP-PLAYBACK-MODE-CODE 4905<br><br>Claims Reference: This is the video viewing session mode. |
| 4065~ | PAA-SESSION-VOLUME-LEVEL | NUMBER | 2 | For Linear, this is populated from:<br>Video Viewing Event File FIG 15-A<br>IN-DRP-PB-VOLUME-LEVEL-NUM 4165.<br>For DVR and VOD, this is populated from FIG 15-B:<br>IN-DRP-PB-VOLUME-LEVEL-NUM 4920<br>Claims Reference: This is the video viewing session volume level. |
| 4070~ | PAA-PERCENT-CONTENT-VISIBLE | NUMBER | 3 | For Linear, this is populated from:<br>Video Viewing Event File FIG 15-A<br>IN-DRP-PB-PCT-CONTENT-VISIBLE 4170.<br>For DVR and VOD, this is populated from FIG 15-B:<br>IN-DRP-PB-PCT-CONTENT-VISIBLE 4925<br>Claims Reference: This is the video viewing session percent content visible. |

FIG. 2 - Continued

| | | | | |
|---|---|---|---|---|
| 4075~ | PAA-FOREGROUND-BACKGROUND-IND | Char | 1 | For Linear, this is populated from:<br>Video Viewing Event File FIG 15-A<br>IN-DRP-PB-FOREGRD-BACKGRD-IND 4175.<br>For DVR and VOD, this is populated from FIG 15-B:<br>IN-DRP-PB-FOREGRD-BACKGRD-IND 4930.<br><br>Claims Reference: This is the video viewing session foreground background indicator. |
| 4085~ | PAA-PICTURE-IN-PICTURE-IND | Char | 1 | For Linear, this is populated from:<br>Video Viewing Event File FIG 15-A<br>IN-PICTURE-IN-PICTURE-IND 4185.<br>For DVR and VOD, this is populated from FIG 15-B:<br>IN-PICTURE-IN-PICTURE-IND 4940.<br><br>Claims Reference: This is the Picture in Picture Indicator. |
| 4090~ | PAA-PERCENT-OF-SCREEN-THIS-VIDEO | Number | 3 | For Linear, this is populated from:<br>Video Viewing Event File FIG 15-A<br>IN-PERCENT-OF-SCREEN-THIS-VIDEO 4190.<br>For DVR and VOD, this is populated from FIG 15-B:<br>IN-PERCENT-OF-SCREEN-THIS-VIDEO 4945.<br><br>Claims Reference: This is the Percent of Screen This Video. |

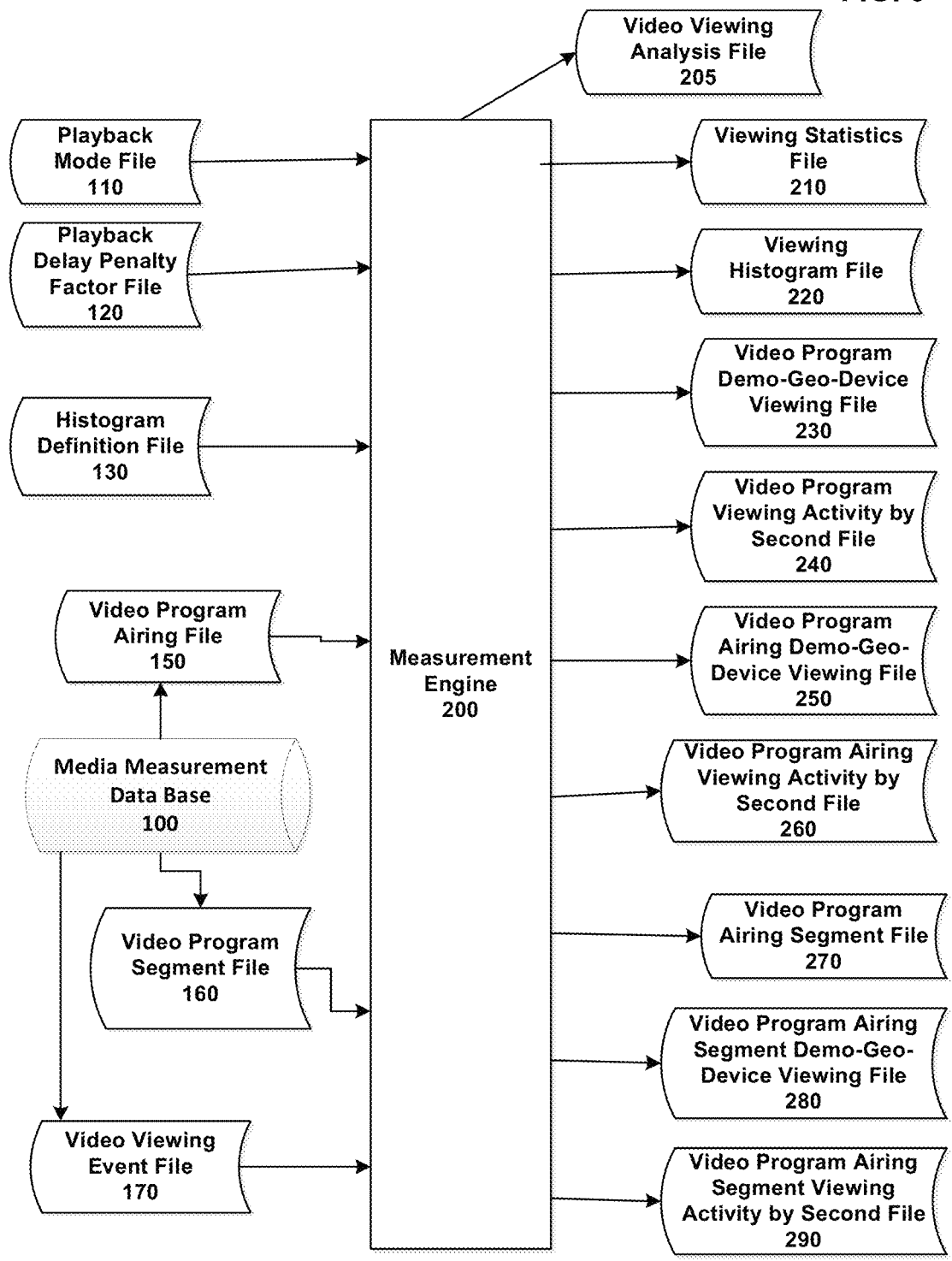

FIG. 5-A

| | 4200 | 4202 | 4204 | 4206 |
|---|---|---|---|---|
| | NAME | TYPE | SIZE | DESCRIPTION |
| 4210~ | IN-PMR-PLAYBACK-MODE-CODE | CHAR | 2 | The code assigned to this playback mode. Values:<br>PL – Play, SK – Skip, SP - Slow Play<br>F1 - Forward 1x<br>F2 - Forward 2x<br>F3 - Forward 3x<br>F4 - Forward 4x<br>SR - Slow Reverse<br>R1 - Reverse 1x<br>R2 - Reverse 2x<br>R3 - Reverse 3x<br>R4 - Reverse 4x<br>Used to populate 4260. |
| 4220~ | IN-PMR-PB-MODE-CODE-TALLY-RATE | NUMBER | 9V99 | Playback Mode Code Tally Rate defines the rate at which to tally viewing associated with this code. Sugested values:<br>PL = 1, SK = 0, SP = 1.5<br>F1 =.75, F2 =.5, F3 =.2, F4 =.1<br>SR =.9<br>R1 =.5, R2 =.25, R3 =.1, R4 = 0<br><br>Used to populate 4270. |
| 4230~ | IN-PMR-PLAYBACK-MODE-DESC | CHAR | 30 | A textual description of the Analysis Group. See above. |

FIG. 5-B

| | 4250 | 4252 | 4254 | 4256 |
|---|---|---|---|---|
| | NAME | TYPE | SIZE | DESCRIPTION |
| | The following fields occur 20 times to allow for multiple playback codes. | | | |
| 4260~ | DVR-PLAYBACK-MODE-CODE | CHAR | 2 | Populated from 4210 |
| 4270~ | DVR-PB-MODE-CODE-TALLY-RATE | NUMBER | 9V99 | Populated from 4220 |

FIG. 7-A

| | 4300 | 4302 | 4304 | 4306 |
|---|---|---|---|---|
| | NAME | TYPE | SIZE | DESCRIPTION |
| 4310~ | IN-PDP-INDEX-NUM | NUMBER | 2 | The index number of this record. Used to populate 4360. |
| 4320~ | IN-PDP-BEG-RANGE-HOURS | NUMBER | 3 | The number of hours that defines the beginning of this range. Used to populate 4370. |
| 4330~ | IN-PDP-END-RANGE-HOURS | CHAR | 3 | The number of hours that defines the end of this range. Used to populate 4380. |
| 4340~ | IN-PDP-PENALTY-RATE | NUMBER | 9V99 | The playback delay penalty factor. Used to populate 4390. |

FIG. 7-B

| | 4350 | 4352 | 4354 | 4356 |
|---|---|---|---|---|
| | NAME | TYPE | SIZE | DESCRIPTION |
| | The following fields occur 20 times to allow for multiple playback delay penalty factors. | | | |
| 4360~ | PDP-INDEX-NUM | CHAR | 2 | Populated from 4310 |
| 4370~ | PDP-BEG-RANGE-HOURS | NUMBER | 3 | Populated from 4320 |
| 4380~ | PDP-END-RANGE-HOURS | NUMBER | 3 | Populated from 4330 |
| 4390~ | PDP-PENALTY-RATE | NUMBER | 9V99 | Populated from 4340 |

FIG. 7-C

Sample data:
```
01    000    024    1.00
02    025    048    0.90
03    049    072    0.80
04    073    128    0.70
05    129    999    0.50
```

FIG. 9-A

|  | 4400 | 4402 | 4404 | 4406 |
|---|---|---|---|---|
|  | NAME | TYPE | SIZE | DESCRIPTION |
| 4410~ | IN-DVR-HISTOGRAM-INDEX | NUMBER | 2 | The index number of this record. Used to populate 4460. |
| 4420~ | IN-DVR-HISTOGRAM-BUCKET-NAME | CHAR | 20 | The name of the histogram range. Used to populate 4470. |
| 4430~ | IN-DVR-HISTOGRAM-BEG-SECOND | NUMBER | 5 | The number of seconds that defines the beginning of this range. Used to populate 4480. |
| 4440~ | IN-DVR-HISTOGRAM-END-SECOND | NUMBER | 5 | The number of seconds that defines the end of this range. Used to populate 4490. |

FIG. 9-B

|  | 4450 | 4452 | 4454 | 4456 |
|---|---|---|---|---|
|  | NAME | TYPE | SIZE | DESCRIPTION |
|  | Identifier fields for video program identifier 4462, viewing activity type 4463, demographic code 4464, geographic code 4465, and device type 4466 define Identifying Fields in this data structure. The following fields occur 30 times to allow for multiple histogram buckets. | | | |
| 4460~ | DVR-HISTOGRAM-INDEX | NUMBER | 2 | Populated from 4410 in program routine C134-LOAD-DVR-HISTOGRAM-DEF |
| 4470~ | DVR-HISTOGRAM-BUCKET-NAME | CHAR | 20 | Populated from 4420 in program routine C134-LOAD-DVR-HISTOGRAM-DEF |
| 4480~ | DVR-HISTOGRAM-BEG-SECOND | NUMBER | 5 | Populated from 4430 in program routine C134-LOAD-DVR-HISTOGRAM-DEF |
| 4490~ | DVR-HISTOGRAM-END-SECOND | NUMBER | 5 | Populated from 4440 in program routine C134-LOAD-DVR-HISTOGRAM-DEF |
| 4492~ | HISTG-TOTAL-VIEW-SECS | Number | 15 | Calculated in program routine D140-TABLUATE-HISTOGRAM |
| 4494~ | HISTG-TOTAL-SESSION-CNT | Number | 9 | Calculated in program routine D140-TABLUATE-HISTOGRAM |

FIG. 11

| | NAME | TYPE | SIZE | DESCRIPTION |
|---|---|---|---|---|
| 4510~ | IN-VPA-VIDEO-PROGRAM-AIRING-ID | NUMBER | 9 | Video Program Airing Id records the unique identifier assigned to this airing of this program in this geographic area on this channel at this date and time. |
| 4520~ | IN-VPA-VIDEO-PROGRAM-ID | NUMBER | 9 | Video Program Id provides a link to the video program which is being aired. |
| 4530~ | IN-VPA-CHANNEL-CALL-SIGN | CHAR | 10 | Channel Call Sign identifies the channel on which this program aired. The service provider may provide a reference table for channels. |
| 4540~ | IN-VPA-CHANNEL-SOURCE-ID | NUMBER | 5 | Channel Source Id identifies the Source id of the channel on which this program aired. This is often a numeric identifier of the channel in the operator's system. This is not usually the display channel. The service provider may provide a reference table for channels. In the case of a DVR recording, this is the identifier of the channel that is being recorded. |

Columns: 4500 (NAME), 4502 (TYPE), 4504 (SIZE), 4506 (DESCRIPTION)

FIG. 11 - Continued

| | | | | |
|---|---|---|---|---|
| 4545~ | IN-VPA-STATION-IDENTIFIER | CHAR | 10 | Video Program Station Identifier provides an identifier for the tv station. |
| 4550~ | IN-VPA-PGM-AIRING-BEG-DATETIME | DATETIME | | Program Airing Begin Date Time identifies the date and time of when this program aired. This may also be known as Program scheduled start date time. For a DVR recording, this value is NOT dependent on when the recording began. For example, if the program is scheduled to start at 7:00:00 PM, this value contains 7:00:00 PM, regardless of whether the recording began at 6:55 PM or 7:05 PM. |
| 4560~ | IN-VPA-PGM-AIRING-END-DATETIME | DATETIME | | Program Airing End Date Time identifies the date and time of when this program finished airing. This may also be known as Program scheduled end date time. For a DVR recording, this value is NOT dependent on when the recording ended. For example, if the program is scheduled to end at 7:59:59 PM, this value contains 7:59:59 PM, regardless of whether the recording ended at 7:55 PM or 8:05 PM. |

FIG. 13-A

|  | 4600 | 4602 | 4604 | 4606 |
|---|---|---|---|---|
|  | NAME | TYPE | SIZE | DESCRIPTION |
| 4610~ | IN-VPAS-VIDEO-PROGRAM-ID | NUMBER | 9 | The Video Program Id records the unique identifier assigned to this video program. This provides a link to the parent video program. |
| 4620~ | IN-VPAS-VIDEO-PROGRAM-SEG-ID | NUMBER | 9 | The Video Program Segment Id is the unique identifier assigned to this video program segment to identify the video program segment that is being tracked. |
| 4625~ | IN-VPAS-SEGMENT-SEQUENCE | NUMBER | 3 | The Segment SEQUENCE identifies the sequential ordering of this segment in the Video Program. |
| 4630~ | IN-VPAS-SEGMENT-POSITION | NUMBER | 3 | The Segment Position identifies the position of this segment in the Video Program. A position can be a one minute or five minute or fifteen minute program part. Then the segment begin and end times must fall within the position.<br>Depending on the implementation, the Segment Position may be sequential (i.e.: 1, 2, 3) or it may indicate a position within the program (i.e.: 1, 5, 9). |
| 4640~ | IN-VPAS-SEG-BEG-TIME-SEC-IN-P | NUMBER | 5 | Segment Begin Time Second in Program records the number of seconds from the start of the program at which this segment begins. If an ad began at the start of the second minute, this would be 60. Counting begins at zero, so the first minute is from seconds 0 to 59. |
| 4650~ | IN-VPAS-SEG-END-TIME-SEC-IN-P | NUMBER | 5 | Segment End Time Second in Program records the number of seconds from the start of the program at which this segment ends. If a 60 second ad began at the start of the second minute, and the end of the ad marked the end of the segment, this would be 119 (counting begins from 60, not 61). |

FIG. 13-A - Continued

| | | | | |
|---|---|---|---|---|
| 4660~ | IN-VPAS-SEG-DURATION-IN-SECOND | NUMBER | 5 | Segment Duration in Seconds defines the duration of the segment in seconds, such as 15, 30, 60 seconds. |
| 4670~ | IN-VPAS-MIN-SECONDS-FOR-EXPOS | NUMBER | 5 | Minimum Seconds for Exposure defines the least number of seconds that the viewer must see the segment content for the viewing to qualify as an exposure. |
| 4680~ | IN-VPAS-ALLOW-TRGT-DUR-SEG-IND | CHAR | 1 | Allow Targeting During Segment Indicator specifies whether or not this segment allows targeted content (ads). This works in conjunction with the dynamic and static segment information. Targeting flag of Y relates to dynamic content; a flag of N relates to static content. |

FIG. 13-B

| | | 4700 | 4702 | 4704 | 4706 |
|---|---|---|---|---|---|
| | | NAME | TYPE | SIZE | DESCRIPTION |
| 4710~ | | VPS-VIDEO-PROGRAM-ID | NUMBER | 9 | Populated from 4610 |
| | | The following fields occur 60 times to allow for multiple Video Program Segments. | | | |
| 4720~ | | VPS-VIDEO-PROGRAM-SEGMENT-ID | NUMBER | 9 | Populated from 4620 |
| 4725~ | | VPS-SEGMENT-SEQUENCE | NUMBER | 5 | Populated from 4625 |
| 4730~ | | VPS-SEGMENT-POSITION | NUMBER | 5 | Populated from 4630 |
| 4740~ | | VPS-SEG-BEG-TIME-SEC-IN-PGM | NUMBER | 5 | Populated from 4640 |
| 4750~ | | VPS-SEG-END-TIME-SEC-IN-PGM | NUMBER | 5 | Populated from 4650 |
| 4760~ | | VPS-SEG-DURATION-IN-SECONDS | NUMBER | 5 | Populated from 4660 |
| 4770~ | | VPS-MIN-SECONDS-FOR-EXPOSURE | NUMBER | 5 | Populated from 4670 |
| 4780~ | | VPS-ALLOW-TRGT-DURING-SEG-IND | Char | 1 | Populated from 4680 |

FIG. 15-A - Linear Viewing Activity

| | NAME | TYPE | SIZE | DESCRIPTION |
|---|---|---|---|---|
| 4105~ | IN-VP-VIDEO-PROGRAM-ID | NUMBER | 9 | Video Program Id is the unique identifier of this video program.<br><br>Claims Reference: This is video program identifier. |
| 4108~ | IN-VIEWING-ACTIVITY-TYPE | CHAR | 3 | Populated with "LIN" to indicate that this record is Linear viewing.<br><br>Claims Reference: This is viewing activity type. |
| 4110~ | IN-VP-DURATION-IN-SECONDS | NUMBER | 5 | Program Duration In Seconds records the duration of this program measured in seconds. |
| 4115~ | IN-VP-MIN-SECS-FOR-EXPOSURE | NUMBER | 5 | Minimum Seconds For Exposure records the least number of viewing seconds to be counted as expsoure.<br>Claims Reference: This is minimum seconds for exposure. |
| 4120~ | IN-VP-VIDEO-PROGRAM-AIRING-ID | NUMBER | 9 | Video Program Airing Id records the unique identifier assigned to this airing of this program in this geographic area on this channel at this date and time.<br>Claims Reference: This is video program airing identifier. |
| 4122~ | IN-HOUSE-DEVICE-VIEWER-ID | Number | 9 | House Device Viewer Id. |

FIG. 15-A - Linear Viewing Activity - Continued

| | | | | |
|---|---|---|---|---|
| 4125~ | IN-HDVR-HOUSE-DEMOGRAPHIC-CODE | CHAR | 8 | House Demographic Code records the Demographic Code assigned to this household. Multiple kinds of demographic codes can be assigned to a Household. The one used to populate this field will depend upon the kind of demographic aggregation that is being calculate.<br>Claims Reference: This is demographic information. |
| 4130~ | IN-HDVR-HOUSE-GEOGRAPHIC-CODE | CHAR | 8 | House Geographic Code identifies the geographic code assigned to this house. Multiple kinds of geographic codes can be assigned to a Household. The one used to populate this field will depend upon the kind of geographic aggregation that is being calculated.<br><br>Claims Reference: This is geographic information. |
| 4135~ | IN-HDVR-VIDEO-VIEW-DEV-TYPE-CD | CHAR | 8 | Video Viewing Device Type Code records acharacteristic of the device. See Device Characteristic definition.<br><br>Claims Reference: This is video viewing device information. |
| 4136~ | IN-HDVR-RECORDING-BEG-DATETIME | datetime | | Not used for Linear.<br>Nearest equivalent Linear field is Session Begin Datetime, but it is not used. |
| 4138~ | IN-DRP-PLAYBACK-BEG-DATETIME | datetime | | Not used for Linear.<br>Nearest equivalent Linear field is Session Begin Datetime, but it is not used. |
| 4180~ | IN-HOURS-FROM-REC-TO-PLAYBACK | Number | 3 | For Linear, defaulted to 0 to indicate live viewing. |
| 4140~ | IN-DVR-RECORD-PLAYBACK-SESSION-ID | NUMBER | 9 | House Device Viewer Session Id records the unique identifier assigned to this viewing session record.<br><br>Claims Reference: This is video viewing session identifier. |

FIG. 15-A - Linear Viewing Activity - Continued

| | | | | |
|---|---|---|---|---|
| 4145~ | IN-DRP-PLAYBACK-DURATN-IN-SECS<br><br>Note: This is session level data. | NUMBER | 5 | Linear Viewing Session Duration in Seconds. Calculation is:<br>IN-PB-MODE-END-SEC-FRM-TRU-BEG 4160<br>–<br>IN-PB-MODE-BEG-SEC-FRM-TRU-BEG 4155<br>+ 1<br>Note: These source fields contain Linear data.<br>This is used in calculating histogram of viewing session durations. |
| 4150~ | IN-DRP-PLAYBACK-MODE-CODE | CHAR | 2 | Session Activity Mode Code specifies the type of activity that occurred during this linear session. Values include:<br>"PL" for Play, "F1" for Forward 1x, "F2", for Forward 2x, etc.<br><br>Normally, Linear viewing has a mode of "PL". However, there are certain cases where Linear viewing will allow trick plays. In those cases, this field will have a value indicating the type of trick play.<br>Claims Reference: This is video viewing session mode. |
| 4155~ | IN-PB-MODE-BEG-SEC-FRM-TRU-BEG<br><br>Note: This is session level data. For Linear this is loaded from the Linear viewing session data. | NUMBER | 5 | Session Beg Second From True Beginning (of Video Program) identifies the position in the actual content of where this activity occurred, it records the number of seconds into the program at which this session began. So regardless of what part of the video the user is viewing this identifies where in the content the viewer is causing this activity. Tracking the activity position in this manner allows the system to normalize measurement across all of the sessions from multiple viewers.<br>Ex: If the session began at the exact start of the actual program, then this would be zero. If the session began at the start of the third minute, then this would be 120. The first two minutes of content would be in seconds 0 to 119.<br><br>Claims Reference: This is session begin second from the true beginning. |

FIG. 15-A - Linear Viewing Activity - Continued

| | | | | |
|---|---|---|---|---|
| 4160~ | IN-PB-MODE-END-SEC-FRM-TRU-BEG<br><br>Note: This is session level data. For Linear this is loaded from the Linear viewing session data. | NUMBER | 5 | Contains: Session End Second From True Beginning (of Video Program) identifies the position in the actual content of where this activity occurred, it records the number of seconds into the program at which this session ended. So regardless of what part of the video the user is viewing this identifies the end point in the content where the viewer is causing this activity. Tracking the activity position in this manner allows the system to normalize measurement across all of the sessions from multiple viewers.<br>Ex: If the session ended at the exact end of the actual program, then this would be the number of seconds in the program, perhaps 1800 for a 30 minute program (60*30). If the session ended exactly ten minutes into the program, then this would be 600 (60* 10). These values must be adjusted to account for starting the count at 0, so the values would be 1799 and 599 respectively.<br>Claims Reference: This is session end second from the true beginning. |
| 4161~ | DVR-RECORD-PLAYBACK-EVENT-ID<br>Note: This is session event level data. | NUMBER | 9 | NonTuning Session Event Id records the unique identifier of thisNonTuning Session Event. |
| 4162~ | EVENT-BEG-SEC-FROM-TRUE-BEG<br><br>Note: This is session event level data. | NUMBER | 5 | Session Beg Second From True Beginning (of Video Program) identifies the position in the actual content of where this nontuning activity occurred. So regardless of what part of the video the user is viewing this identifies where in the content the viewer is causing this nontuning activity. Tracking the activity position in this manner allows the system to normalize measurement across all of the sessions from multiple viewers.<br>Claims Reference: This is event begin second from the true beginning. |

FIG. 15-A - Linear Viewing Activity - Continued

| | | | | |
|---|---|---|---|---|
| 4163~ | EVENT-END-SEC-FROM-TRUE-BEG<br><br>Note: This is session event level data. | NUMBER | 5 | Session End Second From True Beginning (of Video Program) identifies the position in the actual content of where this nontuning activity occurred. So regardless of what part of the video the user is viewing this identifies the end point in the content where the viewer is causing this nontuning activity. Tracking the activity position in this manner allows the system to normalize measurement across all of the sessions from multiple viewers.<br><br>Claims Reference: This is event end second from the true beginning. |
| 4165~ | IN-DRP-PB-VOLUME-LEVEL-NUM | NUMBER | 2 | Volume level records the volume at which this viewing occurred. This can be used in the scoring algorithm to reduce the viewing points earned if the volume is below a specified level. 0 = Muted.<br>Claims Reference: This is video viewing session volume level. |
| 4170~ | IN-DRP-PB-PCT-CONTENT-VISIBLE | Number | 3 | Percent Content Visible records a percentage indicating how much of the viewing content is visible. This can be used in the scoring algorithm to reduce the viewing points earned if the visible percentage is below a specified level. Also known as occluded region.<br>Claims Reference: This is video viewing session percent content visible. |
| 4175~ | IN-DRP-PB-FOREGRD-BACKGRD-IND | Char | 1 | Foreground Background Indicator records whether the video is in the foreground or the background (less visible). This can be used in the scoring algorithm to reduce the viewing points earned if the video is not visible because it is in the background.<br>Claims Reference: This is video viewing session foreground background indicator. |

FIG. 15-A - Linear Viewing Activity - Continued

| | NAME | TYPE | SIZE | DESCRIPTION |
|---|---|---|---|---|
| 4185~ | IN-PICTURE-IN-PICTURE-IND | Char | 1 | Picture in Picture Indicator records whether the picture in picture feature is being used during this viewing session. This can be used in the scoring algorithm to reduce the viewing points earned if the video is being viewed in picture in picture mode.<br><br>Claims Reference: This is video viewing session picture in picture indicator. |
| 4190~ | IN-PERCENT-OF-SCREEN-THIS-VIDEO | Number | 3 | Percent of Screen This Video identifies what percentage of the screen is being used to display this video. This can be used in the scoring algorithm to reduce the viewing points earned depending on how much of the screen is being used to display this video.<br><br>Claims Reference: This is video viewing session Percent of Screen This Video. |

FIG 15-B – DVR and VOD Viewing Activity

| | NAME (4600) | TYPE (4602) | SIZE (4604) | DESCRIPTION (4606) |
|---|---|---|---|---|
| 4805~ | IN-VP-VIDEO-PROGRAM-ID | NUMBER | 9 | Video Program Id is the unique identifier of this video program.<br><br>Claims Reference: This is video program identifier. |
| 4808~ | IN-VIEWING-ACTIVITY-TYPE | CHAR | 3 | Populated with "DVR" or "VOD" depending on whether this record represents DVR or VOD viewing activity.<br>Claims Reference: This is viewing activity type. |

FIG 15-B – DVR and VOD Viewing Activity - Continued

| | | | | |
|---|---|---|---|---|
| 4810~ | IN-VP-DURATION-IN-SECONDS | NUMBER | 5 | Program Duration In Seconds records the duration of this program measured in seconds. |
| 4815~ | IN-VP-MIN-SECS-FOR-EXPOSURE | NUMBER | 5 | Minimum Seconds For Exposure records the least number of viewing seconds to be counted as expsoure.<br><br>Claims Reference: This is minimum seconds for exposure. |
| 4820~ | IN-VP-VIDEO-PROGRAM-AIRING-ID | NUMBER | 9 | Video Program Airing Id records the unique identifier assigned to this airing of this program in this geographic area on this channel at this date and time.<br><br>Claims Reference: This is video program airing identifier. |
| 4822~ | IN-HOUSE-DEVICE-VIEWER-ID | Number | 9 | House Device Viewer Id is unique id assigned to combination of house + device + viewer. |
| 4845~ | IN-HDVR-HOUSE-DEMOGRAPHIC-CODE | CHAR | 8 | House Demographic Code records the Demographic Code assigned to this household. Multiple kinds of demographic codes can be assigned to a Household. The one used to populate this field will depend upon the kind of demographic aggregation that is being calculate.<br><br>Claims Reference: This is demographic information. |
| 4850~ | IN-HDVR-HOUSE-GEOGRAPHIC-CODE | CHAR | 8 | House Geographic Code identifies the geographic code assigned to this house. Multiple kinds of geographic codes can be assigned to a Household. The one used to populate this field will depend upon the kind of geographic aggregation that is being calculated.<br><br>Claims Reference: This is geographic information. |
| 4855~ | IN-HDVR-VIDEO-VIEW-DEV-TYPE-CD | CHAR | 8 | Video Viewing Device Type Code. See 4135 for definition.<br>Claims Reference: This is video viewing device information. |

FIG 15-B – DVR and VOD Viewing Activity - Continued

| | | | | |
|---|---|---|---|---|
| 4860~ | IN-HDVR-RECORDING-BEG-DATETIME<br><br>Note: No truly comparable field for Linear. | datetime | | Used for DVR processing:<br>Recording Begin Date Time records the date and time of when this recording began. The viewer may start the recording at the program start time or at any point during the program. Used to calculate hours from recording to playback.<br>Claims Reference: This is video recording date and time. |
| 4890~ | IN-DRP-PLAYBACK-BEG-DATETIME<br><br>Note: No truly comparable field for Linear. | datetime | | Playback Begin Datetime records the date and time of when the DVR recording playback began.<br>For DVR processing:<br>Used to calculate hours from recording to playback. |
| 4935~ | IN-HOURS-FROM-REC-TO-PLAYBACK<br>Note: Defaults to zero for Linear. | Number | 3 | Calculated as hours difference between IN-DRP-PLAYBACK-BEG-DATETIME 4890 and IN-HDVR-RECORDING-BEG-DATETIME 4860 |
| 4885~ | IN-DVR-RECORD-PLAYBACK-SESSION-ID | NUMBER | 9 | DVR Recording Playback Session Id records the unique identifier of this DVR Recording Playback Session.<br>Claims Reference: This is video recording playback date and time. |
| 4900~ | IN-DRP-PLAYBACK-DURATN-IN-SECS | NUMBER | 5 | DVR / VOD Playback Session Duration in Seconds<br>Calculation is:<br>IN-PB-MODE-END-SEC-FRM-TRU-BEG 4915<br>–<br>IN-PB-MODE-BEG-SEC-FRM-TRU-BEG 4910<br>+ 1<br>This is used to create a histogram of DVR playback durations. |
| 4905~ | IN-DRP-PLAYBACK-MODE-CODE | CHAR | 2 | Playback Mode Code records the mode or activity occuring during playback. PL = Play, PA = Pause, F1 = Fast Forward 1x, F2 = Fast Forward 2x, R1 = Rewind 1x, R2 = Rewind 2x, etc.<br>Claims Reference: This is video viewing session mode. |

FIG 15-B – DVR and VOD Viewing Activity - Continued

| | | | | |
|---|---|---|---|---|
| 4910~ | IN-PB-MODE-BEG-SEC-FRM-TRU-BEG<br><br>Note: This is session level data.<br><br>Note: This is not to be confused with DVR recording field BEG-OFFSET-SEC-FROM-TRUE-BEG which identifies the beginning location of the content that was recorded. Loaded from DVR playback session data. | NUMBER | 5 | Playback Mode Beg Second From True Beginning (of Video Program) identifies the position in the actual content (not simply the recorded part) of where this activity occurred. So regardless of what part of the recording the user recorded, this identifies where in the content the viewer is causing this activity. Tracking the activity position in this manner allows the system to normalize measurement across all of the DVR playback occurrences from multiple viewers. Example: If the playback mode is Play, this field identifies the beginning point of where the Play activity occurred in the actual content. This time could be of a finer granularity than one second if desired.<br><br>Claims Reference: This is session begin second from the true beginning. |
| 4915~ | IN-PB-MODE-END-SEC-FRM-TRU-BEG<br><br>Note: This is session level data.<br><br>Note: This is not to be confused with DVR recording field END-OFFSET-SEC-FROM-TRUE-BEG which identifies the ending location of the content that was recorded. Loaded from DVR playback session data. | NUMBER | 5 | Playback Mode End Second From True Beginning (of Video Program) identifies the position in the actual content (not simply the recorded part) of where the activity represented by this playback mode ended. So regardless of what part of the recording the user recorded, this identifies where in the content the viewer is causing this activity. Tracking playback position in this manner allow the system to normalize measurement across all of the DVR playback occurrences from multiple viewers. Example: If the playback mode is F2 (fast forward 2x), this field identifies the ending point of where the F2 activity occurred in the actual content. This time could be of a finer granularity than one second if desired.<br><br>Claims Reference: This is session end second from the true beginning. |

FIG 15-B – DVR and VOD Viewing Activity - Continued

| | | | | |
|---|---|---|---|---|
| 4916~ | DVR-RECORD-PLAYBACK-EVENT-ID | NUMBER | 12 | DVR Recording Playback Event Id is the unique identifier assigned to the DVR Recording Playback Event record. |
| 4917~ | EVENT-BEG-SEC-FROM-TRUE-BEG | NUMBER | 5 | Event Beg Second From True Beginning (of Video Program) identifies the position in the actual content of where this DVR Recording Playback Event activity occurred. So regardless of what part of the video the user is viewing this identifies where in the content the viewer is causing this activity. Tracking the activity position in this manner allows the system to normalize measurement across all of the sessions from multiple viewers.<br>Claims Reference: This is event begin second from the true beginning. |
| 4918~ | EVENT-END-SEC-FROM-TRUE-BEG | NUMBER | 5 | Event End Second From True Beginning (of Video Program) identifies the position in the actual content of where this DVR Recording Playback Event activity occurred. So regardless of what part of the video the user is viewing this identifies the end point in the content where the viewer is causing this activity. Tracking the activity position in this manner allows the system to normalize measurement across all of the sessions from multiple viewers.<br>Claims Reference: This is event end second from the true beginning. |
| 4920~ | IN-DRP-PB-VOLUME-LEVEL-NUM | NUMBER | 2 | Playback volume level records the volume at which this playback occurred. This can be used in the scoring algorithm to reduce the viewing points earned if the volume is below a specified level. 0 = Muted.<br><br>Claims Reference: This is video viewing session volume level. |

FIG 15-B – DVR and VOD Viewing Activity - Continued

| | | | | |
|---|---|---|---|---|
| 4925~ | IN-DRP-PB-PCT-CONTENT-VISIBLE | Number | 3 | Playback Percent Content Visible records a percentage indicating how much of the viewing content is visible. This can be used in the scoring algorithm to reduce the viewing points earned if the visible percentage is below a specified level. Also known as occulded region.<br><br>Claims Reference: This is video viewing session percent content visible. |
| 4930~ | IN-DRP-PB-FOREGRD-BACKGRD-IND | Char | 1 | Playback Foreground Background Indicator records whether the video is in the foreground or the background (less visible). This can be used in the scoring algorithm to reduce the viewing points earned if the video is not visible because it is in the background.<br><br>Claims Reference: This is video viewing session foreground background indicator. |
| 4940~ | IN-PICTURE-IN-PICTURE-IND | Char | 1 | Picture in Picture Indicator records whether the picture in picture feature is being used during this viewing session. This can be used in the scoring algorithm to reduce the viewing points earned if the video is being viewed in picture in picture mode.<br><br>Claims Reference: This is video viewing session picture in picture indicator. |
| 4945~ | IN-PCT-OF-SCREEN-THIS-VIDEO | Number | 3 | Percent of Screen This Video identifies what percentage of the screen is being used to display this video. This can be used in the scoring algorithm to reduce the viewing points earned depending on how much of the screen is being used to display this video.<br><br>Claims Reference: This is video viewing session Percent of Screen This Video. |

FIG. 17 - Video Program Viewing Activity Data Structure

| | NAME | TYPE | SIZE | DESCRIPTION |
|---|---|---|---|---|
| | 5000 | 5002 | 5004 | 5006 |
| 5010~ | VP-VIDEO-PROGRAM-ID | NUMBER | 9 | For Linear, this is populated from:<br>Video Viewing Event File FIG 15-A<br>IN-VP-VIDEO-PROGRAM-ID 4105.<br>For DVR and VOD, this is populated from FIG 15-B:<br>IN-VP-VIDEO-PROGRAM-ID 4805 |
| 5014~ | VP-VIEWING-ACTIVITY-TYPE | CHAR | 3 | Populated from:<br>For Linear viewing:<br>IN-VIEWING-ACTIVITY-TYPE 4108 (Ref FIG 15-A)<br>For DVR and VOD viewing:<br>IN-VIEWING-ACTIVITY-TYPE 4808 (Ref FIG 15-B) |
| 5018~ | VP-PROGRAM-DURATION-IN-SECONDS | NUMBER | 5 | Populated from:<br>IN-VP-DURATION-IN-SECONDS 4110 or 4810 |
| 5022~ | VP-MIN-SECONDS-FOR-EXPOSURE | NUMBER | 5 | Populated from:<br>IN-VP-MIN-SECS-FOR-EXPOSURE 4115 or 4815 |
| 5026~ | VP-DVR-REC-PB-STATS-DATE | date | | Records the date of when these statistics were generated. |
| 5028~ | VP-DVR-REC-PB-TOTAL-SESS-CNT | NUMBER | 12 | Total session Count is the total number of playback sessions tabulated in this run. |
| 5032~ | VP-DVR-REC-PB-TOTAL-VW-SECS | NUMBER | 12 | Total viewing seconds is the total number of viewing seconds tabulated in this run. |
| | The following fields occur 20 times within the context of a Video Program so that each video program is allowed up to 20 instances of the following fields. This allows the system to track viewing of this video program at the level of a combination of Demographic Code + Geographic Code + Video Device Type for the Viewing Activity Type.<br><br>When the user sets up the study they are able to define the various combinations of Demographic Code + Geographic Code + Video Device Type that they are interested in tracking. The system will then capture the viewing for those breakouts. Each of the Demographic Code + Geographic Code + Video Device Type combinations will be applied to entire video asset. | | | |

FIG. 17 - Video Program Viewing Activity Data Structure - Continued

| | | | | |
|---|---|---|---|---|
| 5036~ | VP-HOUSE-DEMOGRAPHIC-CODE | Char | 8 | Populated from:<br>For Linear viewing:<br>IN-HDVR-HOUSE-DEMOGRAPHIC-CODE 4125<br>(Ref FIG 15-A)<br>For DVR and VOD viewing:<br>IN-HDVR-HOUSE-DEMOGRAPHIC-CODE 4845<br>(Ref FIG 15-B) |
| 5038~ | VP-HOUSE-GEOGRAPHIC-CODE | Char | 8 | Populated from:<br>For Linear viewing:<br>IN-HDVR-HOUSE-GEOGRAPHIC-CODE 4130<br>(Ref FIG 15-A)<br>For DVR and VOD viewing:<br>IN-HDVR-HOUSE-GEOGRAPHIC-CODE 4850<br>(Ref FIG 15-B) |
| 5042~ | VP-VIDEO-VIEW-DEVICE-TYPE-CD | Char | 8 | Populated from:<br>For Linear viewing:<br>IN-HDVR-VIDEO-VIEW-DEV-TYPE-CD 4135<br>(Ref FIG 15-A)<br>For DVR and VOD viewing:<br>IN-HDVR-VIDEO-VIEW-DEV-TYPE-CD 4855<br>(Ref FIG 15-B) |
| | Note to the reader: The fields below should be understood in the context of calculating viewing activity for one Demographic Code + Geographic Code + Video Device Type combinations for a video asset. For example, VP-PL-MODE-BEG-TO-END-COUNT is Play Mode Beginning to End Count is a count of the number of viewing devices that were in play mode for the entire duration of the video asset airing and where the viewing activity is identified by the indicated Demographic Code + Geographic Code + Video Device Type combination for the Viewing Activity Type. The definition provided herein will be relevant to the similarly named fields at the Video Program Airing level and the Video Program Segment Airing level.<br><br>Claims Reference: The following fields 5046 to 5146 record the Program Level Video Program Viewing Metrics. ||||
| | The following fields track activity that happens for the entire duration of the video asset. These are calculated in FIG 16, part 830. ||||
| 5046~ | VP-PL-MODE-BEG-TO-END-COUNT | NUMBER | 7 | Play Mode Beginning to End Count is a count of the number of viewing devices that were in play mode from the beginning to the end of the video program. |

FIG. 17 - Video Program Viewing Activity Data Structure - Continued

| | | | | |
|---|---|---|---|---|
| 5052~ | VP-SK-MODE-BEG-TO-END-COUNT | NUMBER | 7 | Skip Mode Beginning to End Count is a count of the number of viewing devices that were in skip mode from the beginning to the end of the video program. |
| 5056~ | VP-SP-MODE-BEG-TO-END-COUNT | NUMBER | 7 | Slow Play Mode Beginning to End Count is a count of the number of viewing devices that were in slow play mode from the beginning to the end of the video program. |
| 5060~ | VP-F1-MODE-BEG-TO-END-COUNT | NUMBER | 7 | Forward 1x Mode Beginning to End Count is a count of the number of viewing devices that were in Forward 1x mode from the beginning to the end of the video program. |
| 5064~ | VP-F2-MODE-BEG-TO-END-COUNT | NUMBER | 7 | Forward 2x Mode Beginning to End Count is a count of the number of viewing devices that were in Forward 2x mode from the beginning to the end of the video program. |
| 5068~ | VP-F3-MODE-BEG-TO-END-COUNT | NUMBER | 7 | Forward 3x Mode Beginning to End Count is a count of the number of viewing devices that were in Forward 3x mode from the beginning to the end of the video program. |
| 5072~ | VP-F4-MODE-BEG-TO-END-COUNT | NUMBER | 7 | Forward 4x Mode Beginning to End Count is a count of the number of viewing devices that were in Forward 4x mode from the beginning to the end of the video program. |
| 5076~ | VP-SR-MODE-BEG-TO-END-COUNT | NUMBER | 7 | Slow Reverse Mode Beginning to End Count is a count of the number of viewing devices that were in slow reverse mode from the beginning to the end of the video program. |
| 5080~ | VP-R1-MODE-BEG-TO-END-COUNT | NUMBER | 7 | Reverse 1x Mode Beginning to End Count is a count of the number of viewing devices that were in reverse 1x mode from the beginning to the end of the video program. |

FIG. 17 - Video Program Viewing Activity Data Structure - Continued

| | | | | |
|---|---|---|---|---|
| 5084~ | VP-R2-MODE-BEG-TO-END-COUNT | NUMBER | 7 | Reverse 2x Mode Beginning to End Count is a count of the number of viewing devices that were in reverse 2x mode from the beginning to the end of the video program. |
| 5088~ | VP-R3-MODE-BEG-TO-END-COUNT | NUMBER | 7 | Reverse 3x Mode Beginning to End Count is a count of the number of viewing devices that were in reverse 3x mode from the beginning to the end of the video program. |
| 5092~ | VP-R4-MODE-BEG-TO-END-COUNT | NUMBER | 7 | Reverse 4x Mode Beginning to End Count is a count of the number of viewing devices that were in reverse 4x mode from the beginning to the end of the video program. |
| 5096~ | VP-VIEW-MIN-SECS-IN-PLAY-CNT | NUMBER | 7 | Viewed Minimum Seconds in Play Count is a count of the number of video viewing devices that viewed at least the minimum required number of seconds in play mode to be counted as an exposure. |
| | The following fields track counts of seconds at the Video Program level for the various kinds of activities which may occur during video program viewing. These are calculated in FIG 22 part 965. | | | |
| 5100~ | VP-AGGR-ADJUSTED-VIEW-SECS | NUMBER | 12 | Aggregate Adjusted Viewing Seconds is the number of viewing seconds the video asset earned after adjusting for the various Adjustment Factors. |
| 5104~ | VP-AGGR-PL-MODE-VIEW-SECS | NUMBER | 12 | Aggregate Play Mode Viewing Seconds is the number of viewing seconds the video program earned from play mode viewing of this program of this Viewing Activity Type. |
| 5108~ | VP-AGGR-SK-MODE-VIEW-SECS | NUMBER | 12 | Aggregate Skip Mode Viewing Seconds is the number of viewing seconds the video program earned from skip mode viewing across all the viewings of this program of this Viewing Activity Type. |

FIG. 17 - Video Program Viewing Activity Data Structure - Continued

| | | | | |
|---|---|---|---|---|
| 5112~ | VP-AGGR-SP-MODE-VIEW-SECS | NUMBER | 12 | Aggregate Slow Play Mode Viewing Seconds is the number of viewing seconds the video program earned from slow play mode viewing of this program of this Viewing Activity Type. |
| 5116~ | VP-AGGR-F1-MODE-VIEW-SECS | NUMBER | 12 | Aggregate Forward 1x Mode Viewing Seconds is the number of viewing seconds the video program earned from forward 1x mode viewing of this program of this Viewing Activity Type. |
| 5120~ | VP-AGGR-F2-MODE-VIEW-SECS | NUMBER | 12 | Aggregate Forward 2x Mode Viewing Seconds is the number of viewing seconds the video program earned from forward 2x mode viewing of this program of this Viewing Activity Type. |
| 5124~ | VP-AGGR-F3-MODE-VIEW-SECS | NUMBER | 12 | Aggregate Forward 3x Mode Viewing Seconds is the number of viewing seconds the video program earned from forward 3x mode viewing of this program of this Viewing Activity Type. |
| 5128~ | VP-AGGR-F4-MODE-VIEW-SECS | NUMBER | 12 | Aggregate Forward 4x Mode Viewing Seconds is the number of viewing seconds the video program earned from forward 4x mode viewing of this program of this Viewing Activity Type. |
| 5132~ | VP-AGGR-SR-MODE-VIEW-SECS | NUMBER | 12 | Aggregate Slow Reverse Mode Viewing Seconds is the number of viewing seconds the video program earned from slow reverse mode viewing of this program of this Viewing Activity Type. |
| 5136~ | VP-AGGR-R1-MODE-VIEW-SECS | NUMBER | 12 | Aggregate Reverse 1x Mode Viewing Seconds is the number of viewing seconds the video program earned from reverse 1x mode viewing of this program of this Viewing Activity Type. |
| 5140~ | VP-AGGR-R2-MODE-VIEW-SECS | NUMBER | 12 | Aggregate Reverse 2x Mode Viewing Seconds is the number of viewing seconds the video program earned from reverse 2x mode viewing of this program of this Viewing Activity Type. |

FIG. 17 - Video Program Viewing Activity Data Structure - Continued

| | | | | |
|---|---|---|---|---|
| 5144~ | VP-AGGR-R3-MODE-VIEW-SECS | NUMBER | 12 | Aggregate Reverse 3x Mode Viewing Seconds is the number of viewing seconds the video program earned from reverse 3x mode viewing of this program of this Viewing Activity Type. |
| 5146~ | VP-AGGR-R4-MODE-VIEW-SECS | NUMBER | 12 | Aggregate Reverse 4x Mode Viewing Seconds is the number of viewing seconds the video program earned from reverse 4x mode viewing of this program of this Viewing Activity Type. |
| | colspan | | | |

The following fields occur 14400 times. This allows second-by-second data for four hours.

Note to the reader: The fields below should be understood in the context of calculating viewing activity for one Demographic Code + Geographic Code + Video Device Type combinations for one video asset, for all the devices included in the data set for the Viewing Activity Type.

To recall the hierarchy, for a viewing activity type, the system is tracking:

Video Program
    Up to 20 Demographic Code + Geographic Code + Video Device Type combinations
        Up to 14400 seconds of viewing activity.

For example, `VP-ADJ-PL-MODE-COUNT` is Adjusted Play Mode Count which is a count of the number of viewing seconds in Play mode that were earned for the indicated second of this video asset across all the viewing devices whose activity is being calculated and within the context of Demographic Code + Geographic Code + Video Device Type combinations.

Also understand that these fields occur 14400 times which allows the system to track viewing activity on a second-by-second basis for all 4 hours of the video program.

The definition provided herein will be relevant to the similarly named fields at the Video Program Airing level and the Video Program Airing Segment Airing level.

Claims Reference: The following fields 5150 to 5246 record the Second-by-Second Video Program Viewing Metrics.

| | | | | |
|---|---|---|---|---|
| 5150~ | VP-ACTUAL-SECOND-OF-PROGAM | NUMBER | 5 | Actual Second of the Program records the actual second in the video content during which this activity occurred. |

FIG. 17 - Video Program Viewing Activity Data Structure - Continued

| | | | | |
|---|---|---|---|---|
| 5154~ | VP-VIEWING-DEVICE-COUNT | NUMBER | 7 | Viewing Device Count records the number of devices that viewed this second of the video asset. |
| | Adjusted Counts adjust viewing for this second taking into consideration the various Adjustment Factors.<br>These are calculated in FIG 16 part 825.<br><br>These are calculated in FIG 22 part 965. | | | |
| 5156~ | VP-ADJ-TOTAL-VIEWING-COUNT | NUMBER | 7 | Adjusted Total Viewing Count records is the adjusted viewing for this second. It is the sum of all the adjusted viewing activity for this second of the program. |
| 5158~ | VP-ADJ-PL-MODE-COUNT | NUMBER | 7 | Adjusted Play Mode Count records the total amount of play mode activity that occurred during this second after factoring in various Adjustment Factors. |
| 5162~ | VP-ADJ-SK-MODE-COUNT | NUMBER | 7 | Adjusted Skip Mode Count records the total amount of skip mode activity that occurred during this second after factoring in various Adjustment Factors. |
| 5166~ | VP-ADJ-SP-MODE-COUNT | NUMBER | 7 | Adjusted Slow Play Mode Count records the total amount of slow play mode activity that occurred during this second after factoring in various Adjustment Factors. |
| 5170~ | VP-ADJ-F1-MODE-COUNT | NUMBER | 7 | Adjusted Forward 1x Mode Count records the total amount of Forward 1x mode activity that occurred during this second after factoring in various Adjustment Factors. |
| 5174~ | VP-ADJ-F2-MODE-COUNT | NUMBER | 7 | Adjusted Forward 2x Mode Count records the total amount of Forward 2x mode activity that occurred during this second after factoring in various Adjustment Factors. |
| 5178~ | VP-ADJ-F3-MODE-COUNT | NUMBER | 7 | Adjusted Forward 3x Mode Count records the total amount of Forward 3x mode activity that occurred during this second after factoring in various Adjustment Factors. |

FIG. 17 - Video Program Viewing Activity Data Structure - Continued

| | | | | |
|---|---|---|---|---|
| 5182~ | VP-ADJ-F4-MODE-COUNT | NUMBER | 7 | Adjusted Forward 4x Mode Count records the total amount of Forward 4x mode activity that occurred during this second after factoring in various Adjustment Factors. |
| 5186~ | VP-ADJ-SR-MODE-COUNT | NUMBER | 7 | Adjusted Slow Reverse Mode Count records the total amount of slow reverse mode activity that occurred during this second after factoring in various Adjustment Factors. |
| 5190~ | VP-ADJ-R1-MODE-COUNT | NUMBER | 7 | Adjusted Reverse 1x Mode Count records the total amount of Reverse 1x mode activity that occurred during this second after factoring in various Adjustment Factors. |
| 5194~ | VP-ADJ-R2-MODE-COUNT | NUMBER | 7 | Adjusted Reverse 2x Mode Count records the total amount of Reverse 2x mode activity that occurred during this second after factoring in various Adjustment Factors. |
| 5198~ | VP-ADJ-R3-MODE-COUNT | NUMBER | 7 | Adjusted Reverse 3x Mode Count records the total amount of Reverse 3x mode activity that occurred during this second after factoring in various Adjustment Factors. |
| 5202~ | VP-ADJ-R4-MODE-COUNT | NUMBER | 7 | Adjusted Reverse 4x Mode Count records the total amount of Reverse 4x mode activity that occurred during this second after factoring in various Adjustment Factors. |

Raw Counts are unadjusted or raw data. This allows the analyst to see the original data values before they were adjusted by the various Adjustment Factors.
These are calculated in FIG 16 part 825.

FIG. 17 - Video Program Viewing Activity Data Structure - Continued

| | | | | |
|---|---|---|---|---|
| 5204~ | VP-RAW-TOTAL-VIEWING-COUNT | NUMBER | 7 | Raw Total Viewing Count records the total amount of viewing activity that occurred during this second before applying any Adjustment Factors to the viewing activity. |
| 5206~ | VP-RAW-PL-MODE-COUNT | NUMBER | 7 | Raw Play Mode Count records the total amount of Play Mode viewing activity that occurred during this second before applying any Adjustment Factors to the viewing activity. |
| 5210~ | VP-RAW-SK-MODE-COUNT | NUMBER | 7 | Raw Skip Mode Count records the total amount of Skip Mode viewing activity that occurred during this second before applying any Adjustment Factors to the viewing activity. |
| 5214~ | VP-RAW-SP-MODE-COUNT | NUMBER | 7 | Raw Slow Play Mode Count records the total amount of Slow Play Mode viewing activity that occurred during this second before applying any Adjustment Factors to the viewing activity. |
| 5218~ | VP-RAW-F1-MODE-COUNT | NUMBER | 7 | Raw Forward 1x Mode Count records the total amount of Forward 1x Mode viewing activity that occurred during this second before applying any Adjustment Factors to the viewing activity. |
| 5222~ | VP-RAW-F2-MODE-COUNT | NUMBER | 7 | Raw Forward 2x Mode Count records the total amount of Forward 2x Mode viewing activity that occurred during this second before applying any Adjustment Factors to the viewing activity. |
| 5226~ | VP-RAW-F3-MODE-COUNT | NUMBER | 7 | Raw Forward 3x Mode Count records the total amount of Forward 3x Mode viewing activity that occurred during this second before applying any Adjustment Factors to the viewing activity. |
| 5230~ | VP-RAW-F4-MODE-COUNT | NUMBER | 7 | Raw Forward 4x Mode Count records the total amount of Forward 4x Mode viewing activity that occurred during this second before applying any Adjustment Factors to the viewing activity. |

FIG. 17 - Video Program Viewing Activity Data Structure - Continued

| | | | | |
|---|---|---|---|---|
| 5234~ | VP-RAW-SR-MODE-COUNT | NUMBER | 7 | Raw Slow Reverse Mode Count records the total amount of Slow Reverse Mode viewing activity that occurred during this second before applying any Adjustment Factors to the viewing activity. |
| 5236~ | VP-RAW-R1-MODE-COUNT | NUMBER | 7 | Raw Reverse 1x Mode Count records the total amount of Reverse 1x Mode viewing activity that occurred during this second before applying any Adjustment Factors to the viewing activity. |
| 5240~ | VP-RAW-R2-MODE-COUNT | NUMBER | 7 | Raw Reverse 2x Mode Count records the total amount of Reverse 2x Mode viewing activity that occurred during this second before applying any Adjustment Factors to the viewing activity. |
| 5244~ | VP-RAW-R3-MODE-COUNT | NUMBER | 7 | Raw Reverse 3x Mode Count records the total amount of Reverse 3x Mode viewing activity that occurred during this second before applying any Adjustment Factors to the viewing activity. |
| 5246~ | VP-RAW-R4-MODE-COUNT | NUMBER | 7 | Raw Reverse 4x Mode Count records the total amount of Reverse 4x Mode viewing activity that occurred during this second before applying any Adjustment Factors to the viewing activity. |

FIG. 19 - Video Program Airing Viewing Activity Data Structure

| | NAME | TYPE | SIZE | DESCRIPTION |
|---|---|---|---|---|
| 5410~ | VPA-VIDEO-PROGRAM-ID | NUMBER | 9 | For Linear, this is populated from:<br>Video Viewing Event File FIG 15-A<br>IN-VP-VIDEO-PROGRAM-ID 4105.<br>For DVR and VOD, this is populated from FIG 15-B:<br>IN-VP-VIDEO-PROGRAM-ID 4805 |
| 5412~ | VPA-VIEWING-ACTIVITY-TYPE | CHAR | 3 | Viewing Activity Type indicates the type of viewing activity: Linear, DVR, VOD.<br>Populated from:<br>For Linear viewing:<br>IN-VIEWING-ACTIVITY-TYPE 4108<br>(Ref FIG 15-A)<br>For DVR and VOD viewing:<br>IN-VIEWING-ACTIVITY-TYPE 4808<br>(Ref FIG 15-B) |
| | The following fields occur four times to allow for four airings of a video asset to be processed. The source of each field is identified. The definition can be found at the source. | | | |
| 5414~ | VPA-VIDEO-PROGRAM-AIRING-ID | NUMBER | 9 | Populated from:<br>IN-VPA-VIDEO-PROGRAM-AIRING-ID 4510 (Ref FIG 11) |
| 5418~ | VPA-CHANNEL-CALL-SIGN | CHAR | 10 | Populated from:<br>IN-VPA-CHANNEL-CALL-SIGN 4530 (Ref FIG 11) |
| 5422~ | VPA-CHANNEL-SOURCE-ID | NUMBER | 5 | Populated from:<br>IN-VPA-CHANNEL-SOURCE-ID 4540 (Ref FIG 11) |
| 5424~ | VPA-STATION-IDENTIFIER | CHAR | 10 | Populated from:<br>IN-VPA-PGM-AIRING-END-DATETIME 4545 (Ref FIG 11) |
| 5426~ | VPA-PROG-AIRING-BEG-DATETIME | datetime | | Populated from:<br>IN-VPA-PGM-AIRING-BEG-DATETIME 4550 (Ref FIG 11) |
| 5432~ | VPA-PROG-AIRING-END-DATETIME | datetime | | Populated from:<br>IN-VPA-PGM-AIRING-END-DATETIME 4560 (Ref FIG 11) |

FIG. 19 - Video Program Airing Viewing Activity Data Structure - Continued

| | | | | |
|---|---|---|---|---|
| | The following fields occur 20 times within the context of a Video Program Airing so that each airing of the video program is allowed up to 20 instances of the following fields. This allows the system to track viewing of this airing of the program at the level of a combination of Demographic Code + Geographic Code + Video Device Type for the Viewing Activity Type. | | | |
| | When the user sets up the study they are able to define the various combinations of Demographic Code + Geographic Code + Video Device Type that they are interested in tracking. The system will then capture the viewing for those breakouts. Each of the Demographic Code + Geographic Code + Video Device Type combinations will be applied to each airing of the video asset. | | | |
| 5436~ | VPA-HOUSE-DEMOGRAPHIC-CODE | Char | 8 | Populated from: For Linear viewing: IN-HDVR-HOUSE-DEMOGRAPHIC-CODE 4125 (Ref FIG 15-A) For DVR and VOD viewing: IN-HDVR-HOUSE-DEMOGRAPHIC-CODE 4845 (Ref FIG 15-B) |
| 5438~ | VPA-HOUSE-GEOGRAPHIC-CODE | Char | 8 | Populated from: For Linear viewing: IN-HDVR-HOUSE-GEOGRAPHIC-CODE 4130 (Ref FIG 15-A) For DVR and VOD viewing: IN-HDVR-HOUSE-GEOGRAPHIC-CODE 4850 (Ref FIG 15-B) |
| 5442~ | VPA-VIDEO-VIEW-DEVICE-TYPE-CD | Char | 8 | Populated from: For Linear viewing: IN-HDVR-VIDEO-VIEW-DEV-TYPE-CD 4135 (Ref FIG 15-A) For DVR and VOD viewing: IN-HDVR-VIDEO-VIEW-DEV-TYPE-CD 4855 (Ref FIG 15-B) |
| | Note to the reader: The fields below should be understood in the context of calculating viewing activity for one Demographic Code + Geographic Code + Video Device Type combination for one airing of a video asset. For example, VPA-PL-MODE-BEG-TO-END-COUNT is Play Mode Beginning to End Count is a count of the number of viewing devices that were in play mode for the entire duration of the video asset airing and where the viewing activity is identified by the indicated Demographic Code + Geographic Code + Video Device Type combination for the Viewing Activity Type. These fields generally have the same definition as the similarly named fields at the Video Program level except that these are at the Video Program Airing level + Demographic Code + Geographic Code + Video Device Type combination level. These are calculated in FIG 18 part 880. Claims Reference: The following fields 5446 to 5546 record the Program Airing Level Video Program Airing Viewing Metrics. | | | |

FIG. 19 - Video Program Airing Viewing Activity Data Structure - Continued

| | | | | |
|---|---|---|---|---|
| 5446~ | VPA-PL-MODE-BEG-TO-END-COUNT | NUMBER | 7 | Play Mode Beginning to End Count. |
| 5452~ | VPA-SK-MODE-BEG-TO-END-COUNT | NUMBER | 7 | Skip Mode Beginning to End Count. |
| 5456~ | VPA-SP-MODE-BEG-TO-END-COUNT | NUMBER | 7 | Slow Play Mode Beginning to End Count. |
| 5460~ | VPA-F1-MODE-BEG-TO-END-COUNT | NUMBER | 7 | Forward 1x Mode Beginning to End Count. |
| 5464~ | VPA-F2-MODE-BEG-TO-END-COUNT | NUMBER | 7 | Forward 2x Mode Beginning to End Count. |
| 5468~ | VPA-F3-MODE-BEG-TO-END-COUNT | NUMBER | 7 | Forward 3x Mode Beginning to End Count. |
| 5472~ | VPA-F4-MODE-BEG-TO-END-COUNT | NUMBER | 7 | Forward 4x Mode Beginning to End Count. |
| 5476~ | VPA-SR-MODE-BEG-TO-END-COUNT | NUMBER | 7 | Slow Reverse Mode Beginning to End Count. |
| 5480~ | VPA-R1-MODE-BEG-TO-END-COUNT | NUMBER | 7 | Reverse 1x Mode Beginning to End Count. |
| 5484~ | VPA-R2-MODE-BEG-TO-END-COUNT | NUMBER | 7 | Reverse 2x Mode Beginning to End Count. |
| 5488~ | VPA-R3-MODE-BEG-TO-END-COUNT | NUMBER | 7 | Reverse 3x Mode Beginning to End Count. |
| 5492~ | VPA-R4-MODE-BEG-TO-END-COUNT | NUMBER | 7 | Reverse 4x Mode Beginning to End Count. |
| 5496~ | VPA-VIEW-MIN-SECS-IN-PLAY-CNT | NUMBER | 7 | Viewed Minimum Seconds in Play Count. |
| | The following fields track counts of seconds at the Video Program Airing level for the various kinds of activities which may occur during video asset viewing. These are calculated in FIG 18 part 875. | | | |
| 5500~ | VPA-AGGR-ADJUSTED-VIEW-SECS | NUMBER | 12 | Aggregate Adjusted Viewing Seconds. |
| 5504~ | VPA-AGGR-PL-MODE-VIEW-SECS | NUMBER | 12 | Aggregate Play Mode Viewing Seconds. |
| 5508~ | VPA-AGGR-SK-MODE-VIEW-SECS | NUMBER | 12 | Aggregate Skip Mode Viewing Seconds. |
| 5512~ | VPA-AGGR-SP-MODE-VIEW-SECS | NUMBER | 12 | Aggregate Slow Play Mode Viewing Seconds. |
| 5516~ | VPA-AGGR-F1-MODE-VIEW-SECS | NUMBER | 12 | Aggregate Forward 1x Mode Viewing Seconds. |
| 5520~ | VPA-AGGR-F2-MODE-VIEW-SECS | NUMBER | 12 | Aggregate Forward 2x Mode Viewing Seconds. |

FIG. 19 - Video Program Airing Viewing Activity Data Structure - Continued

| | | | | |
|---|---|---|---|---|
| 5524~ | VPA-AGGR-F3-MODE-VIEW-SECS | NUMBER | 12 | Aggregate Forward 3x Mode Viewing Seconds. |
| 5528~ | VPA-AGGR-F4-MODE-VIEW-SECS | NUMBER | 12 | Aggregate Forward 4x Mode Viewing Seconds. |
| 5532~ | VPA-AGGR-SR-MODE-VIEW-SECS | NUMBER | 12 | Aggregate Slow Reverse Mode Viewing Seconds . |
| 5536~ | VPA-AGGR-R1-MODE-VIEW-SECS | NUMBER | 12 | Aggregate Reverse 1x Mode Viewing Seconds. |
| 5540~ | VPA-AGGR-R2-MODE-VIEW-SECS | NUMBER | 12 | Aggregate Reverse 2x Mode Viewing Seconds. |
| 5544~ | VPA-AGGR-R3-MODE-VIEW-SECS | NUMBER | 12 | Aggregate Reverse 3x Mode Viewing Seconds. |
| 5546~ | VPA-AGGR-R4-MODE-VIEW-SECS | NUMBER | 12 | Aggregate Reverse 4x Mode Viewing Seconds. |

The following fields occur 14400 times. This allows second-by-second data for four hours.

Note to the reader: The fields below should be understood in the context of calculating viewing activity for one Demographic Code + Geographic Code + Video Device Type combination for one airing of a video asset, for all the devices included in the data set for the Viewing Activity Type. For example, `VPA-ADJ-PL-MODE-COUNT` is Adjusted Play Mode Count which is a count of the number of viewing seconds in Play mode that were earned for the indicated second of this airing of the video asset across all the viewing devices whose activity is being calculated and within the context of Demographic Code + Geographic Code + Video Device Type combinations.

To recall the hierarchy, for the Viewing Activity Type, the system is tracking:

Video Program
  Up to 4 Video Program Airings
    Up to 20 Demographic Code + Geographic Code + Video Device Type combinations
      Up to 14400 seconds of viewing activity.

Also understand that these fields occur 14400 times which allows the system to track viewing activity on a second-by-second basis for all the seconds of the program up to 14400 seconds in duration for each airing of the video program within the context of a Demographic Code + Geographic Code + Video Device Type combinations.

These fields generally have a definition corresponding to the similarly named fields at the Video Program level except that these are at the Video Program Airing level.

Claims Reference: The following fields 5550 to 5646 record the Second-by-Second Video Program Airing Viewing Metrics.

FIG. 19 - Video Program Airing Viewing Activity Data Structure - Continued

| | | | | |
|---|---|---|---|---|
| 5550~ | VPA-ACTUAL-SECOND-OF-PROGAM | NUMBER | 5 | Actual Second of the Program |
| 5554~ | VPA-VIEWING-DEVICE-COUNT | NUMBER | 7 | Viewing Device Count |
| | Adjusted Counts adjust viewing for this second taking into consideration the various Adjustment Factors.<br>These are calculated in FIG 18 part 875. | | | |
| 5556~ | VPA-ADJ-TOTAL-VIEWING-COUNT | NUMBER | 7 | Adjusted Total Viewing Count. |
| 5558~ | VPA-ADJ-PL-MODE-COUNT | NUMBER | 7 | Adjusted Play Mode Count. |
| 5562~ | VPA-ADJ-SK-MODE-COUNT | NUMBER | 7 | Adjusted Skip Mode Count. |
| 5566~ | VPA-ADJ-SP-MODE-COUNT | NUMBER | 7 | Adjusted Slow Play Mode Count. |
| 5570~ | VPA-ADJ-F1-MODE-COUNT | NUMBER | 7 | Adjusted Forward 1x Mode Count. |
| 5574~ | VPA-ADJ-F2-MODE-COUNT | NUMBER | 7 | Adjusted Forward 2x Mode Count. |
| 5578~ | VPA-ADJ-F3-MODE-COUNT | NUMBER | 7 | Adjusted Forward 3x Mode Count. |
| 5582~ | VPA-ADJ-F4-MODE-COUNT | NUMBER | 7 | Adjusted Forward 4x Mode Count. |
| 5586~ | VPA-ADJ-SR-MODE-COUNT | NUMBER | 7 | Adjusted Slow Reverse Mode Count. |
| 5590~ | VPA-ADJ-R1-MODE-COUNT | NUMBER | 7 | Adjusted Reverse 1x Mode Count. |
| 5594~ | VPA-ADJ-R2-MODE-COUNT | NUMBER | 7 | Adjusted Reverse 2x Mode Count. |
| 5598~ | VPA-ADJ-R3-MODE-COUNT | NUMBER | 7 | Adjusted Reverse 3x Mode Count. |
| 5602~ | VPA-ADJ-R4-MODE-COUNT | NUMBER | 7 | Adjusted Reverse 4x Mode Count. |
| | Raw Counts are unadjusted or raw data. This allows the analyst to see the original data values before they were adjusted by the various Adjustment Factors.<br>These are calculated in FIG 18 part 875. | | | |
| 5604~ | VPA-RAW-TOTAL-VIEWING-COUNT | NUMBER | 7 | Raw Total Viewing Count. |
| 5606~ | VPA-RAW-PL-MODE-COUNT | NUMBER | 7 | Raw Play Mode Count. |
| 5610~ | VPA-RAW-SK-MODE-COUNT | NUMBER | 7 | Raw Skip Mode Count. |
| 5614~ | VPA-RAW-SP-MODE-COUNT | NUMBER | 7 | Raw Slow Play Mode Count. |

FIG. 19 - Video Program Airing Viewing Activity Data Structure - Continued

| | | | | |
|---|---|---|---|---|
| 5618~ | VPA-RAW-F1-MODE-COUNT | NUMBER | 7 | Raw Forward 1x Mode Count. |
| 5622~ | VPA-RAW-F2-MODE-COUNT | NUMBER | 7 | Raw Forward 2x Mode Count. |
| 5626~ | VPA-RAW-F3-MODE-COUNT | NUMBER | 7 | Raw Forward 3x Mode Count. |
| 5630~ | VPA-RAW-F4-MODE-COUNT | NUMBER | 7 | Raw Forward 4x Mode Count. |
| 5634~ | VPA-RAW-SR-MODE-COUNT | NUMBER | 7 | Raw Slow Reverse Mode Count. |
| 5636~ | VPA-RAW-R1-MODE-COUNT | NUMBER | 7 | Raw Reverse 1x Mode Count. |
| 5640~ | VPA-RAW-R2-MODE-COUNT | NUMBER | 7 | Raw Reverse 2x Mode count. |
| 5644~ | VPA-RAW-R3-MODE-COUNT | NUMBER | 7 | Raw Reverse 3x Mode Count. |
| 5646~ | VPA-RAW-R4-MODE-COUNT | NUMBER | 7 | Raw Reverse 4x Mode Count. |

FIG. 21 - Video Program Airing Segment Viewing Activity Data Structure

| | NAME | TYPE | SIZE | DESCRIPTION |
|---|---|---|---|---|
| 5810~ | VPAS-VIDEO-PROGRAM-ID | NUMBER | 9 | For Linear, this is populated from:<br>Video Viewing Event File FIG 15-A<br>IN-VP-VIDEO-PROGRAM-ID 4105.<br>For DVR and VOD, this is populated from FIG 15-B:<br>IN-VP-VIDEO-PROGRAM-ID 4805 |
| 5812~ | VPAS-VIEWING-ACTIVITY-TYPE | CHAR | 3 | Viewing Activity Type indicates the type of viewing activity: Linear, DVR, VOD. Populated from:<br>For Linear viewing:<br>IN-VIEWING-ACTIVITY-TYPE 4108<br>(Ref FIG 15-A)<br>For DVR and VOD viewing:<br>IN-VIEWING-ACTIVITY-TYPE 4808<br>(Ref FIG 15-B) |
| 5813~ | VPAS-VIEWING-STATS-DATE | DATE | | The date of when these statistics were generated |
| | The following fields occur four times to allow for four airings of a video asset to be processed. The source of each field is identified. The definition can be found at the source. | | | |
| 5814~ | VPAS-VIDEO-PROGRAM-AIRING-ID | Number | 9 | Populated from:<br>IN-VPA-VIDEO-PROGRAM-AIRING-ID<br>4510 (Ref FIG 11) |
| | The following fields occur 60 times within the context of a Video Program Airing so that each airing of the video program is allowed up to 60 instances of the following fields. This allows the system to track viewing of up to 60 segments that are defined for this airing of this video program. A segment will typically define a commercial break. | | | |
| 5816~ | VPAS-VIDEO-PROGRAM-SEGMENT-ID | NUMBER | 9 | Populated from:<br>Video Program Segment Data Structure<br>(Ref FIG 13-B)<br>VIDEO-PROGRAM-SEGMENT-ID 4720 |
| 5818~ | VPAS-SEGMENT-LOCATION | NUMBER | 3 | Populated from:<br>Video Program Segment Data Structure<br>(Ref FIG 13-B)<br>VPS-SEGMENT-LOCATION 4730 |
| 5819~ | VPAS-ALLOW-TARGETING-DURING-SEG | CHAR | 1 | Populated from:<br>Video Program Segment Data Structure<br>(Ref FIG 13-B)<br>VPS-ALLOW-TRGT-DURING-SEG-IND 4780 |

FIG. 21 - Video Program Airing Segment Viewing Activity Data Structure - Continued

| | | | | |
|---|---|---|---|---|
| 5820~ | VPAS-SEG-BEG-TIME-SEC-IN-PGM | NUMBER | 5 | Populated from:<br>Video Program Segment Data Structure (Ref FIG 13-B)<br>VPS-SEG-END-TIME-SEC-IN-PGM 4740 |
| 5822~ | VPAS-SEG-END-TIME-SEC-IN-PGM | NUMBER | 5 | Populated from:<br>Video Program Segment Data Structure (Ref FIG 13-B)<br>VPS-SEG-END-TIME-SEC-IN-PGM 4750 |
| 5824~ | VPAS-SEG-DURATION-IN-SECONDS | NUMBER | 5 | Populated from:<br>Video Program Segment Data Structure (Ref FIG 13-B)<br>VPS-SEG-DURATION-IN-SECONDS 4760 |
| 5826~ | VPAS-MIN-SECONDS-FOR-EXPOSURE | NUMBER | 5 | Populated from:<br>Video Program Segment Data Structure (Ref FIG 13-B)<br>VPS-MIN-SECONDS-FOR-EXPOSURE 4770 |
| 5828~ | VPAS-ALLOW-TRGT-DURING-SEG-IND | Char | 1 | Populated from:<br>Video Program Segment Data Structure (Ref FIG 13-B)<br>VPS-ALLOW-TRGT-DURING-SEG-IND 4780 |
| 5830~ | VPAS-SEGMENT-POSITION | NUMBER | 3 | Populated from:<br>Video Program Segment Data Structure (Ref FIG 13-B)<br>VPS-SEGMENT-POSITION 4730 |
| | colspan="4" | The following fields occur 20 times within the context of a Video Program Segment Airing so that each airing of the video program segment airing is allowed up to 20 instances of the following fields. This allows the system to track viewing of this airing of segment of the airing of the program at the level of a combination of Demographic Code + Geographic Code + Video Device Type.<br>When the user sets up the study they are able to define the various combinations of Demographic Code + Geographic Code + Video Device Type that they are interested in tracking. The system will then capture the viewing for those breakouts. Each of the Demographic Code + Geographic Code + Video Device Type combinations will be applied to each airing of segment of the video asset. |

FIG. 21 - Video Program Airing Segment Viewing Activity Data Structure - Continued

| | | | | |
|---|---|---|---|---|
| 5836~ | VPAS-HOUSE-DEMOGRAPHIC-CODE | Char | 8 | Populated from:<br>For Linear viewing:<br>IN-HDVR-HOUSE-DEMOGRAPHIC-CODE 4125 (Ref FIG 15-A)<br>For DVR and VOD viewing:<br>IN-HDVR-HOUSE-DEMOGRAPHIC-CODE 4845 (Ref FIG 15-B) |
| 5838~ | VPAS-HOUSE-GEOGRAPHIC-CODE | Char | 8 | Populated from:<br>For Linear viewing:<br>IN-HDVR-HOUSE-GEOGRAPHIC-CODE 4130 (Ref FIG 15-A)<br>For DVR and VOD viewing:<br>IN-HDVR-HOUSE-GEOGRAPHIC-CODE 4850 (Ref FIG 15-B) |
| 5842~ | VPAS-VIDEO-VIEW-DEVICE-TYPE-CD | Char | 8 | Populated from:<br>For Linear viewing:<br>IN-HDVR-VIDEO-VIEW-DEV-TYPE-CD 4135 (Ref FIG 15-A)<br>For DVR and VOD viewing:<br>IN-HDVR-VIDEO-VIEW-DEV-TYPE-CD 4855 (Ref FIG 15-B) |
| | Note to the reader: The fields below should be understood in the context of calculating viewing activity for one Demographic Code + Geographic Code + Video Device Type combinations for one segment in the airing of a video asset. For example, VPAS-PL-MODE-BEG-TO-END-COUNT is Play Mode Beginning to End Count is a count of the number of viewing devices that were in play mode for the entire duration of the segment of the video asset airing and where the viewing activity is identified by the indicated Demographic Code + Geographic Code + Video Device Type combination. These fields generally have the same definition as the similarly named fields at the Video Program Airing level except that these are at the Video Program Segment Airing level + Demographic Code + Geographic Code + Video Device Type combination level. | | | |
| | The following fields track activity that happens for the entire duration of the segment for the airing of the video asset.<br>These are calculated in FIG 20 part 935.<br><br>Claims Reference: The following fields 5846 to 5946 record the Program Airing Segment Level Video Program Airing Segment Viewing Metrics. | | | |
| 5846~ | VPAS-PL-MODE-BEG-TO-END-COUNT | NUMBER | 7 | Play Mode Beginning to End Count. |
| 5850~ | VPAS-VIEW-MIN-SECS-IN-PLAY-CNT | NUMBER | 7 | Viewed Minimum Seconds in Play Count. |

FIG. 21 - Video Program Airing Segment Viewing Activity Data Structure - Continued

| | | | | |
|---|---|---|---|---|
| 5852~ | VPAS-SK-MODE-BEG-TO-END-COUNT | NUMBER | 7 | Skip Mode Beginning to End Count. |
| 5856~ | VPAS-SP-MODE-BEG-TO-END-COUNT | NUMBER | 7 | Slow Play Mode Beginning to End Count. |
| 5860~ | VPAS-F1-MODE-BEG-TO-END-COUNT | NUMBER | 7 | Forward 1x Mode Beginning to End Count. |
| 5864~ | VPAS-F2-MODE-BEG-TO-END-COUNT | NUMBER | 7 | Forward 2x Mode Beginning to End Count. |
| 5868~ | VPAS-F3-MODE-BEG-TO-END-COUNT | NUMBER | 7 | Forward 3x Mode Beginning to End Count. |
| 5872~ | VPAS-F4-MODE-BEG-TO-END-COUNT | NUMBER | 7 | Forward 4x Mode Beginning to End Count. |
| 5876~ | VPAS-SR-MODE-BEG-TO-END-COUNT | NUMBER | 7 | Slow Reverse Mode Beginning to End Count. |
| 5880~ | VPAS-R1-MODE-BEG-TO-END-COUNT | NUMBER | 7 | Reverse 1x Mode Beginning to End Count. |
| 5884~ | VPAS-R2-MODE-BEG-TO-END-COUNT | NUMBER | 7 | Reverse 2x Mode Beginning to End Count. |
| 5888~ | VPAS-R3-MODE-BEG-TO-END-COUNT | NUMBER | 7 | Reverse 3x Mode Beginning to End Count. |
| 5892~ | VPAS-R4-MODE-BEG-TO-END-COUNT | NUMBER | 7 | Reverse 4x Mode Beginning to End Count. |
| | The following fields track counts of seconds at the Video Program Airing Segment level for the various kinds of activities which may occur during video asset viewing. These are calculated in FIG 20 part 930. | | | |
| 5900~ | VPAS-AGGR-ADJUSTED-VIEW-SECS | NUMBER | 12 | Aggregate Adjusted Viewing Seconds. |
| 5904~ | VPAS-AGGR-PL-MODE-VIEW-SECS | NUMBER | 12 | Aggregate Play Mode Viewing Seconds. |
| 5908~ | VPAS-AGGR-SK-MODE-VIEW-SECS | NUMBER | 12 | Aggregate Skip Mode Viewing Seconds. |
| 5912~ | VPAS-AGGR-SP-MODE-VIEW-SECS | NUMBER | 12 | Aggregate Slow Play Mode Viewing Seconds. |
| 5916~ | VPAS-AGGR-F1-MODE-VIEW-SECS | NUMBER | 12 | Aggregate Forward 1x Mode Viewing Seconds. |
| 5920~ | VPAS-AGGR-F2-MODE-VIEW-SECS | NUMBER | 12 | Aggregate Forward 2x Mode Viewing Seconds. |
| 5924~ | VPAS-AGGR-F3-MODE-VIEW-SECS | NUMBER | 12 | Aggregate Forward 3x Mode Viewing Seconds. |
| 5928~ | VPAS-AGGR-F4-MODE-VIEW-SECS | NUMBER | 12 | Aggregate Forward 4x Mode Viewing Seconds. |

FIG. 21 - Video Program Airing Segment Viewing Activity Data Structure - Continued

| | | | | |
|---|---|---|---|---|
| 5932~ | VPAS-AGGR-SR-MODE-VIEW-SECS | NUMBER | 12 | Aggregate Slow Reverse Mode Viewing Seconds . |
| 5936~ | VPAS-AGGR-R1-MODE-VIEW-SECS | NUMBER | 12 | Aggregate Reverse 1x Mode Viewing Seconds. |
| 5940~ | VPAS-AGGR-R2-MODE-VIEW-SECS | NUMBER | 12 | Aggregate Reverse 2x Mode Viewing Seconds. |
| 5944~ | VPAS-AGGR-R3-MODE-VIEW-SECS | NUMBER | 12 | Aggregate Reverse 3x Mode Viewing Seconds. |
| 5946~ | VPAS-AGGR-R4-MODE-VIEW-SECS | NUMBER | 12 | Aggregate Reverse 4x Mode Viewing Seconds. |

```
The following fields occur 60 times. This allows second-by-second
tracking for each second of the 60 one-minute segments that may be
defined.
```

Note to the reader: The fields below should be understood in the context of calculating viewing activity for one Demographic Code + Geographic Code + Video Device Type combinations for one airing of a video asset segment, for all the devices included in the data set.

To recall the hierarchy, for a Viewing Activity Type, the system is tracking:

Video Program
  Up to 4 Video Program Airings
    Up to 60 Segments of 1 minute each
      Up to 20 Demographic Code + Geographic Code + Video Device Type combinations
        Up to 60 seconds of viewing activity.

For example, VPAS-ADJ-PL-MODE-COUNT is Adjusted Play Mode Count which is a count of the number of viewing seconds in Play mode that were earned for the indicated second of this airing of the video asset segment across all the viewing devices whose activity is being tabulated and within the context of Demographic Code + Geographic Code + Video Device Type combinations.

Also understand that these fields occur 60 times which allows the system to track viewing activity on a second-by-second basis for all 60 seconds of the program segment.

These fields generally have a definition corresponding to the similarly named fields at the Video Program Airing level except that these are at the Video Program Airing Segment level.

Claims Reference: The following fields 5950 to 6046 record the Second-by-Second Video Program Airing Segment Viewing Metrics.

FIG. 21 - Video Program Airing Segment Viewing Activity Data Structure - Continued

| | | | | |
|---|---|---|---|---|
| 5950~ | VPAS-ACTUAL-SECOND-OF-PROGAM | NUMBER | 5 | Actual Second of the Program identifies the second of the program during which this viewing activity occurred. |
| 5954~ | VPAS-VIEWING-DEVICE-COUNT | NUMBER | 7 | Viewing Device Count records the number of devices that viewed this second of the video asset. |
| | Adjusted Counts adjust viewing for this second taking into consideration the various Adjustment Factors.<br>These are calculated in FIG 20 part 930. | | | |
| 5956~ | VPAS-ADJ-TOTAL-VIEWING-COUNT | NUMBER | 7 | Adjusted Total Viewing Count. |
| 5958~ | VPAS-ADJ-PL-MODE-COUNT | NUMBER | 7 | Adjusted Play Mode Count. |
| 5962~ | VPAS-ADJ-SK-MODE-COUNT | NUMBER | 7 | Adjusted Skip Mode Count. |
| 5966~ | VPAS-ADJ-SP-MODE-COUNT | NUMBER | 7 | Adjusted Slow Play Mode Count. |
| 5970~ | VPAS-ADJ-F1-MODE-COUNT | NUMBER | 7 | Adjusted Forward 1x Mode Count. |
| 5974~ | VPAS-ADJ-F2-MODE-COUNT | NUMBER | 7 | Adjusted Forward 2x Mode Count. |
| 5978~ | VPAS-ADJ-F3-MODE-COUNT | NUMBER | 7 | Adjusted Forward 3x Mode Count. |
| 5982~ | VPAS-ADJ-F4-MODE-COUNT | NUMBER | 7 | Adjusted Forward 4x Mode Count. |
| 5986~ | VPAS-ADJ-SR-MODE-COUNT | NUMBER | 7 | Adjusted Slow Reverse Mode Count. |
| 5990~ | VPAS-ADJ-R1-MODE-COUNT | NUMBER | 7 | Adjusted Reverse 1x Mode Count. |
| 5994~ | VPAS-ADJ-R2-MODE-COUNT | NUMBER | 7 | Adjusted Reverse 2x Mode Count. |
| 5998~ | VPAS-ADJ-R3-MODE-COUNT | NUMBER | 7 | Adjusted Reverse 3x Mode Count. |
| 6002~ | VPAS-ADJ-R4-MODE-COUNT | NUMBER | 7 | Adjusted Reverse 4x Mode Count. |
| | Raw Counts are unadjusted or raw data. This allows the analyst to see the original data values before they were adjusted by the various Adjustment Factors.<br>These are calculated in FIG 20 part 930. | | | |
| 6004~ | VPAS-RAW-TOTAL-VIEWING-COUNT | NUMBER | 7 | Raw Total Viewing Count. |
| 6006~ | VPAS-RAW-PL-MODE-COUNT | NUMBER | 7 | Raw Play Mode Count. |

FIG. 21 - Video Program Airing Segment Viewing Activity Data Structure - Continued

| | | | | |
|---|---|---|---|---|
| 6010~ | VPAS-RAW-SK-MODE-COUNT | NUMBER | 7 | Raw Skip Mode Count. |
| 6014~ | VPAS-RAW-SP-MODE-COUNT | NUMBER | 7 | Raw Slow Play Mode Count. |
| 6018~ | VPAS-RAW-F1-MODE-COUNT | NUMBER | 7 | Raw Forward 1x Mode Count. |
| 6022~ | VPAS-RAW-F2-MODE-COUNT | NUMBER | 7 | Raw Forward 2x Mode Count. |
| 6026~ | VPAS-RAW-F3-MODE-COUNT | NUMBER | 7 | Raw Forward 3x Mode Count. |
| 6030~ | VPAS-RAW-F4-MODE-COUNT | NUMBER | 7 | Raw Forward 4x Mode Count. |
| 6034~ | VPAS-RAW-SR-MODE-COUNT | NUMBER | 7 | Raw Slow Reverse Mode Count. |
| 6036~ | VPAS-RAW-R1-MODE-COUNT | NUMBER | 7 | Raw Reverse 1x Mode Count. |
| 6040~ | VPAS-RAW-R2-MODE-COUNT | NUMBER | 7 | Raw Reverse 2x Mode Count. |
| 6044~ | VPAS-RAW-R3-MODE-COUNT | NUMBER | 7 | Raw Reverse 3x Mode Count. |
| 6046~ | VPAS-RAW-R4-MODE-COUNT | NUMBER | 7 | Raw Reverse 4x Mode Count. |

File Name: 71-playback-statistics.dat

File Name: 72-playback-histogram.dat

File Name: 73-video-program-demo-geo-device.dat

File Name: 78-video-program-airing-segment-demo-geo-device.dat

File Name: 79-video-program-airing-segment-view-activity-by-sec.dat

FIG. 32

Summary Information

| Short name: | Viewing Statistics |
|---|---|
| Table name: | VIDEO_PROGRAM_VIEWING_STATS |
| Parent table name: | VIDEO_PROGRAM |
| Outout file name assigned by Measurement Engine 200: | `71-viewing-statistics.dat` |
| Record description: | Video Program Viewing Statistics records various statistics about the viewing of a video program. The type of viewing activity is specified using the field VIEWING_ACTIVITY_TYPE:<br>"LIN" indicates the statistics are related to linear viewing of this program.<br>"DVR" indicates the statistics are related to digital video recorder viewing of this program.<br>"VOD" indicates the statistics are related to video on demand viewing of this program. |
| Specification File Name | Viewing Statistics file 210 |

Record Layout

|  | 6100 | 6102 | 6104 | 6106 |
|---|---|---|---|---|
|  | NAME | TYPE | SIZE | DESCRIPTION |
| 6110~ | VIDEO_PROGRAM_ID | Number | 9 | Video Program Id identifies the Video Program for which the Measurement Engine 200 has calculated viewing statistics. Populated from 5010. |
| 6120~ | VIDEO_PROGRAM_STATS_EFF_DATE | Date |  | Video Program Statistics Effective Date records the date on which these statistics were calculated. Populated from 5026. |
| 6125~ | VIEWING_ACTIVITY_TYPE | Char | 3 | Viewing Activity Type identifies the source of these viewing statistics as to type of viewing activity:<br>LIN = Linear<br>DVR = Digital Video Recorder<br>VOD = Video On Demand<br>Populated from 5014. |

FIG. 32 - Continued

| | | | | |
|---|---|---|---|---|
| 6130~ | TOTAL_VIEWING_SESSIONS_CNT | Number | 12 | Total Viewing Session Count records the number of viewing sessions that are included in this summary, this is within the context of the Viewing Stats Type. Populated from 5028. |
| 6140~ | TOTAL_VIEWING_SECS | Number | 16 | Total Viewing Seconds Count records the number of viewing seconds that are included in this summary, this is within the context of the Viewing Stats Type. Populated from 5032. |

FIG. 33

Summary Information

| Short name: | Viewing Histogram |
|---|---|
| Table name: | DVR_REC_PLAYBACK_HISTOGRAM |
| Parent table name: | VIDEO_PROGRAM |
| Outout file name assigned by Measurement Engine 200: | 72-viewing-histogram.dat |
| Record description: | Viewing Histogram records viewing information grouped in to Histogram buckets. |
| Specification File Name | Viewing Histogram file 220 |

Record Layout

| | 6200 | 6202 | 6204 | 6206 |
|---|---|---|---|---|
| | NAME | TYPE | SIZE | DESCRIPTION |
| 6210~ | VIDEO_PROGRAM_ID | Number | 9 | Video Program Id identifies the Video Program for which the Measurement Engine 200 has calculated viewing statistics. Populated from 5010. |

FIG. 33 - Continued

| 6220~ | VIDEO_PROGRAM_STATS_EFF_DATE | Date | | Video Program Statistics Effective Date records the date on which these statistics were calculated. Populated from 5026. |
|---|---|---|---|---|
| 6225~ | VIEWING_ACTIVITY_TYPE | Char | 3 | Viewing Activity Type identifies the source of these viewing statistics as to type of viewing activity:<br>LIN = Linear<br>DVR = Digital Video Recorder<br>VOD = Video On Demand<br>Populated from 5014. |
| 6230~ | VIEWING_HISTG_INDEX | Number | 3 | Viewing Histogram Index Populated from 4460. |
| 6240~ | VIEWING_HISTG_BEG_SEC | Number | 5 | Viewing Histogram Begin Second defines the start of the histogram range. Populated from 4480. |
| 6250~ | VIEWING_HISTG_END_SEC | Number | 5 | Viewing Histogram End Second defines the end of the histogram range. Populated from 4490. |
| 6260~ | VIEWING_HISTG_TOT_VIEW_SECS | Number | 15 | Viewing Histogram total viewing seconds records the total number of viewing seconds. Populated from 4492. |
| 6270~ | VIEWING_HISTG_SESSION_CNT | Number | 9 | Viewing Histogram records the number of viewing sessions. Populated from 4494. |

FIG. 34

Summary Information

| Short name: | Video Program Demographic Geographic Device Viewing |
|---|---|
| Table name: | VIDEO_PGM_DEMO_GEO_DEVICE |
| Parent table name: | VIDEO_PROGRAM |
| Outout file name assigned by Measurement Engine 200: | `73-video-program-demo-geo-device.dat` |
| Record description: | Video Program Demographic Geographic Device records the summary information regarding viewership of this Video Program aggregated to the level of Demographic - Geographic - Device grouping. |
| Specification File Name | Video Program Demographic Geographic Device Viewing file 230 |

Record Layout

|  | 6400 | 6402 | 6404 | 6406 |
|---|---|---|---|---|
|  | NAME | TYPE | SIZE | DESCRIPTION |
| 6410~ | VP-VIDEO_PROGRAM_ID | Number | 9 | Video Program Id links to the parent Video Program record. Populated from 5010. |
| 6414~ | VP-VIEWING-ACTIVITY-TYPE | CHAR | 3 | Populated from 5014. See definition there. |
| 6436~ | VP-HOUSE-DEMOGRAPHIC-CODE | Char | 8 | Populated from 5036. See definition there. |
| 6438~ | VP-HOUSE-GEOGRAPHIC-CODE | Char | 8 | Populated from 5038. See definition there. |
| 6442~ | VP-VIDEO-VIEW-DEVICE-TYPE-CD | Char | 8 | Populated from 5042. See definition there. |
|  | The following fields track activity that happens for the entire duration of the video asset. | | | |
| 6446~ | VP-PL-MODE-BEG-TO-END-COUNT | Number | 7 | Populated from 5046. See definition there. |
| 6452~ | VP-SK-MODE-BEG-TO-END-COUNT | Number | 7 | Populated from 5052. See definition there. |
| 6456~ | VP-SP-MODE-BEG-TO-END-COUNT | Number | 7 | Populated from 5056. See definition there. |

FIG. 34 - Continued

| | | | | |
|---|---|---|---|---|
| 6460~ | VP-F1-MODE-BEG-TO-END-COUNT | Number | 7 | Populated from 5060. See definition there. |
| 6464~ | VP-F2-MODE-BEG-TO-END-COUNT | Number | 7 | Populated from 5064. See definition there. |
| 6468~ | VP-F3-MODE-BEG-TO-END-COUNT | Number | 7 | Populated from 5068. See definition there. |
| 6472~ | VP-F4-MODE-BEG-TO-END-COUNT | Number | 7 | Populated from 5072. See definition there. |
| 6476~ | VP-SR-MODE-BEG-TO-END-COUNT | Number | 7 | Populated from 5076. See definition there. |
| 6480~ | VP-R1-MODE-BEG-TO-END-COUNT | Number | 7 | Populated from 5080. See definition there. |
| 6484~ | VP-R2-MODE-BEG-TO-END-COUNT | Number | 7 | Populated from 5084. See definition there. |
| 6488~ | VP-R3-MODE-BEG-TO-END-COUNT | Number | 7 | Populated from 5088. See definition there. |
| 6492~ | VP-R4-MODE-BEG-TO-END-COUNT | Number | 7 | Populated from 5092. See definition there. |
| 6496~ | VP-VIEW-MIN-SECS-IN-PLAY-CNT | Number | 7 | Populated from 5096. See definition there. |
| | The following fields track counts of seconds at the Video Program level for the various kinds of activities which may occur during video asset viewing. | | | |
| 6500~ | VP-AGGR-ADJUSTED-VIEW-SECS | Number | 12 | Populated from 5100. See definition there. |
| 6504~ | VP-AGGR-PL-MODE-VIEW-SECS | Number | 12 | Populated from 5104. See definition there. |
| 6508~ | VP-AGGR-SK-MODE-VIEW-SECS | Number | 12 | Populated from 5108. See definition there. |
| 6512~ | VP-AGGR-SP-MODE-VIEW-SECS | Number | 12 | Populated from 5112. See definition there. |
| 6516~ | VP-AGGR-F1-MODE-VIEW-SECS | Number | 12 | Populated from 5116. See definition there. |
| 6520~ | VP-AGGR-F2-MODE-VIEW-SECS | Number | 12 | Populated from 5120. See definition there. |
| 6524~ | VP-AGGR-F3-MODE-VIEW-SECS | Number | 12 | Populated from 5124. See definition there. |
| 6528~ | VP-AGGR-F4-MODE-VIEW-SECS | Number | 12 | Populated from 5128. See definition there. |

FIG. 34 - Continued

| 6532~ | VP-AGGR-SR-MODE-VIEW-SECS | Number | 12 | Populated from 5132. See definition there. |
| 6536~ | VP-AGGR-R1-MODE-VIEW-SECS | Number | 12 | Populated from 5136. See definition there. |
| 6540~ | VP-AGGR-R2-MODE-VIEW-SECS | Number | 12 | Populated from 5140. See definition there. |
| 6544~ | VP-AGGR-R3-MODE-VIEW-SECS | Number | 12 | Populated from 5144. See definition there. |
| 6546~ | VP-AGGR-R4-MODE-VIEW-SECS | Number | 12 | Populated from 5146. See definition there. |

FIG. 35

Summary Information

| Short name: | Video Program Viewing Activity by Second |
|---|---|
| Table name: | VIDEO_PGM_VIEW_ACTIV_BY_SEC |
| Parent table name: | VIDEO_PGM_DEMO_GEO_DEVICE |
| Output file name assigned by Measurement Engine 200: | `74-video-program-viewing-activity-by-second.dat` |
| Record description: | Video Program Viewing Activity by Second records the second-by-second viewing activity of this video program based on the viewing events. |
| Specification File Name | Video Program Viewing Activity by Second file 240 |

Record Layout

|  | 6600 | 6602 | 6604 | 6606 |
|---|---|---|---|---|
|  | NAME | TYPE | SIZE | DESCRIPTION |
| 6610~ | VP-VIDEO_PROGRAM_ID | Number | 9 | Video Program Id links to the parent Video Program record. Populated from 5010. |
| 6614~ | VP-VIEWING-ACTIVITY-TYPE | CHAR | 3 | Populated from 5014. See definition there. |
| 6636~ | VP-HOUSE_DEMOGRAPHIC_CODE | Char | 8 | Populated from 5036. See definition there. |

FIG. 35 - Continued

| | | | | |
|---|---|---|---|---|
| 6638~ | VP-HOUSE_GEOGRAPHIC_CODE | Char | 8 | Populated from 5038. See definition there. |
| 6642~ | VP-VIDEO_VIEW_DEVICE_TYPE_CD | Char | 8 | Populated from 5042. See definition there. |
| 6650~ | VP-ACTUAL-SECOND-OF-PROGAM | Number | 5 | Populated from 5150. See definition there. |
| 6654~ | VP-VIEWING-DEVICE-COUNT | Number | 9 | Populated from 5154. See definition there. |
| 6656~ | VP-ADJ-TOTAL-VIEWING-COUNT | Number | 9 | Populated from 5156. See definition there. |
| 6658~ | VP-ADJ-PL-MODE-COUNT | Number | 9 | Populated from 5158. See definition there. |
| 6662~ | VP-ADJ-SK-MODE-COUNT | Number | 9 | Populated from 5162. See definition there. |
| 6666~ | VP-ADJ-SP-MODE-COUNT | Number | 9 | Populated from 5166. See definition there. |
| 6670~ | VP-ADJ-F1-MODE-COUNT | Number | 9 | Populated from 5170. See definition there. |
| 6674~ | VP-ADJ-F2-MODE-COUNT | Number | 9 | Populated from 5174. See definition there. |
| 6678~ | VP-ADJ-F3-MODE-COUNT | Number | 9 | Populated from 5178. See definition there. |
| 6682~ | VP-ADJ-F4-MODE-COUNT | Number | 9 | Populated from 5182. See definition there. |
| 6686~ | VP-ADJ-SR-MODE-COUNT | Number | 9 | Populated from 5186. See definition there. |
| 6690~ | VP-ADJ-R1-MODE-COUNT | Number | 9 | Populated from 5190. See definition there. |
| 6694~ | VP-ADJ-R2-MODE-COUNT | Number | 9 | Populated from 5194. See definition there. |
| 6698~ | VP-ADJ-R3-MODE-COUNT | Number | 9 | Populated from 5198. See definition there. |
| 6702~ | VP-ADJ-R4-MODE-COUNT | Number | 9 | Populated from 5202. See definition there. |
| | Raw Counts are unadjusted or raw data. This allows the analyst to see the original data values before they were adjusted by the various Adjustment Factors. | | | |

FIG. 35 - Continued

| 6704~ | VP-RAW-TOTAL-VIEWING-COUNT | Number | 9 | Populated from 5204. See definition there. |
|---|---|---|---|---|
| 6706~ | VP-RAW-PL-MODE-COUNT | Number | 9 | Populated from 5206. See definition there. |
| 6710~ | VP-RAW-SK-MODE-COUNT | Number | 9 | Populated from 5210. See definition there. |
| 6714~ | VP-RAW-SP-MODE-COUNT | Number | 9 | Populated from 5214. See definition there. |
| 6718~ | VP-RAW-F1-MODE-COUNT | Number | 9 | Populated from 5218. See definition there. |
| 6722~ | VP-RAW-F2-MODE-COUNT | Number | 9 | Populated from 5222. See definition there. |
| 6726~ | VP-RAW-F3-MODE-COUNT | Number | 9 | Populated from 5226. See definition there. |
| 6730~ | VP-RAW-F4-MODE-COUNT | Number | 9 | Populated from 5230. See definition there. |
| 6734~ | VP-RAW-SR-MODE-COUNT | Number | 9 | Populated from 5234. See definition there. |
| 6736~ | VP-RAW-R1-MODE-COUNT | Number | 9 | Populated from 5236. See definition there. |
| 6740~ | VP-RAW-R2-MODE-COUNT | Number | 9 | Populated from 5240. See definition there. |
| 6744~ | VP-RAW-R3-MODE-COUNT | Number | 9 | Populated from 5244. See definition there. |
| 6746~ | VP-RAW-R4-MODE-COUNT | Number | 9 | Populated from 5246. See definition there. |

FIG. 36

Summary Information

| Short name: | Video Program Airing Demographic Geographic Device Viewing |
|---|---|
| Table name: | VIDEO_PGM_AIR_DEMO_GEO_DEVICE |
| Parent table name: | PROGRAM_PROGRAM_AIRING |
| Outout file name assigned by Measurement Engine 200: | 75-video-program-airing-demo-geo-device.dat |

FIG. 36 - Continued

| Record description: | Video Program Airing Demographic Geographic Device records the summary information regarding viewership of this Video Program Airing aggregated to the level of Demographic – Geographic – Device grouping. This data is calculated at the video program airing, so it provides insight into DVR activity against each airing of a video program. |
|---|---|
| Specification File Name | Video Program Airing Demographic Geographic Device Viewing file 250 |

Record Layout

| | NAME | TYPE | SIZE | DESCRIPTION |
|---|---|---|---|---|
| 6810~ | VPA-VIDEO_PROGRAM_ID | Number | 9 | Populated from 5410. See definition there. |
| 6812~ | VPA-VIEWING-ACTIVITY-TYPE | CHAR | 3 | Populated from 5412 See definition there. |
| 6814~ | VPA-VIDEO-PROGRAM-AIRING-ID | Number | 9 | Populated from 5414. See definition there. |
| 6836~ | VPA-HOUSE-DEMOGRAPHIC-CODE | Char | 8 | Populated from 5436. See definition there. |
| 6838~ | VPA-HOUSE-GEOGRAPHIC-CODE | Char | 8 | Populated from 5438. See definition there. |
| 6842~ | VPA-VIDEO-VIEW-DEVICE-TYPE-CD | Char | 8 | Populated from 5442. See definition there. |
| 6846~ | VPA-PL-MODE-BEG-TO-END-COUNT | Number | 7 | Populated from 5446. See definition there. |
| 6852~ | VPA-SK-MODE-BEG-TO-END-COUNT | Number | 7 | Populated from 5452. See definition there. |
| 6856~ | VPA-SP-MODE-BEG-TO-END-COUNT | Number | 7 | Populated from 5456. See definition there. |
| 6860~ | VPA-F1-MODE-BEG-TO-END-COUNT | Number | 7 | Populated from 5460. See definition there. |
| 6864~ | VPA-F2-MODE-BEG-TO-END-COUNT | Number | 7 | Populated from 5464. See definition there. |
| 6868~ | VPA-F3-MODE-BEG-TO-END-COUNT | Number | 7 | Populated from 5468. See definition there. |

FIG. 36 - Continued

| 6872~ | VPA-F4-MODE-BEG-TO-END-COUNT | Number | 7 | Populated from 5472. See definition there. |
|---|---|---|---|---|
| 6876~ | VPA-SR-MODE-BEG-TO-END-COUNT | Number | 7 | Populated from 5476. See definition there. |
| 6880~ | VPA-R1-MODE-BEG-TO-END-COUNT | Number | 7 | Populated from 5480. See definition there. |
| 6884~ | VPA-R2-MODE-BEG-TO-END-COUNT | Number | 7 | Populated from 5484. See definition there. |
| 6888~ | VPA-R3-MODE-BEG-TO-END-COUNT | Number | 7 | Populated from 5488. See definition there. |
| 6892~ | VPA-R4-MODE-BEG-TO-END-COUNT | Number | 7 | Populated from 5492. See definition there. |
| 6896~ | VPA-VIEW-MIN-SECS-IN-PLAY-CNT | Number | 7 | Populated from 5496. See definition there. |
| 6900~ | VPA-AGGR-ADJUSTED-VIEW-SECS | Number | 12 | Populated from 5500. See definition there. |
| 6904~ | VPA-AGGR-PL-MODE-VIEW-SECS | Number | 12 | Populated from 5504. See definition there. |
| 6908~ | VPA-AGGR-SK-MODE-VIEW-SECS | Number | 12 | Populated from 5508. See definition there. |
| 6912~ | VPA-AGGR-SP-MODE-VIEW-SECS | Number | 12 | Populated from 5512. See definition there. |
| 6916~ | VPA-AGGR-F1-MODE-VIEW-SECS | Number | 12 | Populated from 5516. See definition there. |
| 6920~ | VPA-AGGR-F2-MODE-VIEW-SECS | Number | 12 | Populated from 5520. See definition there. |
| 6924~ | VPA-AGGR-F3-MODE-VIEW-SECS | Number | 12 | Populated from 5524. See definition there. |
| 6928~ | VPA-AGGR-F4-MODE-VIEW-SECS | Number | 12 | Populated from 5528. See definition there. |
| 6932~ | VPA-AGGR-SR-MODE-VIEW-SECS | Number | 12 | Populated from 5532. See definition there. |
| 6936~ | VPA-AGGR-R1-MODE-VIEW-SECS | Number | 12 | Populated from 5536. See definition there. |
| 6940~ | VPA-AGGR-R2-MODE-VIEW-SECS | Number | 12 | Populated from 5540. See definition there. |
| 6944~ | VPA-AGGR-R3-MODE-VIEW-SECS | Number | 12 | Populated from 5544. See definition there. |
| 6946~ | VPA-AGGR-R4-MODE-VIEW-SECS | Number | 12 | Populated from 5546. See definition there. |

FIG. 37

Summary Information

| Short name: | Viewing Program Airing Viewing Activity by Second |
|---|---|
| Table name: | VIDEO_PGM_AIR_VIEW_ACTIV_BY_SEC |
| Parent table name: | VIDEO_PGM_AIR_DEMO_GEO_DEVICE (Reference FIG. 31) |
| Outout file name assigned by Measurement Engine 200: | 76-video-program-airing-viewing-activity-by-second.dat |
| Record description: | Video Program Airing Viewing Activity by Second records the second-by-second viewing activity of this video program airing based on the DVR recording playback events. |
| Specification File Name | Viewing Program Airing Viewing Activity by Second file 260 |

Record Layout

|  | 7000 | 7002 | 7004 | 7006 |
|---|---|---|---|---|
|  | NAME | TYPE | SIZE | DESCRIPTION |
| 7010~ | VPA-VIDEO_PROGRAM_ID | Number | 9 | Populated from 5410. See definition there. |
| 7012~ | VPA-VIEWING-ACTIVITY-TYPE | CHAR | 3 | Populated from 5412. See definition there. |
| 7014~ | VPA-VIDEO-PROGRAM-AIRING-ID | Number | 9 | Populated from 5414. See definition there. |
| 7036~ | VPA-HOUSE_DEMOGRAPHIC_CODE | Char | 8 | Populated from 5436. See definition there. |
| 7038~ | VPA-HOUSE_GEOGRAPHIC_CODE | Char | 8 | Populated from 5438. See definition there. |
| 7042~ | VPA-VIDEO_VIEW_DEVICE_TYPE_CD | Char | 8 | Populated from 5442. See definition there. |
| 7050~ | VPA-ACTUAL-SECOND-OF-PROGAM | NUMBER | 5 | Populated from 5550. See definition there. |
| 7054~ | VPA-VIEWING-DEVICE-COUNT | NUMBER | 9 | Populated from 5554. See definition there. |
| 7056~ | VPA-ADJ-TOTAL-VIEWING-COUNT | NUMBER | 9 | Populated from 5556. See definition there. |
| 7058~ | VPA-ADJ-PL-MODE-COUNT | NUMBER | 9 | Populated from 5558. See definition there. |

FIG. 37 - Continued

| | | | | |
|---|---|---|---|---|
| 7062~ | VPA-ADJ-SK-MODE-COUNT | NUMBER | 7 | Populated from 5562. See definition there. |
| 7066~ | VPA-ADJ-SP-MODE-COUNT | NUMBER | 7 | Populated from 5566. See definition there. |
| 7070~ | VPA-ADJ-F1-MODE-COUNT | NUMBER | 7 | Populated from 5570. See definition there. |
| 7074~ | VPA-ADJ-F2-MODE-COUNT | NUMBER | 7 | Populated from 5574. See definition there. |
| 7078~ | VPA-ADJ-F3-MODE-COUNT | NUMBER | 7 | Populated from 5578. See definition there. |
| 7082~ | VPA-ADJ-F4-MODE-COUNT | NUMBER | 7 | Populated from 5582. See definition there. |
| 7086~ | VPA-ADJ-SR-MODE-COUNT | NUMBER | 7 | Populated from 5586. See definition there. |
| 7090~ | VPA-ADJ-R1-MODE-COUNT | NUMBER | 7 | Populated from 5590. See definition there. |
| 7094~ | VPA-ADJ-R2-MODE-COUNT | NUMBER | 7 | Populated from 5594. See definition there. |
| 7098~ | VPA-ADJ-R3-MODE-COUNT | NUMBER | 7 | Populated from 5598. See definition there. |
| 7102~ | VPA-ADJ-R4-MODE-COUNT | NUMBER | 7 | Populated from 5602 See definition there. |
| 7104~ | VPA-RAW-TOTAL-VIEWING-COUNT | NUMBER | 7 | Populated from 5604. See definition there. |
| 7106~ | VPA-RAW-PL-MODE-COUNT | NUMBER | 9 | Populated from 5606. See definition there. |
| 7110~ | VPA-RAW-SK-MODE-COUNT | NUMBER | 7 | Populated from 5610. See definition there. |
| 7114~ | VPA-RAW-SP-MODE-COUNT | NUMBER | 7 | Populated from 5614. See definition there. |
| 7118~ | VPA-RAW-F1-MODE-COUNT | NUMBER | 7 | Populated from 5618. See definition there. |
| 7122~ | VPA-RAW-F2-MODE-COUNT | NUMBER | 7 | Populated from 5622. See definition there. |
| 7126~ | VPA-RAW-F3-MODE-COUNT | NUMBER | 7 | Populated from 5626. See definition there. |
| 7130~ | VPA-RAW-F4-MODE-COUNT | NUMBER | 7 | Populated from 5630. See definition there. |
| 7134~ | VPA-RAW-SR-MODE-COUNT | NUMBER | 7 | Populated from 5634. See definition there. |

FIG. 37 - Continued

| 7136~ | VPA-RAW-R1-MODE-COUNT | NUMBER | 7 | Populated from 5636. See definition there. |
| 7140~ | VPA-RAW-R2-MODE-COUNT | NUMBER | 7 | Populated from 5640. See definition there. |
| 7144~ | VPA-RAW-R3-MODE-COUNT | NUMBER | 7 | Populated from 5644. See definition there. |
| 7146~ | VPA-RAW-R4-MODE-COUNT | NUMBER | 7 | Populated from 5646. See definition there. |

FIG. 38

Summary Information

| Short name: | Video Program Airing Segment |
|---|---|
| Table name: | VIDEO_PROGRAM_SEGMENT<br><br>Explanation:<br>When the value of VPAS-ALLOW-TRGT-DURING-SEG-IND 7170 is "Y" the row contains Dynamic viewing information.<br><br>When the value of VPAS-ALLOW-TRGT-DURING-SEG-IND 7170 is "N" the row contains Static viewing information. |
| Parent table name: | When the value of VPAS-ALLOW-TRGT-DURING-SEG-IND 7170 is "Y" the parent table is DYNAMIC_SEGMENT<br><br>When the value of VPAS-ALLOW-TRGT-DURING-SEG-IND 7170 is "N" the parent table is STATIC_SEGMENT |
| Outout file name assigned by Measurement Engine 200: | 77-video-program-airing-segment-static.dat<br>Data for both Static and Dynamic Segments will be written to this file. When the value of VPAS-ALLOW-TRGT-DURING-SEG-IND is "Y" this indicates Dynamic; when the value is "N" it indicates Static. The statis vs dynamic relates to whether the video content in that segment is targeted which is dynamic or non-targeted which is static. |

FIG. 38 - Continued

| Record description: | Video Program Airing Segment records each combination of Video Program Airing along with the Segment details. This table brings together the Video Program, the Video Program Airing, and the Video Program Segment. It will serve as the parent for the the summary information regarding VIDEO_PGM_AIR_SEG_DEMO_GEO_DEV. |
|---|---|
| Specification File Name | Video Program Airing Segment file 270 |

Record Layout

| | NAME 7150 | TYPE 7152 | SIZE 7154 | DESCRIPTION 7156 |
|---|---|---|---|---|
| 7160~ | VPAS-VIDEO-PROGRAM-ID | Number | 9 | Populated from 5810. See definition there. |
| 7162~ | VPAS-VIEWING-ACTIVITY-TYPE | CHAR | 3 | Populated from 5812. See definition there. |
| 7164~ | VPAS-VIDEO-PROGRAM-AIRING-ID | Number | 9 | Populated from 5814. See definition there. |
| 7166~ | VPAS-VIDEO-PROGRAM-SEGMENT-ID | Number | 9 | Populated from 5816. See definition there. |
| 7170~ | VPAS-ALLOW-TRGT-DURING-SEG-IND | CHAR | 1 | Populated from 5819. See definition there. |
| 7174~ | VIDEO_PROGRAM_STATS_EFF_DATE | Date | | Populated from 5813. See definition there. |

FIG. 39

Summary Information

| Short name: | Video Program Airing Segment Demographic Geographic Device Viewing |
|---|---|
| Table name: | VIDEO_PGM_AIR_SEG_DEMO_GEO_DEVICE<br>Code name: VIDEO_PGM_AIR_SEG_DEMO_GEO_DEV |
| Parent table name: | VIDEO_PROGRAM_SEGMENT |
| Outout file name assigned by Measurement Engine 200: | 78-video-program-airing-segment-demo-geo-device.dat |
| Record description: | Video Program Airing Segment Demographic Geographic Device records the summary information regarding viewership of this Video Program Airing Segment aggregated to the level of Demographic - Geographic - Device grouping. This data is calculated at the video program airing segment, so it provides insight into viewing activity against each airing of a video program segment. |
| Specification File Name | Video Program Airing Segment Demographic Geographic Device file 280 |

Record Layout

|  | 7200<br>NAME | 7202<br>TYPE | 7204<br>SIZE | 7206<br>DESCRIPTION |
|---|---|---|---|---|
| 7210~ | VPAS-VIDEO_PROGRAM_ID | Number | 9 | Populated from 5810.<br>See definition there. |
| 7212~ | VPAS-VIEWING-ACTIVITY-TYPE | CHAR | 3 | Populated from 5812.<br>See definition there. |
| 7214~ | VPAS-VIDEO_PROGRAM_AIRING_ID | Number | 9 | Populated from 5814.<br>See definition there. |
| 7216~ | VPAS-VIDEO_PROGRAM_SEGMENT_ID | Number | 9 | Populated from 5816.<br>See definition there. |
| 7218~ | VPAS-SEGMENT-LOCATION | NUMBER | 3 | Populated from 5818.<br>See definition there. |

FIG. 39 - Continued

| | | | | |
|---|---|---|---|---|
| 7219~ | VPAS-ALLOW-TARGETING-DURING-SEG | CHAR | 1 | Populated from 5819. See definition there. |
| 7236~ | VPAS-HOUSE_DEMOGRAPHIC_CODE | Char | 8 | Populated from 5836. See definition there. |
| 7238~ | VPAS-HOUSE_GEOGRAPHIC_CODE | Char | 8 | Populated from 5838. See definition there. |
| 7242~ | VPAS-VIDEO_VIEW_DEVICE_TYPE_CD | Char | 8 | Populated from 5842. See definition there. |
| 7246~ | VPAS-PL-MODE-BEG-TO-END-COUNT | Number | 7 | Populated from 5846. See definition there. |
| 7248~ | VPAS-VIEW-MIN-SECS-IN-PLAY-CNT | Number | 7 | Populated from 5850. See definition there. |
| 7252~ | VPAS-SK-MODE-BEG-TO-END-COUNT | Number | 7 | Populated from 5852. See definition there. |
| 7256~ | VPAS-SP-MODE-BEG-TO-END-COUNT | Number | 7 | Populated from 5856. See definition there. |
| 7260~ | VPAS-F1-MODE-BEG-TO-END-COUNT | Number | 7 | Populated from 5860. See definition there. |
| 7264~ | VPAS-F2-MODE-BEG-TO-END-COUNT | Number | 7 | Populated from 5864. See definition there. |
| 7268~ | VPAS-F3-MODE-BEG-TO-END-COUNT | Number | 7 | Populated from 5868. See definition there. |
| 7272~ | VPAS-F4-MODE-BEG-TO-END-COUNT | Number | 7 | Populated from 5872. See definition there. |
| 7276~ | VPAS-SR-MODE-BEG-TO-END-COUNT | Number | 7 | Populated from 5876. See definition there. |
| 7280~ | VPAS-R1-MODE-BEG-TO-END-COUNT | Number | 7 | Populated from 5880. See definition there. |
| 7284~ | VPAS-R2-MODE-BEG-TO-END-COUNT | Number | 7 | Populated from 5884. See definition there. |
| 7288~ | VPAS-R3-MODE-BEG-TO-END-COUNT | Number | 7 | Populated from 5888. See definition there. |
| 7292~ | VPAS-R4-MODE-BEG-TO-END-COUNT | Number | 7 | Populated from 5892. See definition there. |
| 7300~ | VPAS-AGGR-ADJUSTED-VIEW-SECS | Number | 12 | Populated from 5900. See definition there. |
| 7304~ | VPAS-AGGR-PL-MODE-VIEW-SECS | Number | 12 | Populated from 5904. See definition there. |
| 7308~ | VPAS-AGGR-SK-MODE-VIEW-SECS | Number | 12 | Populated from 5908. See definition there. |

FIG. 39 - Continued

| | | | | |
|---|---|---|---|---|
| 7312~ | VPAS-AGGR-SP-MODE-VIEW-SECS | Number | 12 | Populated from 5912. See definition there. |
| 7316~ | VPAS-AGGR-F1-MODE-VIEW-SECS | Number | 12 | Populated from 5916. See definition there. |
| 7320~ | VPAS-AGGR-F2-MODE-VIEW-SECS | Number | 12 | Populated from 5920. See definition there. |
| 7324~ | VPAS-AGGR-F3-MODE-VIEW-SECS | Number | 12 | Populated from 5924. See definition there. |
| 7328~ | VPAS-AGGR-F4-MODE-VIEW-SECS | Number | 12 | Populated from 5928. See definition there. |
| 7332~ | VPAS-AGGR-SR-MODE-VIEW-SECS | Number | 12 | Populated from 5932. See definition there. |
| 7336~ | VPAS-AGGR-R1-MODE-VIEW-SECS | Number | 12 | Populated from 5936. See definition there. |
| 7340~ | VPAS-AGGR-R2-MODE-VIEW-SECS | Number | 12 | Populated from 5940. See definition there. |
| 7344~ | VPAS-AGGR-R3-MODE-VIEW-SECS | Number | 12 | Populated from 5944. See definition there. |
| 7346~ | VPAS-AGGR-R4-MODE-VIEW-SECS | Number | 12 | Populated from 5946. See definition there. |

FIG. 40

Summary Information

| | |
|---|---|
| Short name: | Video Program Airing Segment Viewing Activity by Second |
| Table name: | VIDEO_PGM_AIR_SEG_VIEW-ACTIV-BY-SEC<br>Code name: `VID_PGM_AIR_SEG_VW_ACTV_BY_SEC` |
| Parent table name: | VIDEO_PGM_AIR_SEG_DEMO_GEO_DEVICE (Reference - FIG. 39) |
| Outout file name assigned by Measurement Engine 200: | `79-video-program-airing-segment-view-activity-by-sec.dat` |
| Record description: | Video Program Airing Segment Viewing Activity by Second records the second-by-second viewing activity of this video program airing segment based on the viewing events. |
| Specification File Name | Video Program Airing Segment Viewing Activity by Second file 290 |

FIG. 40 - Continued

Record Layout

| | NAME | TYPE | SIZE | DESCRIPTION |
|---|---|---|---|---|
| 7410~ | VPAS-VIDEO_PROGRAM_ID | Number | 9 | Populated from 5810. See definition there. |
| 7412~ | VPAS-VIEWING-ACTIVITY-TYPE | CHAR | 3 | Populated from 5812. See definition there. |
| 7414~ | VPAS-VIDEO_PROGRAM_AIRING_ID | Number | 9 | Populated from 5814. See definition there. |
| 7416~ | VPAS-VIDEO_PROGRAM_SEGMENT_ID | Number | 9 | Populated from 5816. See definition there. |
| 7818~ | VPAS-SEGMENT-LOCATION | NUMBER | 3 | Populated from 5818. See definition there. |
| 7819~ | VPAS-ALLOW-TARGETING-DURING-SEG | CHAR | 1 | Populated from 5819. See definition there. |
| 7436~ | VPAS-HOUSE_DEMOGRAPHIC_CODE | Char | 8 | Populated from 5836. See definition there. |
| 7438~ | VPAS-HOUSE_GEOGRAPHIC_CODE | Char | 8 | Populated from 5838. See definition there. |
| 7442~ | VPAS-VIDEO_VIEW_DEVICE_TYPE_CD | Char | 8 | Populated from 5842. See definition there. |
| 7550~ | VPAS-ACTUAL-SECOND-OF-PROGAM | NUMBER | 5 | Populated from 5950. See definition there. |
| 7554~ | VPAS-VIEWING-DEVICE-COUNT | NUMBER | 9 | Populated from 5954. See definition there. |
| 7556~ | VPAS-ADJ-TOTAL-VIEWING-COUNT | NUMBER | 9 | Populated from 5956. See definition there. |
| 7558~ | VPAS-ADJ-PL-MODE-COUNT | NUMBER | 7 | Populated from 5958. See definition there. |
| 7562~ | VPAS-ADJ-SK-MODE-COUNT | NUMBER | 7 | Populated from 5962. See definition there. |
| 7566~ | VPAS-ADJ-SP-MODE-COUNT | NUMBER | 7 | Populated from 5966. See definition there. |
| 7570~ | VPAS-ADJ-F1-MODE-COUNT | NUMBER | 7 | Populated from 5970. See definition there. |
| 7574~ | VPAS-ADJ-F2-MODE-COUNT | NUMBER | 7 | Populated from 5974. See definition there. |
| 7578~ | VPAS-ADJ-F3-MODE-COUNT | NUMBER | 7 | Populated from 5978. See definition there. |

Column headers: 7400, 7402, 7404, 7406

FIG. 40 - Continued

| | | | | |
|---|---|---|---|---|
| 7582~ | VPAS-ADJ-F4-MODE-COUNT | NUMBER | 7 | Populated from 5982. See definition there. |
| 7586~ | VPAS-ADJ-SR-MODE-COUNT | NUMBER | 7 | Populated from 5986. See definition there. |
| 7590~ | VPAS-ADJ-R1-MODE-COUNT | NUMBER | 7 | Populated from 5990. See definition there. |
| 7594~ | VPAS-ADJ-R2-MODE-COUNT | NUMBER | 7 | Populated from 5994. See definition there. |
| 7598~ | VPAS-ADJ-R3-MODE-COUNT | NUMBER | 7 | Populated from 5998. See definition there. |
| 7602~ | VPAS-ADJ-R4-MODE-COUNT | NUMBER | 7 | Populated from 6002. See definition there. |
| 7604~ | VPAS-RAW-TOTAL-VIEWING-COUNT | NUMBER | 7 | Populated from 6004. See definition there. |
| 7606~ | VPAS-RAW-PL-MODE-COUNT | NUMBER | 7 | Populated from 6006. See definition there. |
| 7610~ | VPAS-RAW-SK-MODE-COUNT | NUMBER | 7 | Populated from 6010. See definition there. |
| 7614~ | VPAS-RAW-SP-MODE-COUNT | NUMBER | 7 | Populated from 6014. See definition there. |
| 7618~ | VPAS-RAW-F1-MODE-COUNT | NUMBER | 7 | Populated from 6018. See definition there. |
| 7622~ | VPAS-RAW-F2-MODE-COUNT | NUMBER | 7 | Populated from 6022. See definition there. |
| 7626~ | VPAS-RAW-F3-MODE-COUNT | NUMBER | 7 | Populated from 6026. See definition there. |
| 7630~ | VPAS-RAW-F4-MODE-COUNT | NUMBER | 7 | Populated from 6030. See definition there. |
| 7634~ | VPAS-RAW-SR-MODE-COUNT | NUMBER | 7 | Populated from 6034. See definition there. |
| 7636~ | VPAS-RAW-R1-MODE-COUNT | NUMBER | 7 | Populated from 6036. See definition there. |
| 7640~ | VPAS-RAW-R2-MODE-COUNT | NUMBER | 7 | Populated from 6040. See definition there. |
| 7644~ | VPAS-RAW-R3-MODE-COUNT | NUMBER | 7 | Populated from 6044. See definition there. |
| 7646~ | VPAS-RAW-R4-MODE-COUNT | NUMBER | 7 | Populated from 6046. See definition there. |

File Name: 70-video-viewing-analysis.dat

FIG. 42

| | NAME | TYPE | SIZE | DESCRIPTION |
|---|---|---|---|---|
| 7910~ | PAOUT-VIDEO-PROGRAM-ID | NUMBER | 9 | Populated from 4010. See definition there. |
| 7913~ | PAOUT-VIEWING_ACTIVITY_TYPE | CHAR | 3 | Populated from 4013. See definition there. |
| 7915~ | PAOUT-VP-DURATION-IN-SECONDS | NUMBER | 5 | Populated from 4015. See definition there. |
| 7920~ | PAOUT-VP-MIN-SECS-FOR-EXPOSURE | NUMBER | 5 | Populated from 4020. See definition there. |
| 7925~ | PAOUT-VIDEO-PROGRAM-AIRING-ID | NUMBER | 9 | Populated from 4025. See definition there. |
| 7930~ | PAOUT-RECORDING-PLAYBACK-ID | NUMBER | 9 | Populated from 4030. See definition there. |
| 7935~ | PAOUT-PLAYBACK-DURATION-IN-SECS | NUMBER | 5 | Populated from 4035. See definition there. |
| 7940~ | PAOUT-HOUSE-DEMOGRAPHIC-CODE | Char | 8 | Populated from 4040. See definition there. |
| 7945~ | PAOUT-HOUSE-GEOGRAPHIC-CODE | Char | 8 | Populated from 4045. See definition there. |
| 7950~ | PAOUT-VIDEO-VIEW-DEVICE-TYPE-CD | Char | 8 | Populated from 4050. See definition there. |
| 7953~ | PAOUT-VIDEO-CONTENT-PART | number | 99999 | Populated from 4053. See definition there. |
| 7954~ | PAOUT-VIDEO-CONTENT-PART-ID | number | 99999 | Populated from 4054. See definition there. |
| 7955~ | PAOUT-PLAYBACK-SECOND-TALLY | number | 99V99 | Populated from 4055. See definition there. |
| 7960~ | PAOUT-PLAYBACK-SECOND-MODE | Char | 2 | Populated from 4060. See definition there. |
| 7965~ | PAOUT-SESSION-VOLUME-LEVEL | NUMBER | 2 | Populated from 4065. See definition there. |
| 7970~ | PAOUT-PERCENT-CONTENT-VISIBLE | NUMBER | 3 | Populated from 4070. See definition there. |
| 7975~ | PAOUT-FOREGROUND-BACKGROUND-IND | Char | 1 | Populated from 4075. See definition there. |
| 7985~ | PAOUT-PICTURE-IN-PICTURE-IND | Char | 1 | Populated from 4085. See definition there. |
| 7990~ | PAOUT-PERCENT-OF-SCREEN-THIS-VIDEO | Number | 3 | Populated from 4090. See definition there. |

7900 — 7902 — 7904 — 7906

MEASURING VIDEO VIEWING

CROSS-REFERENCE TO RELATED APPLICATIONS

This application is a continuation of U.S. patent application Ser. No. 17/159,974, filed Jan. 27, 2021, which is a continuation of U.S. application Ser. No. 13/567,073, filed on Aug. 5, 2012 (now U.S. Pat. No. 10,945,011), which is a continuation-in-part of U.S. patent application Ser. No. 12/981,301, filed on Dec. 29, 2010 (now U.S. Pat. No. 8,365,212). All of the above priority applications are hereby incorporated by reference in their entireties.

This application is also related to the co-pending application U.S. application Ser. No. 13/052,026 filed on Mar. 18, 2011 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING" by the present inventor which is incorporated by reference in its entirety but is not admitted to be prior art.

This application is also related to the co-pending application U.S. application Ser. No. 13/360,704 filed on Jan. 28, 2012 entitled "SYSTEM AND METHOD FOR MEASURING LONGITUDINAL VIDEO ASSET VIEWING AT A SECOND-BY-SECOND LEVEL TO UNDERSTAND BEHAVIOR OF VIEWERS AS THEY INTERACT WITH VIDEO ASSET VIEWING DEVICES THAT ACCESS A COMPUTER SYSTEM THROUGH A NETWORK" by the present inventor which is incorporated by reference in its entirety but is not admitted to be prior art.

PROGRAM LISTING

This patent submission contains one (1) program listing as shown in the table below. The following program listing is incorporated in this Specification by reference.

| Name of the ASCII Text file | Date of Creation | Size in bytes |
|---|---|---|
| 1. Orlowski-Measuring-Video-Program-Viewing-Source-Code.txt | Aug. 5, 2012 | 385,475 |

Note:
Variable names used in program correspond to specification, but may not match exactly.

BACKGROUND

Prior Art

The following is a tabulation of some prior art that presently appears relevant:

U.S. Patents

| Patent Number | Class | Issue Date | Patentee |
|---|---|---|---|
| 7,383,243 | 725/2 | Jun. 3, 2008 | Conkwright, et al. |
| 7,590,993 | 725/35 | Sep. 15, 2009 | Hendricks, et al. |

U.S. Patent Application Publications

| Publication Number | Kind Code | Class | Publication Date | Applicant |
|---|---|---|---|---|
| 20070074258 | A1 | 725/105 | Mar. 29, 2007 | Wood; Catherine Alexandra |
| 2010/0145791 | A1 | 705/14.41 | Jun. 10, 2010 | Canning; Brian P. |
| 20060168609 | A1 | 725/9 | Jul. 27, 2006 | Chen; Michael A. |

Background Information

General Statement of Problem

With the ever increasing number of consumer choices for television viewing, it is important for advertisers, content producers, and service providers such as cable television and satellite television and internet protocol television companies to be able to accurately measure audience viewership at various levels including video program, video program airing, video program airing segment, demographic group, geographic group, and viewing device type. The device type must allow measurement across various platforms such as set top box, PC, tablet, smart phone, IP TV, etc. and various viewing device characteristics. Each of these viewing measures must be available for various forms of video viewing including Linear TV, Digital Video Recording and Playback, and Video on Demand. Traditional methods of measuring television viewership do not provide one-second level viewing information for Linear TV, Digital Video Recording and Playback, and Video on Demand even though this could be extremely helpful to advertisers, content producers, and content providers.

Advertising Industry Problem

Producing television ads and purchasing ad time to run those ads is expensive. Ideally, the advertising purchased with those dollars can be correlated with ad impressions. Unfortunately, measuring ad impressions or ad viewership is very difficult, especially when there are hundreds of channels and many of them are lightly viewed. The problem is magnified by channel-surfing and by multi-screen activity wherein one person may use personal viewing devices, traditional cable or satellite television, and perhaps computer based viewing. While traditional survey techniques provide audience measures for popular channels, they are inadequate for lightly-viewed channels, which can be up to 80% of the channels. In today's competitive media environment, television advertisers need accurate and detailed viewing information for programs, for program airings, and for segments in program airings with suitable breakouts for demographic, geographic and device characteristic so that they can measure the effectiveness of their advertising.

In a Linear viewing environment, advertisers need detailed information on viewing of the ads that they pay to air. When a program is aired multiple times, viewing will vary depending on various factors such as time of day when the program aired. Advertisers need to understand viewership of each program airing and of the program as a whole across all airings in order to make effective ad placement decisions. Additionally advertisers need insight into the demographic characteristics of their viewers, their geographic location, and the type of device used to view the content.

In a Digital Video Recording environment advertising effectiveness can be measured by observing viewer response to ads; do viewers view the ads or do they fast forward or skip past them? Advertisers need to understand whether or not their ads are being seen by viewers. In the case of DVR, the advertisers need measurements on how many viewers saw each ad within so many hours of the linear airing or the DVR recording. Furthermore, they need to understand which viewers view the ads and which viewers skip the ads or fast forward through the ads.

Advertisers need to be able to measure ad impressions in both a linear viewing environment and in DVR and VOD environments. Additionally, they need second-by-second measurements to determine channel surfing activity during ads. Such measurement will allow advertisers to measure the effectiveness of their ads.

I have not found any patents or patent applications that teach how to use set top box data to efficiently analyze second-by-second viewership of advertising to produce the detailed information that advertisers need.

Television Network Problem

Television networks need to create an appealing programming schedule with content that the viewers are interested in viewing. It is difficult for television networks to get accurate audience feedback, particularly for lightly viewed networks. They need to be able to measure viewing patterns for each show. They also need to understand viewership across viewing platforms or viewing devices and to understand viewership in a multi-screen world. The diversity of the viewing audience makes this more difficult to measure. Traditional measurement tools do not provide the detailed information needed to help television networks understand how viewers are responding to the content. The result is that television networks may develop programming schedules that do not appeal to the audience. This is wasteful.

Content Producers Problem

Producing television content is often expensive. It is difficult for the content producers to get accurate audience feedback. Additionally, there is not one audience, but many audiences, because of the wide variety of viewer interests. Furthermore, any person may view content on multiple devices. The content producers need to tailor the content to the audience. With the increasing number of viewing choices it is all the more important to be able to accurately measure viewership on diverse platforms in order to be able to justify advertising fees. Traditional measurement tools do not provide the detailed information needed to help producers and writers to understand how viewers are responding to the content. The result is that producers may develop content that lacks interest to the audience. This is wasteful.

Cable Television Industry Problem

In the cable television industry, content providers offer consumers hundreds of channels. Cable television companies pay very large amounts of money for content. It is imperative for the cable television companies to be able to accurately measure audience viewership in order to understand what value the various programs bring to their customers. They must understand viewership across viewing platforms or viewing devices; they must understand viewership in a multi-screen world. Also, by understanding the time of day when various programs are viewed, the cable television companies can create more attractive viewing schedules for their customers. Additionally, as cable television companies are able to accurately measure audience viewership, they will be able to better negotiate with the program providers on the price to be paid for programming content and with advertisers on the price to charge for airing advertising.

Satellite Television Industry Problem

The satellite television industry faces the same problems as the cable television industry in regard to understanding what programming the viewers are watching and at what time of day and on what device. In general they have the same need to understand viewer behavior as do the cable television companies.

Internet Protocol Television Industry Problem

The Internet Protocol television (IP TV) industry faces the same problems as the cable television industry in regard to understanding what programming the viewers are watching and at what time of day and on what device. In general they have the same need to understand viewer behavior as do the cable television companies.

Need for Information about the Customer

In addition to these issues, cable television companies, satellite television companies, IP TV providers, television content providers, television advertisers, and other interested parties are continually desiring to know more about the customers they serve, the patterns of customer interactions, the content customers find interesting or that keeps their attention, the ads they view, the time of day when various program are viewed, how programs compare with one another in keeping viewer interest, and numerous other measures. With the advent of portable video viewing devices, the need to understand viewer behavior is even more important.

Fortunately, currently available technology enables the collection of raw data that, with proper analysis, can begin to answer many of these questions, and even do so with great specificity.

We will now look at some sources of raw data in the television industry.

Video Viewing Activity Data Sources

Since my original United States patent application having application Ser. No. 12/981,301 filed on Dec. 29, 2010, the industry has continued to mature. In the past it was common to refer to this data as Channel Tuning activity. While that term is accurate, in this specification I will often use the more general term Video Viewing Activity to reflect that I am analyzing video viewing activity which may include linear viewing, DVR playback, and VOD viewing.

Within the video viewing space there are collection systems in place for collecting linear viewing activity, and for collecting DVR recording and playback activity, and for collecting VOD playback activity. Such collection systems include switched digital video collection systems, set top box data collection systems, IP Television collection systems, EBIF agents, etc. Many such applications are now well established in the industry; others are continually being developed. Such data collection is beyond the scope of this patent application. It will suffice to know that the needed video viewing activity is available.

Video Program Schedule Data Sources

As with the collection of video viewing activity data, the availability of program schedule data is rapidly expanding. There are various industry standards in this area and new standards are being developed. For purposes of media measurement, these systems can provide the detailed information about the video programs, program schedules identifying when they aired in the various markets, how the video programs can be segmented, what video asset played in each segment, and whether the segment allowed static or dynamic content, and other helpful information.

Media Measurement Data Model

This specification assumes that viewer interaction data can be delivered in a format that allows my Measurement Engine 200 to ingest it. I will refer to this format as a Media Measurement Data Model or MMDM. Once data is available in this format, it can be readily processed using algorithms which I will teach about in this specification.

As to loading the viewing data to this Media Measurement data model, there are any number of methods that can be used to do that. The loading of the Media Measurement data model is beyond the scope of this patent application.

File Transfer to Receive the Data

Once the Media Measurement Data Model has been populated with the necessary data, it is a simple task to make that data available to a Measurement Engine whether through SQL queries, data base extracts, XML messages, or any other computer readable format.

Encryption may be applied for data security purposes. Compression may be applied to reduce data transfer volumes.

Additionally, once the data is enriched, key identifiers can be hashed or encrypted or de-identified to protect the identity of the viewer.

Existing Tools for Data Analysis

We have seen by way of background that video viewing activity data and program schedule data is readily available. Regarding tools for using this data to analyze detailed viewing patterns, I am not aware of any vendor solutions or patents that load second-by-second channel tuning data or video asset viewing device usage data into a Data Structure in the memory of a computer to identify second-by-second video viewing activity identifying the video program identifier, the video program airing identifier, the viewing session identifier, the demographic identifier of the viewer, the geographic location of the viewer, or the device type used by the viewer to then calculate viewing activity for a program or a part of a program to produce viewing metrics.

Relevant Patents

The patents and patent applications identified below are only mildly relevant. I include them here to acknowledge that others have taught about using set-top box data, but none have used it as I teach in this application and none have been able to produce the detailed metrics that I have identified herein.

Examples include:

Conkwright, et al. in U.S. Pat. No. 7,383,243 issued Jun. 3, 2008 teaches about collecting set-top box data for the purpose of predicting what consumers will do, not for the purpose of understanding actual viewer behavior. It appears that he does not teach the loading of a data structure containing buckets representing individual units of time to analyze viewing behavior.

Hendricks, et al. in U.S. Pat. No. 7,590,993 Method and apparatus for gathering programs watched data issued Sep. 15, 2009 teaches about collecting tuning data from the set-top box and combining that with other data in a data base to determine the types of programming the STB tunes to. It appears that he does not teach the loading of a data structure containing buckets representing individual units of time to analyze viewing behavior.

Relevant Patent Applications

Wood; Catherine Alexandra in U.S. Patent Application 20070074258 dated Mar. 29, 2007 teaches about collecting subscriber activity data, such as channel changes generated by the subscriber while watching video or TV in an IPTV system. It appears that she does not teach the loading of a data structure containing buckets representing individual units of time to analyze viewing behavior. It appears instead that she teaches loading the channel tuning data to a relational data base and then performing various SQL based queries against that data base.

Eldering; Charles A.; et al. in U.S. Patent Application 20080127252 dated May 29, 2008 teaches about targeted advertising. He notes that SDV systems have the ability to provide viewership counts. It appears that he does not teach the loading of a data structure containing buckets representing individual units of time to analyze viewing behavior.

Allegrezza; Fred J.; et al. in U.S. Patent Application 20090077577 dated Mar. 19, 2009 teaches about aggregating information obtained from the messages to generate channel viewership information identifying a number of subscribers tuned to each broadcast channel over a period of time, but it appears to be based simply on tune-in activity. It appears that he does not teach the loading of a data structure containing buckets representing individual units of time to analyze viewing behavior.

Bou-Abboud; Claude H. in U.S. Patent Application 20070214483 dated Sep. 13, 2007 teach about a tool for predicting capacity demands on an electronic system. It appears that they do not teach the loading of a data structure containing buckets representing individual units of time to analyze viewing behavior.

Canning; Brian P.; et al. in U.S. Patent Application 20100145791 dated Jun. 10, 2010 teach about storing data in multiple shards and supporting queries against the data. It appears that he does not teach the loading of a data structure containing buckets representing individual units of time to analyze viewing behavior.

Summary of Short-Comings in Data Analysis Tools

In general, a short-coming of these methods is that the foundation is a non-procedural language (SQL) used in conjunction with a relational data base which together do not have the detailed processing capability required to perform complex analytics. In such an environment, in order to capture the richness of certain aspects of the channel tuning data, one would have to explode the data out into individual rows with one row for each second of viewer activity. In such an environment, this is extremely expensive because adding a primary key to each data record simply to record the second (time) multiplies the volume of data many times over because the size of the primary key requires much more storage space than the data being recorded. Thus we see that using a non-procedural language (SQL) in conjunction with a relational data base is very inefficient and requires extremely powerful data base servers to analyze this data. In contrast I am able to produce these complex analytics on a simple personal computer.

As a result of not being able to perform the detailed analytics required, the behavioral and device usage information contained in the data remains hidden from interested parties.

SUMMARY

In accordance with one embodiment, I disclose a computer-implemented method of using video program viewer interaction data that has been loaded to a media measurement database as input to a measurement engine which then calculates Linear, DVR, and VOD asset viewing activity at three levels: (a) Video Program, (b) Video Program Airing, (c) Video Program Airing Segment, where each level provides summary metrics for groupings of Demographic, Geographic, and/or Device Characteristic, and also second-by-second viewing metrics, including counting advertising impressions, within the Demographic, Geographic, Device groupings. System also accounts for reduced value of ad viewing when viewer is using trick plays or when viewer delays viewing recorded content. Together these metrics provide detailed information on customer viewing behavior which can be used to drive business decisions for service providers, advertisers, and content producers. Additionally, a viewing histogram analysis is produced.

Advantages

By creating Linear, DVR, and VOD asset viewing activity at three levels: (a) Video Program, (b) Video Program Airing, (c) Video Program Airing Segment, where each level provides summary metrics for groupings of Demographic Code, Geographic, and/or Device Characteristic, and also second-by-second viewing metrics within the Demographic, Geographic, Device groupings I am able to provide detailed viewing metrics that could not be produced previously. Existing analysis techniques simply do not allow the creation of the detailed viewing metrics which I have been able to produce. These metrics will allow service providers, advertisers, and content producers to make intelligent business decisions benefiting both themselves and their customers.

In my co-pending United States patent application having application Ser. No. 12/981,301 filed on Dec. 29, 2010 entitled "SYSTEM AND METHOD FOR ANALYZING HUMAN INTERACTION WITH ELECTRONIC DEVICES THAT ACCESS A COMPUTER SYSTEM THROUGH A NETWORK", which is incorporated in its entirety but is not admitted to be prior art, and in my co-pending United States patent application having application Ser. No. 13/052,026 filed on Mar. 18, 2011 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING", which is incorporated in its entirety but is not admitted to be prior art, I taught populating a Data Structure with identifying information and device usage information such as channel tuning data to create a foundation upon which a comprehensive set of metrics can be produced. In those applications I also taught loading the tuning data on a second-by-second basis into buckets in a data structure for analytics.

In my co-pending United States patent application having application Ser. No. 13/360,704 filed on Jan. 28, 2012 entitled "SYSTEM AND METHOD FOR MEASURING LONGITUDINAL VIDEO ASSET VIEWING AT A SECOND-BY-SECOND LEVEL TO UNDERSTAND BEHAVIOR OF VIEWERS AS THEY INTERACT WITH VIDEO ASSET VIEWING DEVICES THAT ACCESS A COMPUTER SYSTEM THROUGH A NETWORK", which is incorporated in its entirety but is not admitted to be prior art, I taught populating a Data Structure with identifying information and device usage information such as channel tuning data to create a foundation upon which a comprehensive set of metrics can be produced. In that applications I taught loading the tuning data on a second-by-second basis into buckets in a data structure and populating the buckets with a channel call sign to indicate viewing of the channel during that second; I then used this as a basis for creating analytics.

In this application I populate a Video Viewing Analysis Data Structure with information which identifies a video program being viewed, a video program airing being viewed, and fields to identify the demographic, geographic, and device information related to the viewer and the viewing device he is using. In my previous Application, in one embodiment I taught populating the buckets with a 1 to indicate viewing of the channel during that second. In another previous application I taught populating the buckets with a channel call sign to indicate viewing of the channel during that second. In this application, in one embodiment, I teach populating the bucket with various Activity Fields including (a) an identifier to indicate the activity of the user during that second with activity being things such as Play, Skip, Forward (at various speeds), Reverse (at various speeds), etc., (b) volume level, (c) foreground/background indicator, (d) percent content visible, (e) picture in picture indicator, (f) a percentage of screen this video, and (g) a viewer interaction score which assigns a value to the viewing activity. The viewer interaction score reflects the level of user engagement with the video such that normal viewing earns a high score while fast forward viewing or reverse viewing earns a reduced score. Additionally, other factors such as muted viewing, delayed viewing, occluded viewing, and other factors all reduce the score.

The reader will recognize that in each of these several embodiments I teach loading values that identify second-by-second video program viewing activity to selected buckets in a viewing detail data structure based on the beginning and ending time of the user interaction, thus identifying second-by-second video program viewing activity showing whether or not the video asset viewing device was viewing the video content during each second of a period of interest and measuring the level of user involvement during each second.

As noted, in this embodiment I introduce the concepts of calculating viewing activity during trick plays to gain additional insight into viewer behavior during playback of DVR and VOD assets and also during certain live viewing that supports trick plays.

By combining the teaching of my co-pending patent applications with the teachings of this application I am able to produce detailed viewing metrics based on a one-second level of granularity for Linear, including time-shifted linear viewing, DVR and VOD viewing.

After populating the Video Viewing Analysis Data Structure, I can then use that data to calculate Linear, DVR, and VOD activity at three levels: (a) the Video Program, (b) the Video Program Airing, and (c) the Video Program Airing Segment. For each of these three levels, I calculate viewing activity at additional levels of detail.

For the Video Program, I calculate viewing activity at the level of Demographic identifier, Geographic identifier, and Viewing Device Characteristic. Within the various Demo-Geo-Device combinations, I calculate second-by-second viewing activity for each second of the Video Program.

For the Video Program Airing, I calculate viewing activity for multiple airings of the Video Program. This is done at the level of Demographic identifier, Geographic identifier, and Viewing Device Characteristic within the Video Program Airing. Within the various Demo-Geo-Device combinations for the Program Airing, I calculate second-by-second viewing activity for each second of the Video Program.

For the Video Program Airing Segment, I calculate viewing activity for each of the various Segments that may be defined within the Video Program. Because each of the multiple airings of the Video Program will have different viewings of the various Segments, I calculate viewing of each Segment within the context of the Video Program Airing. This is done at the level of Demographic identifier, Geographic identifier, and Viewing Device Characteristic within the Video Program Airing Segment. Within the various Demo-Geo-Device combinations for the Program Airing Segment, I calculate second-by-second viewing activity for each second of the Video Program.

These various level of aggregation can be illustrated as follows:

Video Program

| Level 1 - Video Program |
| Level 2 - Demo-Geo-Device |
| Level 3 - Second-by-second activity |

Video Program Airing

| Level 1 - Video Program |
| Level 2 - Video Program Airing |
| Level 3 - Demo-Geo-Device |
| Level 4 - Second-by-second activity |

Video Program Airing Segment

| Level 1 - Video Program |
| Level 2 - Video Program Airing |
| Level 3 - Video Program Airing Segment |
| Level 4 - Demo-Geo-Device |
| Level 5 - Second-by-second activity |

Once the data is captured at these three levels: (a) the Video Program, (b) the Video Program Airing, and (c) the Video Program Airing Segment, the system can run additional calculations to produce a very comprehensive set of metrics on video asset viewing for linear, DVR, and VOD activity. The metrics can then be output as (i) data files that can be read by a computer program, (ii) data base tables, (iii) electronic messages, or (iv) a spreadsheet.

A person skilled in the art will readily see the benefits of loading the resulting metrics to a relational data base where additional queries and analytics can be run using standard SQL. Additionally, the resulting files may be loaded to other statistical analysis tools or data base structures. As a non-limiting example, metrics calculated by the Measurement Engine 200 can be loaded to a data base in support of longer term analysis.

The Measurement Engine 200 presented in this embodiment provides the ability to produce metrics with a level of detail not possible previously. These metrics are described in detail in FIG. 17 (Video Program Viewing Activity Data Structure), FIG. 19 (Video Program Airing Viewing Activity Data Structure), and FIG. 21 (Video Program Airing Segment Viewing Activity Data Structure). The metrics shown in these Figures all provide information useful for understanding viewer behavior; understanding how viewers interact with video programming on traditional television and internet protocol television and other video viewing devices; and understanding ad and program viewing habits. Such metrics will provide valuable information for advertisers, service providers (cable television companies, satellite television companies, and/or internet protocol television providers), advertising agencies, and other interested parties. The Measurement Engine 200 then creates various files containing the calculated metrics in a format suitable for loading to a database.

These and other advantages of one or more aspects will become apparent from a consideration of the ensuing description and accompanying drawings.

Data Encryption

To protect the privacy of the viewer and/or to comply with various laws and/or regulations, service providers (cable television companies, satellite television companies, and/or internet protocol television providers) may anonymize and/or encrypt and/or de-identify any data that could identify a specific customer or viewer.

Within the various embodiments presented herein, applying consistent encryption algorithms to the video asset viewing device identifiers (Set-top box id's) in the Media Measurement database and the downstream files allows the Measurement Engine 200 to produce the metrics identified herein while protecting viewer privacy.

Definitions

The following are definitions that will aid in understanding one or more of the embodiments presented herein:

Adjustment factors are those things which are used to adjust or calculate or influence the viewer interaction score which identifies the value of the viewing activity. The following are nonlimiting examples of adjustment factors: Volume level/Muting, Percent Content Visible, Foreground/Background viewing, Playback mode and Trick plays while viewing, and delay in viewing DVR recorded programs, picture in picture, and percentage of screen this video.

Buckets means individual cells in a Data Structure. Nonlimiting examples include:
(i) addressable fields in a table in a COBOL program,
(ii) addressable fields in an array or similar structure in a 'C' program or a C++ program,
(iii) cells in a spreadsheet.

COBOL is the acronym of a business oriented computing language.

Computer readable format means any data format that can be read by a computer program or a human being as necessary. Nonlimiting examples include:
(i) formatted text files,
(ii) pipe delimited text files,
(iii) data base tables,
(iv) Extensible Markup Language (XML) messages
(v) a printed report.

Computer system accessed through a network means any computer system, any individual piece of computer equipment or electronic gear, or any combination of computer equipment or electronic gear which enables or facilitates the viewer interaction with the video asset viewing device. Nonlimiting examples include:
(i) cable television system,
(ii) cable television switched digital video system,
(iii) cellular phone network,
(iv) satellite television system,
(v) web server,
(vi) any individual piece of computer equipment or electronic gear,
(vii) any combination of computer equipment or electronic gear.

Data analysis computer system means a combination of one or more computers on which a Data Analysis Program or Programs can be executed.

Data analysis computer of known type means any commonly available computer system running a commonly known operating system. Nonlimiting examples include:
(i) a standard personal computer running WINDOWS® XP operating system from MICROSOFT® Corporation,
(ii) a computer running the UNIX operating system,
(iii) a computer running the Linux operating system,
(iv) a computer in a cloud computing environment,
(v) a set-top box with its operating system,
(vi) A mainframe computer with its operating system,
(vii) a standard personal computer running WINDOWS 7 Professional operating system from MICROSOFT® Corporation.

Data analysis program means a computer program or programs that are able to execute on a Data analysis computer of known type.

Data base table means any relational data base table structure or comparable data base object.

Data structure means a place in a computer program or computer system where data can be stored in tabular form with identifying fields and buckets associated with those identifying fields in such a manner that formula and algorithms can be run against the data to produce meaningful metrics. Nonlimiting examples include:
(i) table in a COBOL program,
(ii) array or similar structure in a 'C' program or a C++ program,
(iii) spreadsheet;
such structures may be stored in the memory of the computer, but they could also be stored on electronic disk or other computer hardware.

Demographic information means any data item that can describe a characteristic of a viewer or a subscriber or a household associated with a viewer who is operating the video asset viewing device. Nonlimiting examples include income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level.

Derive, as used in 'Derive Viewing Activity Information' means any method or process of taking the source data and making it ready to populate a destination field or fields. This may include a direct move of the data from the source to the destination or it may include various calculations, substitutions, manipulations, or derivations performed on the source data to make it ready to populate the destination fields or fields.

Device Characteristic means any feature or capability or aspect or descriptive qualifier or identifier of a video viewing device. Nonlimiting examples include that this may identify the type of device such as a set-top box, a tablet, a smart phone; a capability of the device such as the ability to record video or to support multiple viewing windows, or a manufacturer identifier.

Device Type is a subset of Device Characteristic where device type may, as a nonlimiting example, identify the type of device such as a set-top box, a tablet, a smart phone.

Digital Video Recorder means a device that records video content from a network for later playback. This includes but is not limited to set-top box DVR, network DVR, and cloud DVR.

DVR—see Digital Video Recorder.

Electronic message means any computer readable output that can be used as input to another computer or read by a human. Nonlimiting examples include:
(i) data output in Extensible Markup Language format,
(ii) data output in Hypertext Markup Language format, etc.

Geographic information means any service area or any network hierarchy designation or marketing area or other designated area used by a cable television company or a satellite television company or IP Television delivery company or video asset delivery system. The boundary or description of a geographic area is defined based on the needs of the service provider. Nonlimiting examples include a Market in a cable company network, a Headend in a cable company network, a Hub in a cable company network, a census tract, a cell tower identifier, a service area for satellite TV, advertising zone, a zip code, or some other geographic identifier. The geographic information may then be used to identify the location of a video asset viewing device or geographic information about the about the house associated with the device or the location of the device at the time of the viewer interaction in the event that the viewer interaction occurs in a location different than the location of the house associated with the device.

Individual part of video content means any portion of video content that may be of interest in relation to measuring viewer interaction with the video content. Nonlimiting examples include:
(i) seconds of content,
(ii) minutes of content,
(iii) quarter hours of content,
(iv) hours of content,
(v) four hour blocks of content,
(vi) user defined segments of content,
(vii) a part of a second,
(viii) a group of seconds,
(ix) any other useful unit of time for measurement.

Interacting with video content means any interaction between the viewer and the video content including but not limited to viewing content, recording content, playing back recorded content including use of trick modes. Recorded content can be DVR recording or VOD content.

Network means any computer network. Nonlimiting examples include:
(i) a cable television network,
(ii) a cellular telephony network,
(iii) hybrid fiber coax system,
(iv) a satellite television network,
(v) a wi-fi network,
(vi) any means that supports communication among video asset viewing devices or electronic devices or computers or computer systems.

Outputting the contents means creating a delimited file, updating a database table, inserting to a database table, writing an XML message, or any activity that allows the calculated values to be used by downstream processes.

Pipe delimited text files means data files where the fields are separated by the "l" character.

Period of interest means a period of time with a defined starting point and a defined ending point.

Populated based on the value of means using the value of a source field to set the value of a destination field where the source may be directly loaded to the destination, or the source may be substituted with a code value which is then loaded to the destination, or the source may be manipulated in some way to create the value which is loaded to the destination.

Set-top box means a video asset viewing device that receives external signals and decodes those signals into content that can be viewed on a television screen or similar display device. The signals may come from a cable television system, a satellite television system, a network, or any other suitable means. A set-top box may have one or more tuners. The set-top box allows the user to interact with it to control what is displayed on the television screen. The set-top box is able to capture the commands given by the user and then transmit those commands to another computer system. For purposes of this application, stating that a set-top box tunes to a channel is equivalent to stating that a tuner in a set-top box has tuned to a channel. A set-top box may also play back previously recorded video content.

Spreadsheet means any commonly known electronic worksheet format. Nonlimiting examples include:
(i) MICROSOFT® EXCEL® files.

STB means Set-top box.

Take into account is a general term indicating that the value in the field referred to is set using, or is calculated using, or is valued by, or is derived from, or is adjusted by, or is determined in some measure by another related field. The related field may be, but is not limited to, video viewing session mode, video viewing session volume level, video viewing session percent content visible.

Trick Play Mode means using features of the video viewing device to execute operations such as Play, Fast Forward at various speeds (1×, 2×, 3×, 4×), Pause, Skip, Reverse at various speeds (1×, 2×, 3×, 4×), Slow play, slow reverse, and similar activities.

Tuner means a tuner in a Set-top box.

Tuner index means an identifier of a tuner in a Set-top box.

Value identifying the viewing activity mode means any value that identifies the viewing activity type including but not limited to mnemonics such as PL, F1, R1 for Play, Forward 1× speed, Reverse 1× speed, or actual names such as Play, Forward 1×, Reverse 1×, or codes assigned to the activity such as 1 (for Play), 2 (for Reverse 1×), etc. All of these are nonlimiting examples.

Video asset means any programming content that may be viewed and/or heard. A Video Program may contain multiple Video Assets. Nonlimiting examples of Video Asset include:
(i) advertisements or commercials,
(ii) movies,
(iii) sports programs,
(iv) news casts,
(v) music.

Video asset viewing device means any electronic device that may be used either directly or indirectly by a human being to interact with video content where the video content is provided by a cable television system or a satellite television system or a computer system accessed through a network. Nonlimiting examples include: Gaming station, web browser, MP3 Player, Internet Protocol phone, Internet Protocol television, mobile device, mobile smart phone, set-top box, satellite television receiver, set-top box in a cable television network, set-top box in a satellite television system, cell phone, personal communication device, personal video recorder, personal video player, two-way interactive service platforms, personal computer, tablet device.

Viewer means the human being causing a Viewer interaction; the user of a Set-top box or a Video asset viewing device.

Viewer interactions means any identifiable activity that a Video asset viewing device operator may do in regard to a Video asset viewing device and where such activity can be captured by the video asset viewing device or by the computer system, accessed through the network, that supports the device. Nonlimiting examples include:
(i) power on/power off, open web page, close web page,
(ii) channel up/channel down/channel selection, play video content on web browser,
(iii) volume up/volume down/mute/unmute,
(iv) any trick play such as fast forward, rewind, pause
(v) recording video content,
(vi) playing back recorded video content,
(vii) invoking a menu, choosing a menu option,
(viii) any response to a screen prompt.

Viewers interacting with video content through a network means that the video content was delivered through a network. The content may be live content delivered through a network; or live content that was recorded on a local device at the time it was delivered through a network and then played back later with or without the network access; or it may be DVR content in the cloud; or it may be Video on Demand content delivered through a network.

Viewing activity information means information derived from any of the following: Linear viewing including time-shifted linear viewing, Digital Video Recorder recording and playback/viewing, Video on Demand viewing.

Viewing activity type means the general category of viewing activity including but not limited to Linear viewing including time-shifted linear viewing, Digital Video Recorder recording and playback/viewing, Video on Demand viewing.

Viewing metrics means any value calculated by a Data Analysis Program.

Window of time of interest for analysis means any period of time during which it is desired to measure the viewer interaction with a video asset viewing device accessed through a network. Nonlimiting examples include:
(i) minutes in a day,
(ii) commercial periods during a television program,
(iii) quarter hours of a day,
(iv) hours of a day,
(v) four hour blocks in a day,
(vi) days,
(vii) any period of time useful for analysis,
(viii) any period of time that can be defined by a starting date and time and an ending date and time Etc.

Viewer interaction score means a numeric value (score) or a rating or a character code (A, B, C, etc.) which is assigned to the viewing activity which identifies the value of the viewing activity. The viewer interaction score is set according to various algorithmic rules which take into account various Adjustment factors.

BRIEF DESCRIPTION OF THE DRAWINGS

In the drawings, closely related figures have the same number but different alphabetic suffixes.

FIG. 2 illustrates an exemplary data structure for the Video Viewing Analysis Data Structure which Is used to record the second-by-second viewing activity of a video program airing based on a Linear Viewing Session or a DVR Playback Session or a VOD viewing session.

FIG. 3 is a flowchart illustrating an overview of an exemplary process for receiving (a) viewing activity stored in a Media Measurement Database, and (b) data in various control files which control processing, and then using a computer to analyze these data sources to produce video viewing metrics, according to one embodiment.

FIG. 5 relates to Playback Mode. FIG. 5-A illustrates an exemplary record layout for a Playback Mode File 110 record formatted for use as input to the Measurement Engine 200, according to one embodiment. FIG. 5-B illustrates an exemplary data structure for storing Playback Mode data in the memory of a computer for use by the Measurement Engine 200, according to one embodiment.

FIG. 7 relates to Playback Delay Penalty. FIG. 7-A illustrates an exemplary record layout for a Playback Delay Penalty File 120 record formatted for use as input to the Measurement Engine 200, according to one embodiment. This relates to part 120. FIG. 7-B illustrates an exemplary data structure for storing Playback Delay Penalty data in the memory of a computer for use by the Measurement Engine 200, according to one embodiment. FIG. 7-C illustrates sample data, according to one embodiment.

FIG. 9 relates to Histogram Definition. FIG. 9-A illustrates an exemplary record layout for a Histogram Definition File 130 record formatted for use as input to the Measurement Engine 200, according to one embodiment. This relates to part 130. FIG. 9-B illustrates an exemplary data structure for storing Histogram Definition data in the memory of a computer for use by the Measurement Engine 200, according to one embodiment.

FIG. 11 illustrates an exemplary record layout for a Video Program Airing File 150 formatted for use as input to the Measurement Engine 200 with FIG. 11 illustrating the file format, according to one embodiment.

FIG. 13 illustrates an exemplary record layout for a Video Program Segment File 160 formatted for use as input to the Measurement Engine 200, according to one embodiment. FIG. 13 relates to Video Program Segments. FIG. 13-A illustrates an exemplary record layout for a Video Program Segment File 160 record formatted for use as input to the Measurement Engine 200, according to one embodiment. This relates to part 160. FIG. 13-B illustrates an exemplary data structure for storing Video Program Segment data in the memory of a computer for use by the Measurement Engine 200, according to one embodiment.

FIG. 15 relates to the Video Viewing Event File. FIG. 15-A illustrates an exemplary record layout for Linear Viewing Activity—Video Viewing Event File 170 formatted for use as input to the Measurement Engine 200, according to one embodiment. FIG. 15-B illustrates an exemplary record layout for DVR and VOD Viewing Activity—Video Viewing Event File 170 formatted for use as input to the Measurement Engine 200, according to one embodiment.

FIG. 17 illustrates an exemplary data structure used for Calculating Video Program Viewing Activity in the memory of a computer, according to one embodiment.

FIG. 19 illustrates an exemplary data structure used for Calculating Video Program Airing Viewing Activity in the memory of a computer, according to one embodiment.

FIG. 21 illustrates an exemplary data structure used for Calculating Video Program Airing Segment Viewing Activity in the memory of a computer, according to one embodiment.

FIG. 32 illustrates summary information and an exemplary record layout for the Viewing Statistics file 210 which is produced by the Measurement Engine 200 as a result of calculating video asset viewing activity.

FIG. 33 illustrates summary information and an exemplary record layout for the Viewing Histogram file 220 which is produced by the Measurement Engine 200 as a result of calculating video asset viewing activity.

FIG. 34 illustrates summary information and an exemplary record layout for the Video Program Demographic Geographic Device Viewing file 230 which is produced by the Measurement Engine 200 as a result of calculating video asset viewing activity.

FIG. 35 illustrates summary information and an exemplary record layout for the Video Program Viewing Activity by Second file 240 which is produced by the Measurement Engine 200 as a result of calculating video asset viewing activity by second.

FIG. 36 illustrates summary information and an exemplary record layout for the Video Program Airing Demographic Geographic Device Viewing file 250 which is produced by the Measurement Engine 200 as a result of calculating video asset viewing activity.

FIG. 37 illustrates summary information and an exemplary record layout for the Viewing Program Airing Viewing Activity by Second file 260 which is produced by the Measurement Engine 200 as a result of calculating video asset viewing activity by second.

FIG. 38 illustrates summary information and an exemplary record layout for the Video Program Airing Segment file 270 which is produced by the Measurement Engine 200 as a result of calculating video asset viewing activity by second.

FIG. 39 illustrates summary information and an exemplary record layout for the Video Program Airing Segment Demographic Geographic Device file 280 which is produced by the Measurement Engine 200 as a result of calculating video asset viewing activity by second.

FIG. 40 illustrates summary information and an exemplary record layout for the Video Program Airing Segment Viewing Activity by Second file 290 which is produced by the Measurement Engine 200 as a result of calculating video asset segment viewing activity by second.

FIG. 42 illustrates an exemplary record layout for the Video Viewing Analysis File 205 which is produced by the Measurement Engine 200.

DETAILED DESCRIPTION OF THE DRAWINGS

Figure 1:
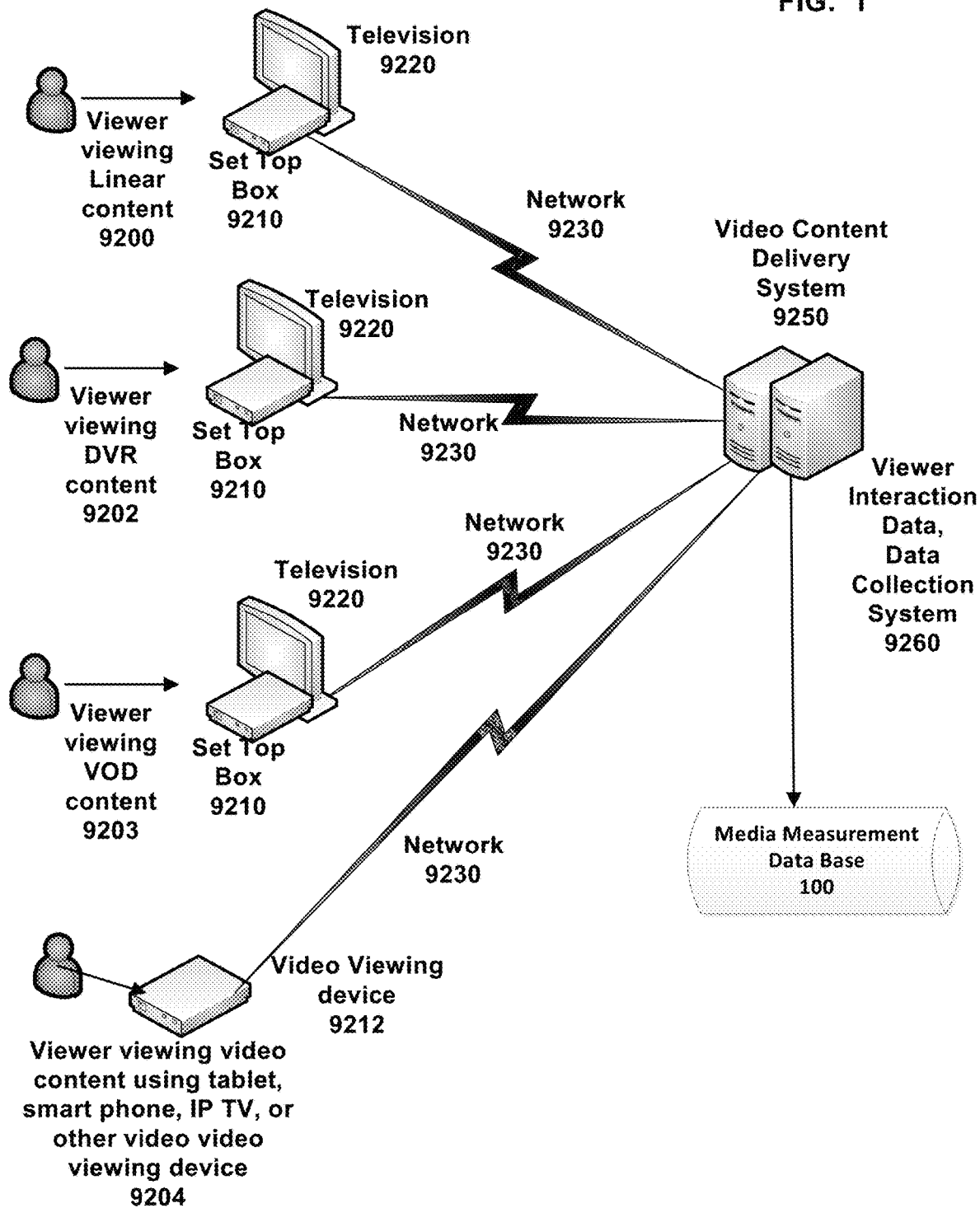
FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base.

When reading the information below, it can be appreciated that these are merely samples of table layouts, format and content, and many aspects of these tables may be varied or expanded within the scope of the embodiment. The table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

Note on Claims reference in drawings—because of the large number of data fields and new concepts taught in this specification, and because a description in the drawings may not use the exact same words or spelling as the corresponding concept in the claims, the reader will note that in limited cases I have added text preceded by the words "Claims reference" to assist the reader in correlating information in the drawings or detailed description of the drawings with the corresponding information in the claims. These references are not meant in any way to restrict the Claims, but rather to clarify the relationship between the Claims and the Specification.

For many of the metrics shown below, I have suggested what the metric indicates. This is not to limit the purpose of the metric to that one usage, but simply to indicate one of potentially many valuable uses for the metric.

Note that the specification and drawings use certain terms interchangeably. The reader will note this most frequently with the terms set-top box and video asset viewing device. The reader will appreciate that a set-top box is merely a specific kind of video asset viewing device. A smart phone, a tablet device, a gaming console are all examples of video asset viewing device. Thus any discussion herein that refers to a set-top box should be read to also include any kind of a video asset viewing device.

In one embodiment the Measurement Engine 200 can be implemented on processors provided by the INTEL® Corporation under the trademark Core™ i3-2120 using single or multiple processor configurations. The operating system offered by MICROSOFT® Corporation under the trademark WINDOWS 7 Professional can be used as the computer operating system. The Measurement Engine 200 can be implemented in a number of programming languages, including but not limited to, COBOL, C and C++.

I have implemented the Measurement Engine 200 and supporting code in FUJITSU® NetCOBOL® for WINDOWS® version 10.1 developed by Fujitsu® and distributed by Alchemy Solutions Inc. This product is available at http://www.alchemysolutions.com or http://www.netcobol.com. The Measurement Engine 200 and all of the supporting processes have been developed and run on a DELL® Vostro 260 with INTEL® Core™ i3-2120 CPU 3.30 GHz with 4.00 GB of RAM running MICROSOFT® WINDOWS 7 Professional Service Pack 1. The computer was purchased from Dell Computer Corporation. The operating system is from Microsoft.

Although the embodiments described herein enable one of ordinary skill in the art to implement (i.e. build) the Measurement Engine 200 and supporting software, it in no way restricts the method of implementation, the Measurement Engine 200 and supporting software being capable of being implemented on a variety of hardware/software platforms using a variety of development languages, databases, communication protocols and frameworks as will be evident to those of ordinary skill in the art.

Note on Media Measurement Data Model

Cable Television Laboratories, Inc. has published a confidential "Audience Data Measurement Specification" as "OpenCable™ Specifications, Audience Measurement, Audience Measurement Data Specification" having Document Control Number "OC-SP-AMD-D01-120711" copyright © Cable Television Laboratories, Inc. 2012 which contains a Media Measurement Data Model database design which can be used as a source of data to the Measurement Engine 200 which I teach how to build in this Application. The teaching in my present application can be implemented in conjunction with that Media Measurement Data Model or with any number of data models as long as the required input data is provided as described herein.

Additionally, my Measurement Engine 200 creates files which may be used to load additional tables in a Media Measurement Data Model such as the one published by Cable Television Laboratories, Inc. These files are described in FIGS. 32 to 40.

Note: Numbering in the Drawings—The numbers in the drawings are usually, but not always, in sequential order.

FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base. This figure illustrates several viewers interacting with video asset viewing devices to view content which was delivered to those devices across a network and then to collect viewing activity from those devices.

In this nonlimiting example, the purpose is not to describe in detail the operations of video content delivery network or a data collection process, but simply to show how the data that is collected from that system can be made available to my Measurement Engine 200.

It begins with Viewer Viewing Linear Content 9200 who is interacting with a set-top box 9210 and television 9220 as he views linear content. The set-top box 9210 interacts with a Video Content Delivery System 9250 which delivers the content across a Network 9230.

It continues with Viewer Viewing DVR Content 9202 who is interacting with a set-top box 9210 and television 9220 as he interacts with DVR content recording content and playing back recorded content using various modes including trick plays. The set-top box 9210 interacts with a Video Content Delivery System 9250 which delivers the content across a Network 9230.

It continues with Viewer Viewing VOD Content 9203 who is interacting with a set-top box 9210 and television 9220 as he interacts with VOD content playing the content using various modes including trick plays. The set-top box 9210 interacts with a Video Content Delivery System 9250 which delivers the content across a Network 9230.

It continues with Viewer viewing video content using tablet, smart phone, IP TV, or other video video viewing device 9204 who is interacting with a variety of video viewing devices, including but not limited to tablet, smart phone, IP TV, PC, etc. The video viewing device interacts with a Video Content Delivery System 9250 which delivers the content across a Network 9230.

Video Content Delivery System 9250 then interacts with a Viewer Interaction Data, Data Collection System 9260 which collects all manner of viewer interaction data including Linear viewing including time-shifted linear viewing, Digital Video Recorder recording and playback/viewing, and Video on Demand viewing. The Viewer Interaction Data, Data Collection System 9260 then processes the data as needed to load it to a Media Measurement Data Base 100. The data in the Media Measurement Data Base 100 can then be used as input to my Measurement Engine 200 as described in FIG. 3.

FIG. 2 provides summary information about and illustrates an exemplary data structure which is used by the Measurement Engine 200 for storing and processing viewer interaction data so that the data can be used to produce viewing statistics regarding Video Program Viewing, Video Program Airing Viewing, Video Program Airing Segment Viewing, and Viewing grouped into Histogram buckets, according to one embodiment.

The viewer interaction data can be Linear viewing activity including time-shifted linear viewing, DVR viewing activity (recording and playback), or VOD viewing activity. The value assigned to PAA-RECORD-PLAYBACK-SESSION-ID 4030 will vary depending upon whether the viewing activity is Linear, DVR, or VOD; this value is set from data in the Video Viewing Event File 170 (FIG. 15). This data structure allows the Measurement Engine 200 to combine any number of viewing actions (play, fast forward, reverse, mute, switch screens, etc.) that may occur within a Linear Viewing Session or a DVR Playback Session or a VOD viewing session to produce second-by-second viewing activity for all the actions during the session. That second-by-second activity is then in a format which enables calculation of Video Program Viewing, Video Program Airing Viewing, Video Program Airing Segment Viewing, and Viewing grouped into Histogram buckets. This structure also allows the Measurement Engine 200 to identify the viewing by Demographic, Geographic, and Device Characteristic combinations so that downstream aggregation can be done for each of the various combinations of those fields.

Claims Reference: In the claims this is referred to as the Video Viewing Analysis Data Structure.

Claims Reference: In the Video Viewing Analysis Data Structure (FIG. 2), Identifying Fields are 4010, 4013, 4020, 4025, 4030, 4040, 4045, 4050.

Claims Reference: By putting this data structure (FIG. 2) into the Measurement Engine 200 it provides computer readable access to the Video Viewing Analysis Data Structure containing viewing activity information which was loaded to the Video Viewing Analysis Data Structure in preparation for analyzing a plurality of viewer interactions resulting from the viewers interacting with the video content.

Alternative Embodiment: This same Video Viewing Analysis Data Structure could be implemented in a subprogram, a database table, a database structure, or other similar method and still accomplish a similar result.

FIG. 3 is a flowchart illustrating an overview of an exemplary process for providing (a) Video Program and Video Program Airing data from a Media Measurement database, (b) Video Program Segment data from a Media Measurement database, (c) Video Viewing Event data from a Media Measurement database, (d) Playback Mode data, (e) Playback Delay Penalty Factor data, (f) and Histogram Definition data to a Measurement Engine 200 and then using these data sources to produce viewing metrics, according to one embodiment.

The populating of the Media Measurement Database 100 is beyond the scope of this application and so only brief remarks will be made in reference to that. There are video program scheduling systems that are commonly used in the industry that can provide the Video Program data, the Video Program Airing data, and the Video Program Airing Segment data. Additionally there are systems that are commonly used for collecting channel tuning or video viewing event data including switched digital video systems and set top box applications, internet protocol video viewing applications, and other video viewing applications. Such systems are common in the industry. Playback Mode data, Playback Delay Penalty Factor data, and Histogram definition data are reference values specified by the analyst. All of these sources together provide the needed inputs to the Measurement Engine 200. This data can be delivered to the Measurement Engine 200 in any computer readable format including, but not limited to, database tables, flat files, and XML messages.

Proceeding with the review of FIG. 3, a Playback Mode File 110 (reference FIG. 5) is provided as input to the Measurement Engine 200. The Playback Mode File 110 records the various play or playback modes which a viewer may use to control video viewing. This includes modes for linear viewing and DVR playback and VOD playback. The file allows the Analyst to specify that amount of viewing credit or points that can be earned for each part (second) of video content when a video is viewed in any of these modes. For example, mode Play may earn 1 point; mode Skip may earn 0 points; mode F3 may earn 0.2 points. The point scoring is controlled by the Analyst when he specifies the values in this file. These values will then be applied to the video viewing activity as part of the scoring algorithm.

Proceeding with the review of FIG. 3, a Playback Delay Penalty Factor File 120 (reference FIG. 7) is provided as input to the Measurement Engine 200. The Playback Delay Penalty Factor File 120 records the information about what amount of penalty or reduction to apply to the viewing based on delay in viewing or playback. This file allows the Analyst to control the points earned from video viewing with current viewing earning the most points while viewing that is significantly delayed earns fewer points. This functionality recognizes that advertisers get the most value for the ads when viewing is live or near to live.

The Playback Delay Penalty Factor File 120 can be used with linear viewing and DVR playback and VOD playback.

Proceeding with the review of FIG. 3, a Histogram Definition File 130 (reference FIG. 9) is provided as input to the Measurement Engine 200. The Histogram Definition File 130 records the information which allows the analyst to group viewing into buckets based on ranges defined in the histogram file where the buckets indicate the duration of the viewing session. This provides the Analyst with insight into whether a video program is getting many short viewing sessions or fewer longer viewing sessions.

Proceeding with the review of FIG. 3, a Video Program Airing File 150 (reference FIG. 11) is provided as input to the Measurement Engine 200. The Video Program Airing File 150 records the information about the video program and the various airings of the video program for which the Measurement Engine 200 is tracking viewing activity. If a video program has been aired multiple times, this allows the analyst to specify those airings for which viewing activity will be measured; this may be a subset of the all the airings that occurred.

Proceeding with the review of FIG. 3, a Video Program Segment File 160 (reference FIG. 13) is provided as input to the Measurement Engine 200. The Video Program Segment File 160 records the information about the various segments of the video program for which the Measurement Engine 200 is tracking viewing activity. The Analyst may specify various segments or program parts for which viewing is to be tracked. A Segment may be when an advertisement is airing or it may be part of the program content. By defining Segments the Analyst is able to specify particular portions of the video program for which viewing activity will be measured; this may be a subset of the video content.

Proceeding with the review of FIG. 3, a Video Viewing Event File 170 (reference FIG. 15) is provided as input to the Measurement Engine 200. The Video Viewing Event File 170 contains the Viewer Interaction Data that will be input to the Measurement Engine 200 which will then analyze the viewing activity represented by those viewer interactions. Video Viewing Event File 170 contains information identifying the Video Program that was viewed, the Video Program Airing information, Demographic, Geographic, and Device information, and event play or playback information. All of this information is gathered from the Media Measurement Database 100 and provides the information about the set of events that the Analyst wants to measure.

Proceeding with the review of FIG. 3, Measurement Engine 200 (reference FIG. 14 for an overview) takes the various inputs as defined herein and then calculates viewing activity for the Video Program, for the Video Program Airing, for the Video Program Airing Segment, and for the Histogram and then writes the various output files as will be defined below and as shown in FIG. 3.

The Measurement Engine 200 as presently configured accepts flat files as input and creates flat files as its output. Those skilled in the art will readily recognize that the Measurement Engine 200 could just as easily read database tables or XML messages or any other computer readable format for its input. It could then produce XML messages or update database tables for its output or produce flat files as it does in the present embodiment.

Proceeding with the review of FIG. 3, a Video Viewing Analysis File 205 (reference FIG. 41) is created as output from the Measurement Engine 200. The Video Viewing Analysis File 205 records the data from the Video Viewing Analysis Data Structure; this is the analyzed detail data which was used as input to the summarization process. This provides the picture of the analyzed viewing activity data at a session level. This data can be used for additional analysis.

Proceeding with the review of FIG. 3, a Viewing Statistics File 210 (reference FIG. 32) is created as output from the Measurement Engine 200. The Viewing Statistics File 210 records various statistics about the overall video program viewing activity based on the viewing activity identified in the Viewing Event File 170.

Proceeding with the review of FIG. 3, a Viewing Histogram File 220 (reference FIG. 33) is created as output from the Measurement Engine 200. The Viewing Histogram File 220 records various statistics about the overall video program viewing activity grouped into the histogram buckets that the user defined using the Histogram Definition file 130.

Proceeding with the review of FIG. 3, an Video Program Demographic Geographic Device Viewing File 230 (reference FIG. 34) is created as output from the Measurement Engine 200. The Video Program Demographic Geographic Device Viewing File 230 records various statistics about the Video Program viewing activity broken down by various the Demographic, Geographic, and Device combinations defined in the Viewing Event File 170.

Proceeding with the review of FIG. 3, an Video Program Viewing Activity by Second File 240 (reference FIG. 35) is created as output from the Measurement Engine 200. The Video Program Viewing Activity by Second File 240 records the second-by-second viewing activity of this Video Program based on the viewing activity identified in the Viewing Event File 170.

Proceeding with the review of FIG. 3, an Video Program Airing Demographic Geographic Device Viewing File 250 (reference FIG. 36) is created as output from the Measurement Engine 200.

The Video Program Airing Demographic Geographic Device Viewing File 250 records summary information regarding viewership of this Video Program Airing aggregated to the level of Demographic—Geographic—Device grouping based on the viewing activity identified in the Viewing Event File 170. This data is calculated at the video program airing level for each Video Program Airing defined in the Video Program Airing File 150 with the result that the Analyst gets insight into viewing activity against each airing of a video program based on the viewing activity identified in the Viewing Event File 170.

Proceeding with the review of FIG. 3, an Video Program Airing Viewing Activity by Second File 260 (reference FIG. 37) is created as output from the Measurement Engine 200. The Video Program Airing Viewing Activity by Second File 260 records the second-by-second viewing activity of this Video Program Airing based on the viewing activity identified in the Viewing Event File 170.

Proceeding with the review of FIG. 3, a Video Program Airing Segment File 270 (reference FIG. 38) is created as output from the Measurement Engine 200. The Video Program Airing Segment File 270 records each combination of Video Program Airing along with the Segment details. This file brings together the Video Program, the Video Program Airing, and the Video Program Segment. In the downstream reporting database this can serve as the parent for the the summary information regarding the viewing activity at the Video Program Airing Segment level.

Proceeding with the review of FIG. 3, an Video Program Airing Segment Demographic Geographic Device Viewing File 280 (reference FIG. 39) is created as output from the Measurement Engine 200. The Video Program Airing Segment Demographic Geographic Device Viewing File 280 records summary information regarding viewership of this Video Program Airing Segment aggregated to the level of Demographic—Geographic—Device grouping based on the viewing activity identified in the Viewing Event File 170. This data is calculated at the video program airing and video program segment level, so it provides insight into viewing activity against each airing of a video program segment. The Video Program Airings for which viewing will be calculated are defined in the Video Program Airing File 150. The Video Program Segments for which viewing will be calculated are defined in the Video Program Airing Segment File 160.

Proceeding with the review of FIG. 3, an Video Program Airing Segment Viewing Activity by Second 290 (reference FIG. 40) is created as output from the Measurement Engine 200. The Video Program Airing Segment Viewing Activity by Second 290 records the second-by-second viewing activity of this Video Program Airing Segment based on the viewing activity identified in the Viewing Event File 170.

Each of the output files identified above, 205-290, may be loaded to a data base in support of further analytics. Those with ordinary skill in the art will have no difficulty using common software development tools to develop a process which loads files like the ones shown to a data base or data warehouse in support of additional reporting and analytics. Alternatively, the Measurement Engine 200 could update data base tables having structures similar to those shown in output files 205-290.

To recap the output files that are created related to Video Program viewing, the Measurement Engine 200 has created files at three levels: (a) the Video Program, (b) the Video Program Airing, and (c) the Video Program Airing Segment. In each case, there is a summary file and a second-by-second file. Note that each of these files provides breakouts for Demographic, Geographic, and Device attributes thus providing detailed insight into the viewers who are consuming the video content. Additionally, it has created a file of the analyzed detail data which was used as input to the summarization process; this file can be used in support of further analytics.

In addition, Measurement Engine 200 has created files for overall Viewing Statistics, for Histogram, and the Video Program Airing Segment file used to provide a parent record in the database.

The end result is that the analyst has very detailed information regarding viewing activity for each video asset. The analyst now has a level of understanding of audience viewership never before possible for linear, DVR, and VOD content.

Figure 4:
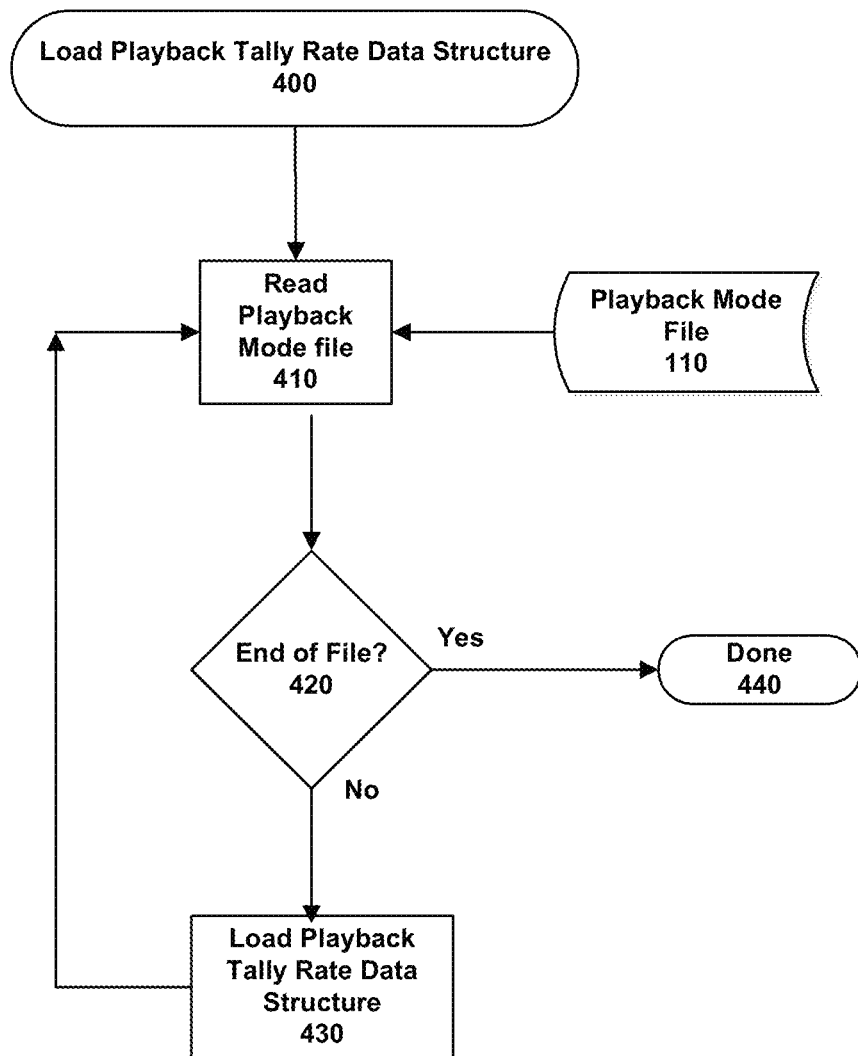
FIG. 4 illustrates an exemplary flowchart for loading data from a Playback Mode File 110 to a Playback Tally Rate Data Structure (reference FIG. 5-B) array in the memory of a computer in preparation for analyzing video asset viewing activity, according to one embodiment.

FIG. 4 is a flowchart which illustrates an exemplary process for loading the Playback Mode File 110 into a Playback Tally Rate Data Structure (FIG. 5-B) in the memory of a computer that is running the Measurement Engine 200, so that this data can be used by Measurement Engine 200 in calculating the amount of viewing credit or points that can be earned for each part (second) of video content when a video is viewed in any of these modes. For example, mode Play may earn 1 point; mode Skip may earn 0 points; mode F3 may earn 0.2 points. The point scoring is controlled by the Analyst by specifying the values in this file. These values will then be applied to the video viewing activity as part of the scoring algorithm.

The process begins with Load Playback Tally Rate Data Structure 400. The process then executes Read Playback Mode file 410 which reads file Playback Mode File 110 as input. The process checks for End of File 420. If it is the end of file, the process is Done 440. If End of File 420 does not detect an end of file condition, then the record that was read is loaded to the array using Load Playback Tally Rate Data Structure 430.

The end result of this process is that the Measurement Engine 200 has loaded the Playback Tally Rate data into an Data Structure in the memory of the computer.

Additional detail on step Load Playback Tally Rate Data Structure 430 follows:

The source code for this routine can be found in the accompanying source code file as routines C110-LOAD-DVR-PB-TALLY-RATE and C112-LOAD-DVR-PB-TALLY-RATE which are included herein by reference.

FIG. 5 relates to Playback Mode.

FIG. 5-A illustrates an exemplary record layout for a Playback Mode File 110 record formatted for use as input to the Measurement Engine 200, according to one embodiment. This relates to part 110.

FIG. 5-B illustrates an exemplary Data Structure for storing Playback Mode data in the memory of a computer for use by the Measurement Engine 200, according to one embodiment. In the Playback Mode File 110, the field Playback Tally Rate 4220 which is loaded to 4270 tells the value to assign for each playback mode. The analyst is able to control the viewing value assigned to each playback mode. Normal viewing is tallied at a rate of 1 per part (second). Suggested values for other viewing modes are as shown.

In this embodiment, the playback mode is assigned a 1 to signify normal viewing and a reduced value for other viewing such as viewing during trick plays. Another embodiment may assign different values to achieve the same result.

Figure 6:
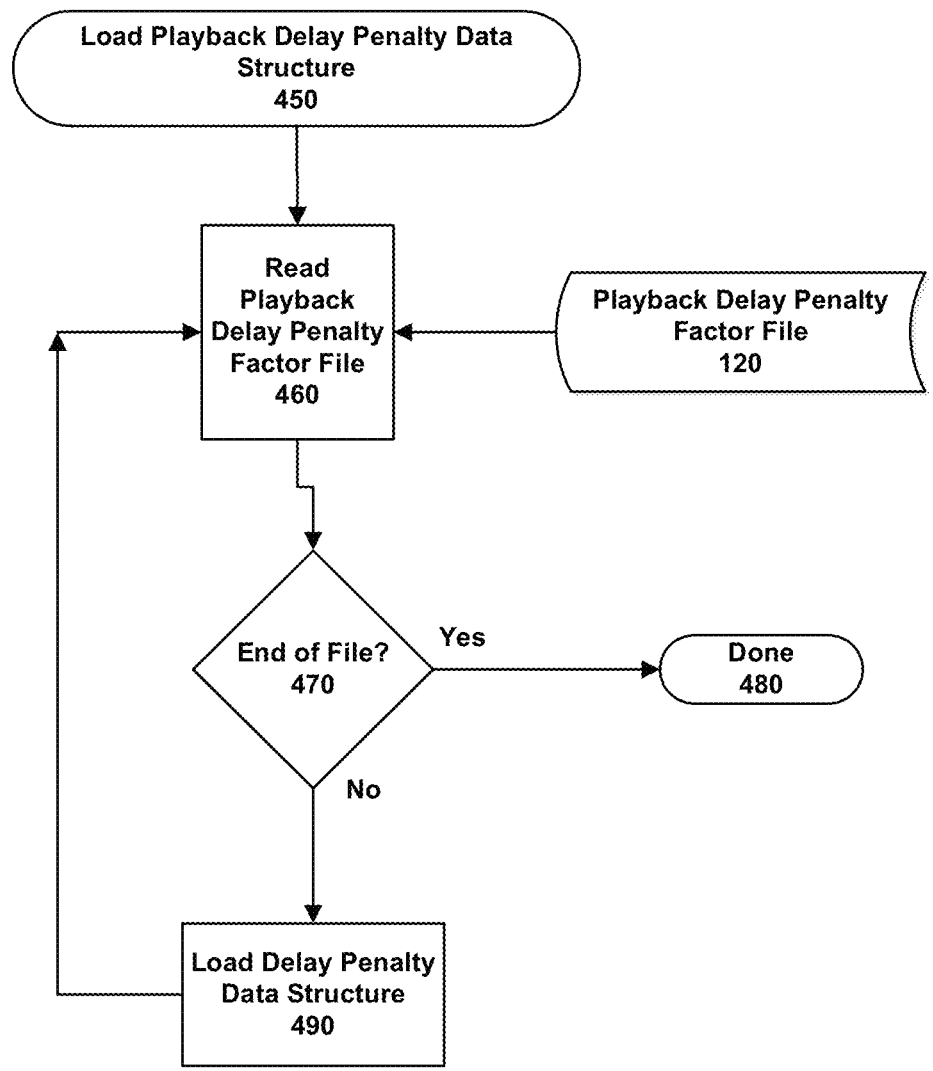
FIG. 6 illustrates an exemplary flowchart for loading data from a Playback Delay Penalty Factor File 120 to a Playback Delay Penalty Data Structure array in the memory of a computer in preparation for analyzing video asset viewing activity, according to one embodiment.

FIG. 6 is a flowchart which illustrates an exemplary process for loading the Load Playback Delay Penalty Data Structure 450 into an array in the memory of a computer that is running the Measurement Engine 200, so that this data can be used by Measurement Engine 200 in calculating the amount of penalty or reduction to apply to the viewing based on delay in viewing or playback.

The Playback Delay Penalty Factor File 120 can be used with linear viewing and DVR playback and VOD playback. In this embodiment, for linear viewing, there is no delay so the value is 1; for DVR viewing where the viewer is viewing a recording with ads that are not dynamic, the Analyst is able to specify reduced credit for delayed viewing; similarly with VOD, for ads that are not dynamic, the Analyst is able to specify reduced credit for delayed viewing. Dynamic ads that are inserted at the time of viewing would have a factor of 1 indicating no delay penalty.

The process begins with Load Playback Delay Penalty Data Structure 450. The process then executes Read Playback Delay Penalty Factor File 460 which reads file Playback Delay Penalty Factor File 120 as input. The process checks for End of File 470. If it is the end of file, the process is Done 480. If End of File 470 does not detect an end of file condition, then the record that was read is loaded to the array using Load Delay Penalty Data Structure 490.

The end result of this process is that the Measurement Engine 200 has loaded the Playback Delay Penalty data into a Data Structure in the memory of the computer running the engine.

Additional detail on step Load Delay Penalty Data Structure 490 follows:

The source code for this routine can be found in the accompanying source code file as routines C120-LOAD-DVR-PB-DELAY-PENALTY and C122-DVR-PB-DELAY-PENALTY which are included herein by reference.

FIG. 7 relates to Playback Delay Penalty.

FIG. 7-A illustrates an exemplary record layout for a Playback Delay Penalty File 120 record formatted for use as input to the Measurement Engine 200, according to one embodiment. This relates to part 120. In the program this file is named: 02-playback-delay-penalty-file.dat FIG. 7-B illustrates an exemplary Data Structure for storing Playback Delay Penalty data in the memory of a computer for use by the Measurement Engine 200, according to one embodiment.

FIG. 7-C illustrates sample data, according to one embodiment.

Playback Delay Penalty that tells the value by which to adjust the viewing score based on the delay in hours from recording to playback. Industry norms suggest that stale viewing should count less from an advertising perspective. This table allows the analyst to control what kind of delay factor should be applied in the case of stale viewing.

In this embodiment, the Playback Delay Penalty Factors are values less than 1 so that when they are used in the scoring algorithm, they reduce the viewing score, i.e.: multiplying by a value less then 1 produces a smaller value. In another embodiment, these could be negative values that when added to the score reduce it.

Figure 8:
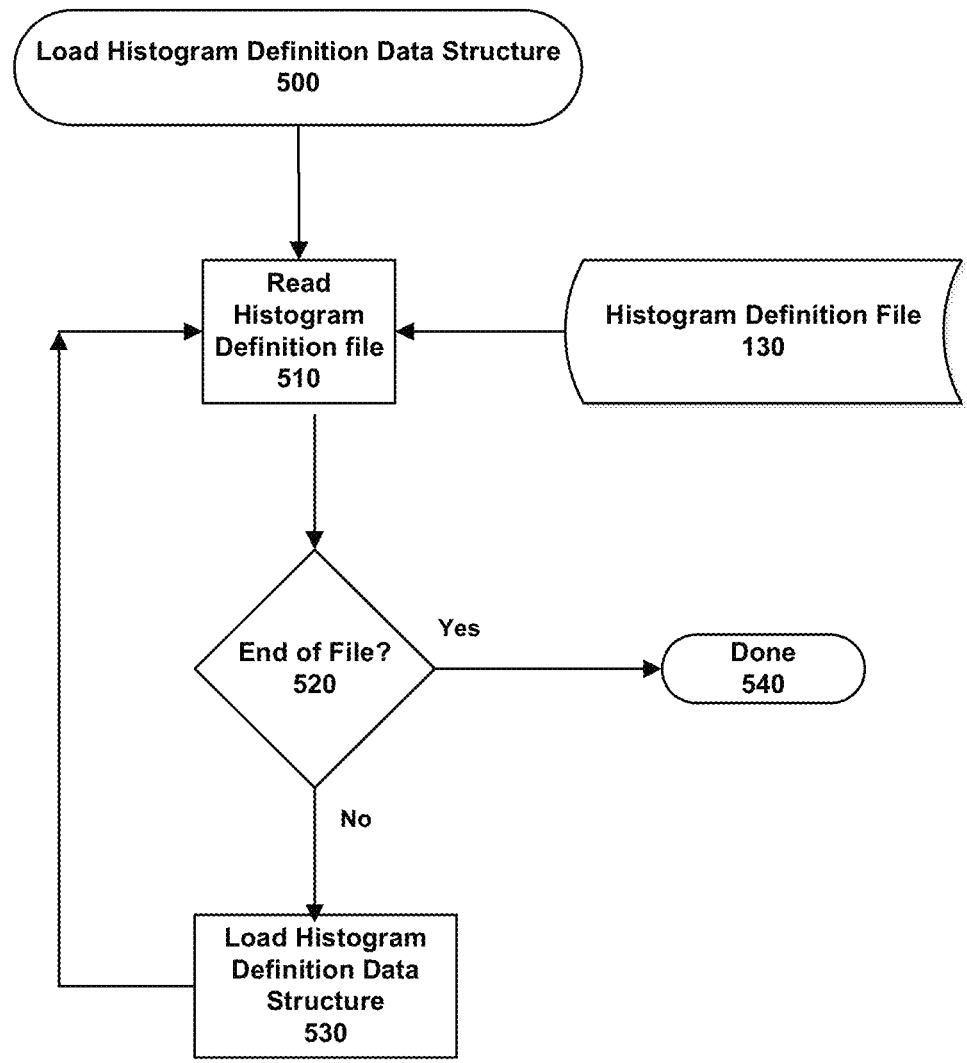
FIG. 8 illustrates an exemplary flowchart for loading data from a Histogram Definition File 130 to a Histogram Definition Data Structure array in the memory of a computer in preparation for analyzing video asset viewing activity, according to one embodiment.

FIG. 8 is a flowchart which illustrates an exemplary process for loading the Histogram Definition Data into an array in the memory of a computer that is running the the Measurement Engine 200, so that this data can be used by Measurement Engine 200 in grouping aggregate Video Program viewing by the Histogram Definitions defined in the file, according to one embodiment.

The process begins with Load Histogram Definition Data Structure 500. The process then executes Read Histogram Definition file 510 which reads file Histogram Definition File 130 as input. The process checks for End of File 520. If it is the end of file, the process is Done 540. If End of File 520 does not detect an end of file condition, then the record that was read is loaded to the array using Load Histogram Definition Data Structure 530.

The end result of this process is that the Measurement Engine 200 has loaded the Histogram Definition data into a Data Structure in the memory of the computer running the engine.

Additional detail on step Load Histogram Definition Data Structure 530 follows:

The source code for this routine can be found in the accompanying source code file as routines C130-LOAD-DVR-HISTOGRAM-DEF and C134-LOAD-DVR-HISTOGRAM-DEF which is included herein by reference.

FIG. 9 relates to Histogram Definition.

FIG. 9-A illustrates an exemplary record layout for a Histogram Definition File 130 record formatted for use as input to the Measurement Engine 200, according to one embodiment. This relates to part 130. In the program this file is named: 03-Histogram-Definition.dat Claims Reference: FIG. 9-A describes Histogram Definitions containing viewing duration ranges.

FIG. 9-B illustrates an exemplary Data Structure for storing Histogram Definition data in the memory of a computer for use by the Measurement Engine 200, according to one embodiment.

Histogram Definition provides the beginning and ending number of seconds for each of the histogram buckets along with the bucket name.

Claims Reference: FIG. 9-B describes Histogram Definitions containing viewing duration ranges.

Figure 10:
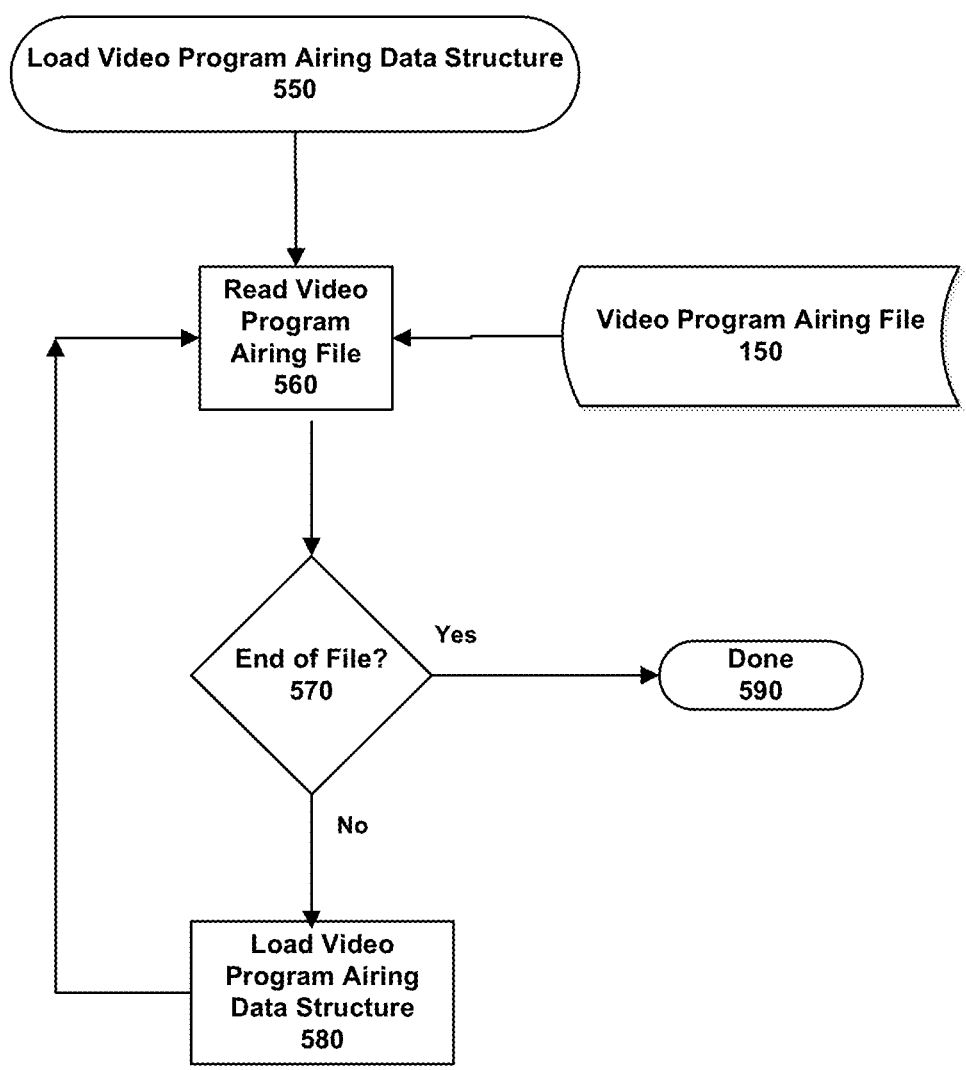
FIG. 10 illustrates an exemplary flowchart for loading data from a Video Program Airing File 150 to a Program Airing Data Structure array in the memory of a computer in preparation for analyzing video asset viewing activity, according to one embodiment.

FIG. 10 is a flowchart which illustrates an exemplary process for loading the video program airings that are to be analyzed into an Data Structure in the memory of a computer that is running the Measurement Engine 200, so that this data can be used by Measurement Engine 200 as it tracks viewing activity against these video program airings. The process begins with Load Video Program Airing Data Structure 550. The process then executes Read Video Program Airing File 560 which reads file Video Program Airing File 150 as input. The process checks for End of File 570. If it is the end of file, the process is Done 590. If End of File 570 does not detect an end of file condition, then the record that was read is loaded to the Data Structure using Load Video Program Airing Data Structure 580.

The end result of this process is that the Measurement Engine 200 has loaded the Video Program Airing data into a Data Structure in the memory of the computer running the engine. Note that the Video Program Airing data from the input file is loaded directly to the Video Program Airing Viewing Activity (ref FIG. 19) and to the Video Program Airing Segment Viewing Activity (ref FIG. 21).

Additional detail on step Load Video Program Airing Data Structure 580 follows: The source code for this routine can be found in the accompanying source code file as routines C130-LOAD-VIDEO-PROGRAM-AIRING and C132-VIDEO-PROGRAM-AIRING which is included herein by reference.

FIG. 11 illustrates an exemplary record layout illustrating the file format for a Video Program Airing File 150 formatted for use as input to the Measurement Engine 200, according to one embodiment. Note that the Video Program Id to which this Video Program Airing data applies is included in the file as IN-VPA-VIDEO-PROGRAM-ID 4520.

Figure 12:
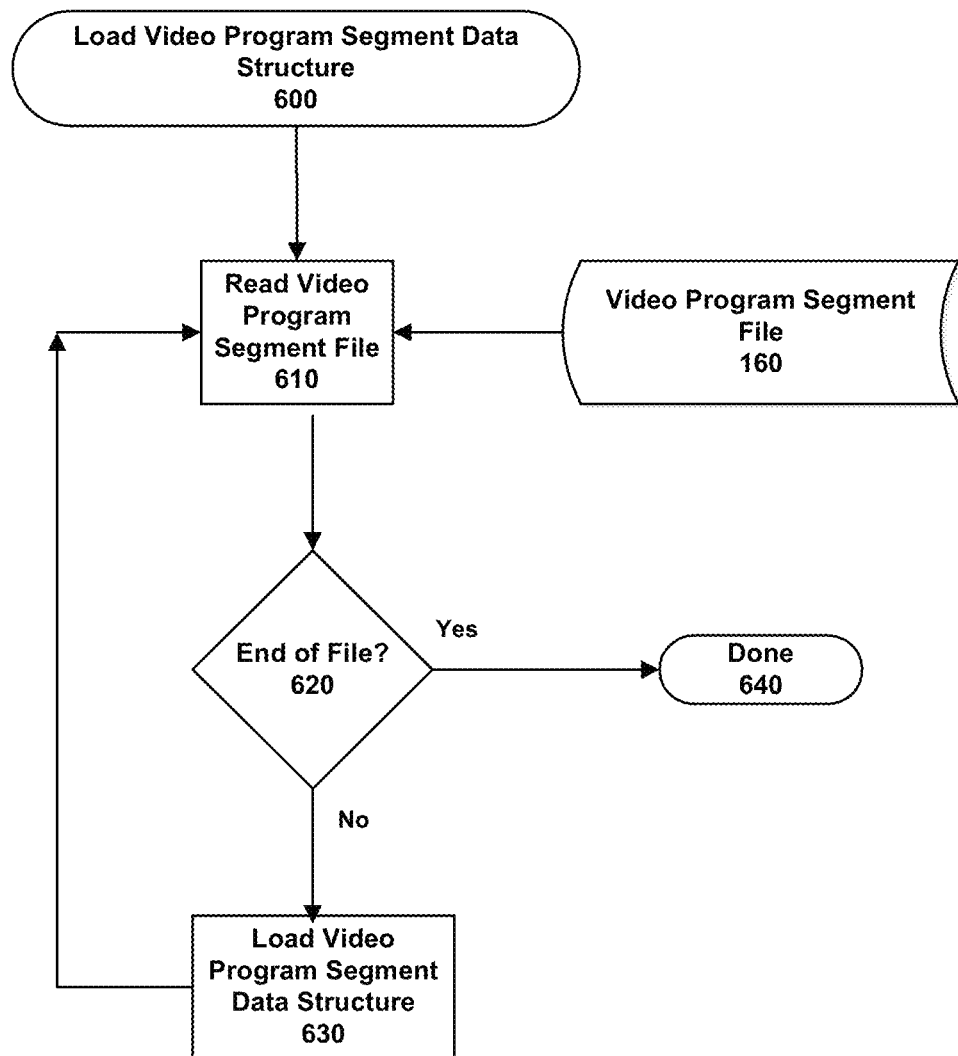
FIG. 12 illustrates an exemplary flowchart for loading data from a Video Program Segment File 160 to a Program Segment Data Structure in the memory of a computer in preparation for analyzing video asset viewing activity, according to one embodiment.

FIG. 12 is a flowchart which illustrates an exemplary process for loading the video program segments that are to be analyzed into a Data Structure in the memory of a computer that is running the the Measurement Engine 200, so that this data can be used by Measurement Engine 200 as it tracks viewing activity against these video program segment airings. The process begins with Load Video Program Segment Data Structure 600. The process then executes Read Video Program Segment File 610 which reads file Video Program Segment File 160 as input. The process checks for End of File 620. If it is the end of file, the process is Done 640. If End of File 620 does not detect an end of file condition, then the record that was read is loaded to the array using Load Video Program Segment Data Structure 630.

The end result of this process is that the Measurement Engine 200 has loaded the Video Program Segment data into a Data Structure in the memory of the computer running the engine.

Additional detail on step Load Video Program Segment Data Structure 630 follows: The source code for this routine can be found in the accompanying source code file as routines C140-LOAD-VIDEO-PGM-AIRING-SEG and C142-VIDEO-PROGRAM-SEG-ARRAY which is included herein by reference.

FIG. 13 relates to Video Program Segments.

FIG. 13-A illustrates an exemplary record layout for a Video Program Segment File 160 formatted for use as input to the Measurement Engine 200, according to one embodiment. The Video Program Segment File 160 contains all of the video segments for which the Measurement Engine 200 will analyze viewing activity. These records are read and loaded to a Video Program Segment Data Structure (ref FIG. 13-B). Then the group of records is copied forward to each individual airing of the program for which the Measurement Engine 200 is analyzing viewing activity so that each airing has all of the Segments. This copy process is done as part of the initialization process.

This data is loaded to the Video Program Airing Segment Viewing Activity Data Structure FIG. 21 at the start of processing. Reference routines C140-LOAD-VIDEO-PGM-AIRING-SEG, C142-VIDEO-PROGRAM-SEG-ARRAY, C146-COPY-SEG-DATA-TO-PGM-AIR.

A segment can be any part of the program up to 60 seconds. A nonlimiting example to show the concept is:

| Segment | Beg Sec | End Sec |
|---|---|---|
| 01 | 00000 | to 00059 |
| 02 | 00060 | to 00119 |
| 03 | 09000 | to 09059 |
| 04 | 10000 | to 10029 |

The Segment Begin Time Second in Program is based on starting at 0 since that would equate to the actual start of the program.

In the program the Video Program Segment File 160 is named: 05-video-program-airing-segment.dat FIG. 13-B illustrates an exemplary data structure for storing Video Program Segment Data Structure in the memory of a computer for use by the Measurement Engine 200, according to one embodiment.

Figure 14:
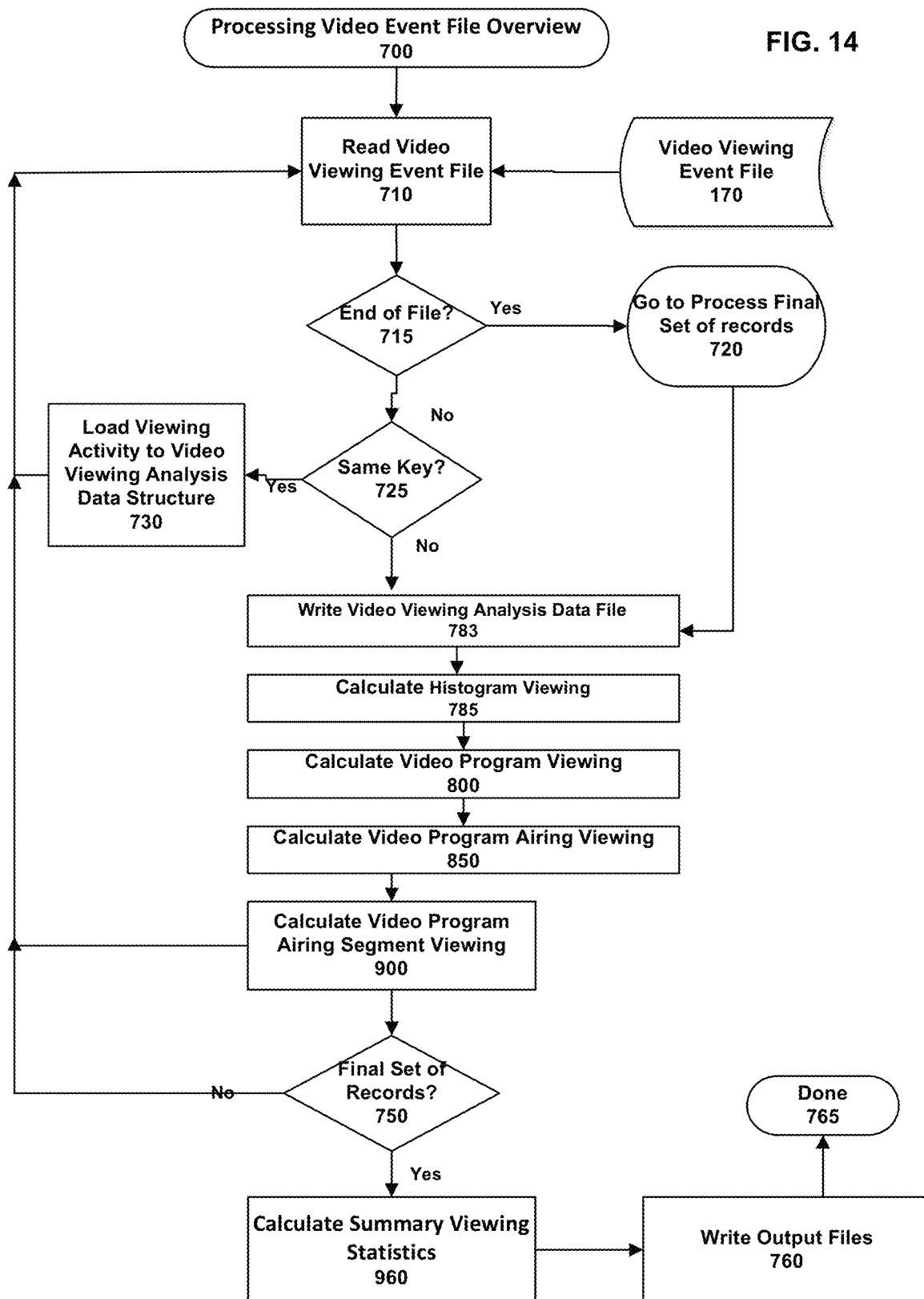
FIG. 14 illustrates an exemplary overview of a process for loading data from a Video Viewing Event File 170 to a Playback Activity Data Structure array in the memory of a computer and then an overview of the steps involved in processing that data to analyze video asset viewing activity, according to one embodiment.

FIG. 14 is a flowchart which illustrates an exemplary process for loading viewer interaction data to Video Viewing Analysis Data Structure data structure (Reference FIG. 2) in the memory of a computer that is running the the Measurement Engine 200 and then running various analytics against that data to calculate Video Program Viewing, Video Program Airing Viewing, Video Program Airing Segment Viewing, on both an aggregate level and a second-by-second level.

The process begins with Processing Video Event File Overview 700. The process then executes Read Video Viewing Event File 710 which reads file Video Viewing Event File 170 as input. The process checks for End of File 715. If it is the end of file, the process is proceeds to Go to Process Final Set of records 720 where the data for the last set of records is processed prior to the final calculations. If End of File 715 does not detect an end of file condition, then the Measurement Engine 200 compares the key fields (Video Program Airing Id, House-Device-Viewer, Demographic-Geographic-Device id, Viewing Session or Playback Id) in the input record to the saved key fields. If the key is the same and thus Same Key 725 is true, the program proceeds to Load Viewing Activity to Video Viewing Analysis Data Structure 730 where the viewing activity represented in the event record is loaded to the data structure.

If the key is not the same, then the Measurement Engine 200 proceeds to write the Video Viewing Analysis Data File 783, Calculate Histogram Viewing 785, then aggregate the second-by-second viewing activity for the Video Program Viewing, the Video Program Airing Viewing, and the Video Program Segment Viewing using the viewing activity information that was loaded to the Video Viewing Analysis Data Structure (Ref FIG. 2). After all the calculations are done, the new values are moved to the save fields.

The first step is Write Video Viewing Analysis Data File 783 which writes the data in the Video Viewing Analysis Data Structure (FIG. 2) to file Video Viewing Analysis File 205. This is further explained in FIG. 41.

The next step is to do Calculate Histogram Viewing 785 where the Measurement Engine 200 calculates various metrics based on a histogram definition. The measurement engine compares the playback duration to the boundaries of the histogram buckets that were loaded as described in FIG. 8. When the correct range is found, the session duration is added to the Histogram bucket total viewing seconds and the session count for that bucket is incremented by 1. The source code for this routine can be found in the accompanying source code file as routines D140-TABULATE-HISTO-GRAM which is included herein by reference.

Video Viewing Histogram Data Structure (FIG. 9-B) Identifying Fields are populated as follows: video program identifier 4462 from PAA-VIDEO-PROGRAM-ID 4010 (reference FIG. 2) viewing activity type 4463 from PAA-VIEWING_ACTIVITY_TYPE 4013 (reference FIG. 2) demographic code 4464 from PAA-HOUSE-DEMO-GRAPHIC-CODE 4040 (reference FIG. 2) geographic code 4465 from PAA-HOUSE-GEOGRAPHIC-CODE 4045 (reference FIG. 2) device type 4466 from PAA-VIDEO-VIEW-DEVICE-TYPE-CD 4050 (reference FIG. 2)

Claims Reference: This describes selecting the Histogram Bucket whose ranges envelop the Video Viewing Analysis Data Structure Playback Duration in Seconds and aggregating the Duration in Seconds into the selected Histogram Bucket.

The next step is to do Calculate Video Program Viewing 800 where the Measurement Engine 200 calculates various metrics regarding Video Program Viewing. This is further explained in FIG. 16.

The next step is to Calculate Video Program Airing Viewing 850 where the Measurement Engine 200 calculates various metrics regarding Video Program Airing Viewing. This is further explained in FIG. 18.

The next step is to Calculate Video Program Airing Segment Viewing 900 where the Measurement Engine 200 calculates various metrics regarding Video Program Segment Viewing. This is further explained in FIG. 20.

The next step is to check to see whether or not this is the Final Set of Records? 750. When Final Set of Records? Is true, the Measurement Engine 200 proceeds to do a series of calculations as defined in Calculate Summary Viewing Statistics 960. Upon Completion of the various calculations, the Measurement Engine 200 writes the various result files as per Write Output Files 760. At this point the processing is Done 765.

The detail of Load Viewing Activity to Data Structure 730 is explained.

The reader is referred to the program code which is included herein by reference for additional details.

The Measurement Engine 200 reads the first record of Viewer Interaction Data from the Video Viewing Event File 170 as per routine D000-PREP-DVR-REC-PB-EVENT-FIL. It saves the various identifying fields (Video Program Airing Id, House-Device-Viewer, Demographic-Geographic-Device Ids, and Session or Recording Playback Id) in the Video Viewing Analysis Data Structure (Ref FIG. 2) and in the save fields.

Note: All of the viewing activity in the input file relates to one Video Program Id, so that field does not need to be saved.

Note: This embodiment supports processing of one kind of Viewing Activity Type (Linear, DVR, VOD) per run of the program. To process Linear, DVR, and VOD activity for the same Video Program requires three separate program runs with the corresponding data for the run type in the Video Viewing Event File 170. An alternative embodiment could support multiple Viewing Activity Types in one run.

In the mapping below, data from FIG. 15 is being used to populate FIG. 2. The fields saved in the Video Viewing Analysis Data Structure (Ref FIG. 2) with their mappings are:

Video Program Id—IN-VP-VIDEO-PROGRAM-ID 4105 or 4805 is loaded to PAA-VIDEO-PROGRAM-ID 4010

Video Program Airing Id—IN-VP-VIDEO-PROGRAM-AIRING-ID 4120 or 4820 is loaded to PAA-VIDEO-PROGRAM-AIRING-ID 4025

House Device Viewer—IN-HOUSE-DEVICE-VIEWER-ID 4122 or 4822 is loaded to PAA-HOUSE-DEVICE-VIEWER 4037

House Demographic Code—IN-HDVR-HOUSE-DEMO-GRAPHIC-CODE 4125 or 4845 is loaded to PAA-HOUSE-DEMOGRAPHIC-CODE 4040

House Geographic Code—IN-HDVR-HOUSE-GEO-GRAPHIC-CODE 4130 or 4850 is loaded to PAA-HOUSE-GEOGRAPHIC-CODE 4045

Viewing Device Type Code—IN-HDVR-VIDEO-VIEW-DEV-TYPE-CD 4135 or 4855 is loaded to PAA-VIDEO-VIEW-DEVICE-TYPE-CD 4050

Session Id or DVR Recording Playback Id or VOD Session Id—IN-DVR-RECORD-PLAYBACK-SESSION-ID 4140 or 4885 is loaded to PAA-RECORDING-PLAYBACK-SESSION-ID 4030

Other fields that are loaded to the array include:

Viewing Activity Type—IN-VIEWING-ACTIVITY-TYPE 4108 or 4808 is loaded to PAA-VIEWING_ACTIVITY_TYPE 4013

Video Program Duration in Seconds—IN-VP-DURATION-IN-SECONDS 4110 or 4810 is loaded to PAA-VP-DURATION-IN-SECONDS 4015

Video Program Minimum Seconds for Exposure—IN-VP-MIN-SECS-FOR-EXPOSURE 4115 or 4815 is loaded to PAA-VP-MIN-SECS-FOR-EXPOSURE 4020

Session Duration in Seconds or DVR Playback Duration or VOD Playback Duration IN-DRP-PLAYBACK-DURATN-IN-SECS 4145 or 4900 is loaded to PAA-PLAYBACK-DURATION-IN-SECS 4035

Video Viewing Analysis Data Structure Bucket Activity Field Mapping Note: The following steps are explained in more detail below. This is the field mapping.

Video Viewing Session Mode

IN-DRP-PLAYBACK-MODE-CODE 4150 or 4905 is loaded to PAA-PLAYBACK-SECOND-MODE 4060. Claims Reference: This is where the Activity Field Video Viewing Session Mode in the Video Viewing Analysis Data Structure Bucket is populated.

Video Viewing Session Volume Level

IN-DRP-PB-VOLUME-LEVEL-NUM 4165 or 4920 is loaded to PAA-SESSION-VOLUME-LEVEL 4065. Claims Reference: This is where the Activity Field Video Viewing Session Volume Level in the Video Viewing Analysis Data Structure Bucket is populated.

Video Viewing Session Percent Content Visible

IN-DRP-PB-PCT-CONTENT-VISIBLE 4170 or 4925 is loaded to PAA-PERCENT-CONTENT-VISIBLE 4070.

Claims Reference: This is where the Activity Field Video Viewing Session Percent Content Visible in the Video Viewing Analysis Data Structure Bucket is populated.

Video Viewing Session Foreground Background Indicator

IN-DRP-PB-FOREGRD-BACKGRD-IND 4175 or 4930 is loaded to PAA-FOREGROUND-BACKGROUND-IND 4075.

Claims Reference: This is where the Activity Field Video Viewing Session Foreground Background Indicator in the Video Viewing Analysis Data Structure Bucket is populated.

Video Viewing Session Picture in Picture Indicator

IN-PICTURE-IN-PICTURE-IND 4185 or 4940 is loaded to PAA-PICTURE-IN-PICTURE-IND 4085.

Video Viewing Session Percent of Screen this Video

IN-PERCENT-OF-SCREEN-THIS-VIDEO 4190 or 4945 is loaded to PAA-PERCENT-OF-SCREEN-THIS-VIDEO 4090.

Claims Reference: This is where the Activity Field Video Viewing Session Percent Of Screen This Video in the Video Viewing Analysis Data Structure Bucket is populated.

The system then performs a read loop on the remainder of the Video Viewing Event File 170 as per routine D100-PROCESS-DVR-REC-PB-EVENT.

In D100-PROCESS-DVR-REC-PB-EVENT, it first compares the input buffer to the save fields. When they are the same, the system proceeds to analyze the viewing activity represented in the record by running routine D110-PROC-DVR-REC-PB-ACTIVITY and various called routines.

The Steps in D110-PROC-DVR-REC-PB-ACTIVITY in the Program Code are as Follows:

Session Processing

First, check to see if this is the start of a new session. Recall that within one session there may be multiple events. When the record marks a new session (reference D114-FIRST-SESSION-EVT-ACTIONS), then using the IN-DRP-PLAYBACK-MODE-CODE 4150 or 4905, look up the playback mode DVR-PLAYBACK-MODE-CODE 4260 in the DVR-PLAYBACK-TALLY-RATE table (FIG. 5-B) that was loaded as described in FIG. 4. This will provide the base tally rate DVR-PB-MODE-CODE-TALLY-RATE 4270 (FIG. 5-B) to be applied to the viewing seconds represented in this Video Viewing Event record, except note that this rate may be reduced by the Playback Delay Penalty Factor (see below). Each Playback mode has an associated tally rate. For example, in this embodiment, PL (Play) mode has a rate of 1 which is applicable to Linear viewing and DVR playback in Play mode and VOD viewing in Play mode. A second example is that F2 (fast forward at 2× speed) has a rate of perhaps 0.4. The analyst has the ability to define the rate to be applied to each playback mode.

An alternative embodiment is to assign a value to the tally rate simply because the video content was being viewed or interacted with in some way.

Claims Reference: This relates to taking into account the video viewing session mode in calculating the Viewer Interaction Score.

Claims Reference: By using the playback mode file as input to set the tally rate, the user is able to control the reference score associated with the video viewing session mode code.

Second (for this session), set the Playback Delay Penalty Factor. For Linear viewing this is 1 as there is no delay. For DVR, there may be a delay from the time of recording to the time of viewing. The Playback Delay Penalty Factor (Ref FIG. 7-B) allows the analyst to reduce the value of viewing based on the amount of delay. The hours of delay is recorded in field IN-HOURS-FROM-REC-TO-PLAYBACK 4180 (FIG. 15-A) or 4935 (FIG. 15-B). This value is compared to the values in DVR-PLAYBACK-DELAY-PENALTY (Ref FIG. 7-B fields 4370 and 4380) to find the corresponding row by comparing the hours of delay in viewing to the ranges in that lookup table. The resulting factor PDP-PENALTY-RATE 4390 will be applied to the Viewing Activity. For VOD, this value can be applied as desired by the Analyst.

Claims Reference: This relates to taking into account the Playback delay penalty factor in calculating the Viewer Interaction Score. In one case, a single penalty may be applied to all events. In another case, the penalty may vary depending upon the amount of time between recording and playback.

Using the Playback mode and its tally rate along with the Playback Delay Penalty Factor, calculate the base viewing points that will be applied to each of the viewing seconds represented by the Session. This is the Adjusted Playback Mode Tally Rate and it is calculated by subtracting the Playback Delay Penalty Factor from the Playback Mode Tally Rate that was looked up as such:

DVR-PB-MODE-CODE-TALLY-RATE 4270−PDP-PENALTY-RATE 4390=PB-MODE-TALLY-RATE to be applied to each second of viewing activity.

Once the tally rate is set, it is applied to all of the Session viewing seconds represented in the Video Viewing Event record (from File 170) by looping thru the viewing seconds in the array based on using IN-PB-MODE-BEG-SEC-FRM-TRU-BEG 4155 (for Linear) or 4910 (for DVR and VOD) to control the starting point and using IN-PB-MODE-END-SEC-FRM-TRU-BEG 4160 (for Linear) or 4915 (for DVR and VOD) to control the ending point. For each second of the Viewing Session, the loop will populate the values of:

PAA-VIDEO-CONTENT-PART 4053 is populated with the part of the video content represented in the Bucket identifier using the loop subscript.

PAA-VIDEO-CONTENT-PART-ID 4054 is populated with video content part identifier using the loop subscript.

PAA-PLAYBACK-SECOND-TALLY 4055 is populated with the tally amount.

PAA-PLAYBACK-SECOND-MODE 4060 is populated with the viewing mode code ('PL', 'F1', etc.)

By using the IN-PB-MODE-BEG-SEC-FRM-TRU-BEG 4155 or 4910 and the IN-PB-MODE-END-SEC-FRM-TRU-BEG 4160 or 4915 to set the viewing second in the array, the Measurement Engine 200 is able to normalize the viewing across all of the Linear viewing sessions and DVR playback sessions and VOD sessions, regardless of where in the session the user begins viewing or ends viewing or where in the session or DVR or VOD playback a trick play is made to occur.

In the program the reader will also see logic related to the rank of the viewing activity which is used so that a lesser activity does not overwrite a more valuable activity as would happen, if for example, a Play activity was overwritten by a Fast Forward activity.

Event Processing

Once the Session viewing activity value (Tally Rate) is set as described above, the Measurement Engine 200 will look for any Events that may reduce the value of the viewing activity. Such Events include Muting, Percent of Content Visible being reduced, Video in Background, Picture-in-picture, and Multiple concurrent sessions (Percent of screen this video). Once the reductions from these events are calculated, they will be applied to the Playback Mode Tally Rate to reduce it. As a non-limiting example, a Session may span 30 minutes, within that Session, there may be any number of Events such as Muting or Picture-in-picture that the viewer has engaged in. These are the activities that are being accounted for here. Reference D118-SET-ADJ-FC-TRS-USING-EVENTS in the code for additional details. Each Event has an associated Event Begin and End Second. For Linear (FIG. 15-A), the Measurement Engine 200 uses EVENT-BEG-SEC-FROM-TRUE-BEG 4162 and EVENT-END-SEC-FROM-TRUE-BEG 4163. For DVR and VOD (FIG. 15-B) Measurement Engine 200 uses EVENT-BEG-SEC-FROM-TRUE-BEG 4917 and EVENT-END-SEC-FROM-TRUE-BEG 4918.

At the start of Event processing, the Measurement Engine 200 sets up a loop using the EVENT-BEG-SEC-FROM-TRUE-BEG 4162 or 4917 and EVENT-END-SEC-FROM-TRUE-BEG 4163 or 4918 to control the Buckets on which it performs Event processing. Recall that an Event will often occur as a subset of the overall Session, but the Event may span all the seconds of the Session.

Within the Event Loop, take these actions:

First, set the muting adjustment. This is based on the value recorded in IN-DRP-PB-VOLUME-LEVEL-NUM 4165 (FIG. 15-A) or 4920 (FIG. 15-B). During the Loop process 4165 or 4920 is loaded to PAA-SESSION-VOLUME-LEVEL 4065 (FIG. 2). The calculated Volume Adjustment, if any, is also set. This is used as follows: if the volume is zero (sound is on Mute), then the value of the viewing will be reduced. For example, perhaps 0.1 will be deducted from the viewing score when the volume is muted. For normal volume ranges there is no deduction. The Volume Adjustment only applies during normal play mode, not during trick plays. In the present embodiment this value is set in the program code based on business rules in the code. Another embodiment may set the value using some other technique.

Claims Reference: This relates to taking into account the video viewing session volume level in calculating the Viewer Interaction Score.

Second, set the content visible adjustment. This is based on the value in IN-DRP-PB-PCT-CONTENT-VISIBLE 4170 (FIG. 15-A) or 4925 (FIG. 15-B). During the Loop process 4170 or 4925 is loaded to PAA-PERCENT-CONTENT-VISIBLE 4070 (FIG. 2). The Percent Content Visible Adjustment, if any, is also set. This is used as follows: if the screen is occluded then the value of the viewing will be reduced by an amount depending on how much of the screen is occluded with more occlusion resulting in a greater deduction. In the present embodiment this value is set in the program code based on business rules in the code. Another embodiment may set the value using some other technique.

Claims Reference: This relates to taking into account the video viewing session percent content visible in calculating the Viewer Interaction Score.

Third, set the picture-in-picture adjustment. This is based on the value in IN-PICTURE-IN-PICTURE-IND 4185 (FIG. 15-A) or 4940 (FIG. 15-B). During the Loop process 4185 or 4940 is loaded to PAA-PICTURE-IN-PICTURE-IND 4085 (FIG. 2). The Picture In Picture Adjustment, if any, is also set. If the screen with this video content is viewed in picture-in-picture mode, then the value of the viewing will be reduced by the Picture In Picture Adjustment. In the present embodiment this value is set in the program code based on business rules in the code. Another embodiment may set the value using some other technique.

Fourth, set the foreground background adjustment. This is based on the value in IN-DRP-PB-FOREGRD-BACKGRD-IND 4175 (FIG. 15-A) or 4930 (FIG. 15-B). During the Loop process 4175 or 4930 is loaded to PAA-FOREGROUND-BACKGROUND-IND 4075 (FIG. 2). The Foreground Background Adjustment, if any, is also set. If the screen with the video content being measured is in the background, then the value of the viewing will be reduced by the Foreground Background Adjustment. In the present embodiment this value is set in the program code based on business rules in the code. Another embodiment may set the value using some other technique.

Claims Reference: This relates to taking into account the video viewing session foreground background indicator in calculating the Viewer Interaction Score.

Fifth, set the percent of screen this video adjustment. This is based on the value in IN-PERCENT-OF-SCREEN-THIS-VIDEO 4190 (FIG. 15-A) or 4945 (FIG. 15-B). During the Loop process 4190 or 4945 is loaded to PAA-PERCENT-OF-SCREEN-THIS-VIDEO 4090 (FIG. 2). The Percent of Screen Ad Adjustment, if any, is also set. If the viewer is watching multiple video programs on the screen (as in windows on a computer screen would often be) then the value of the viewing will be reduced by an amount depending on how much of the screen is used by this video with less screen space resulting in a reduced score. The value is the viewing will be reduced by the Percent of Screen Adjustment. In the present embodiment this value is set in the program code based on business rules in the code. Another embodiment may set the value using some other technique.

Claims Reference: This relates to taking into account the video video viewing session percent of screen this video in calculating the Viewer Interaction Score.

Once all these values are set, the Measurement Engine 200 will read the next record the get the next Event for the Session. If there are additional Events within the Session, then the Adjustment Factors for those Events will be set. There are business rules in the code such that some events survive other events when they both occur during the same part of the video content.

End of Session Actions

When the last Event for the Session has been processed, then the Measurement Engine 200 will perform end of session actions (reference D120-END-OF-SESSION-ACTIONS). During this process the program loops thru all of the seconds of the viewing Session and applies the various Adjustments to each of the Viewing seconds in the Session as needed. In this embodiment, the program will reduce the viewing score that was originally applied to all of the viewing seconds in Session by applying (accounting for) the following values: Volume Adjustment, the Percent Content Visible Adjustment, the Picture In Picture Adjustment, the Foreground Background Adjustment, and the Percent of Screen Adjustment which were calculated for the viewing seconds related to each Event in the Session. This is done by looping thru the buckets in the Video Viewing Analysis Data Structure (FIG. 2) based on the Session begin and end values that were originally defined from IN-PB-MODE-BEG-SEC-FRM-TRU-BEG 4155 (for Linear) or 4910 (for DVR and VOD) to control the starting point and IN-PB-MODE-END-SEC-FRM-TRU-BEG 4160 (for Linear) or 4915 (for DVR and VOD) to control the ending point. The loop will update the value of the PAA-PLAYBACK-SECOND-TALLY 4055 based on the calculated Adjustments. In this embodiment, the Adjustments are subtracted from the viewing score.

After completing the routine D110-PROC-DVR-REC-PB-ACTIVITY, the Measurement Engine 200 will resume processing by reading the next record in the Video Viewing Event File 170. It then returns to the top of the D100-PROCESS-DVR-REC-PB-EVENT to begin the process again. When the Measurement Engine 200 detects a change in the key, then it will proceed to write the Video Viewing Analysis Data File 783, Calculate Histogram Viewing 785, then aggregate the second-by-second viewing activity for the Video Program Viewing, the Video Program Airing Viewing, and the Video Program Segment Viewing using the viewing activity information that was loaded to the Video Viewing Analysis Data Structure (Ref FIG. 2) as described elsewhere in this specification.

Note that in this embodiment I have shown a strategy of subtracting the various Adjustments from the tally rate which was originally earned during the viewing second. Another embodiment may accomplish a similar result using some other calculation methodology yet still fall within the scope of this teaching.

In the present embodiment, business rules are applied so that if the same second has multiple viewing activities, the Play activity always survives (is not overridden by other activities). Multiple viewing activities may occur when the Viewer uses forward and reverse features to view the same video content more than once. Another embodiment may be implemented using different business rules to handle the case of overlapping viewing activities.

Business rules can be applied to determine, in the case of overlapping viewing activities such as Play, Reverse, Play, whether the total viewing tally for the seconds involved may be greater than 1. The value can be capped at one, or a value greater than 1 may be allowed depending on the business rules.

We now resume the discussion with Same Key? 725 having a value of No.

When the key in the record changes, then the Measurement Engine 200 proceeds to step Write Viewing Analysis File 783. Reference FIG. 41 for an exemplary flowchart which describes the process for writing the Video Viewing Analysis File 205.

Figure 20:
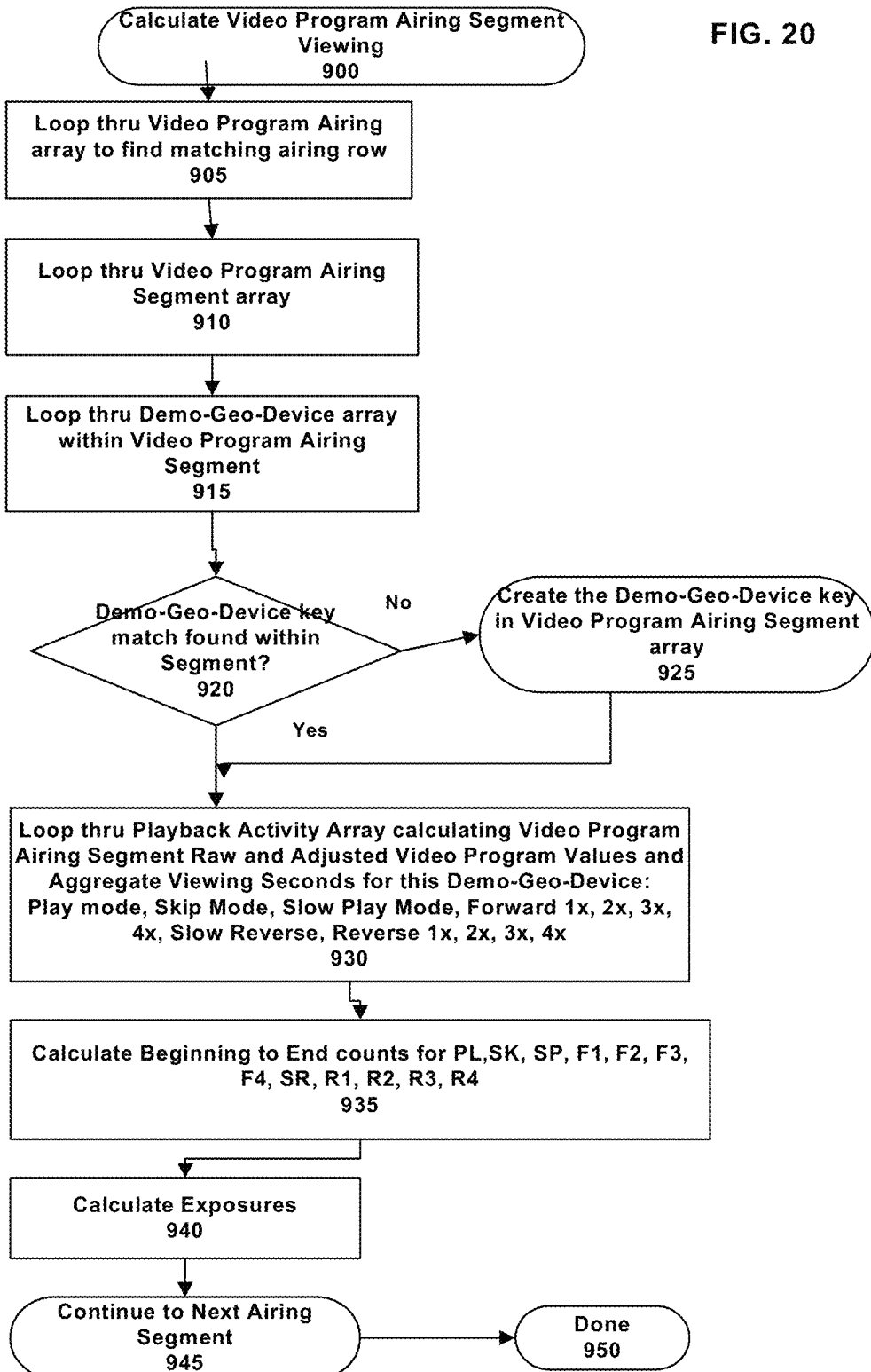
FIG. 20 illustrates an exemplary flowchart for Calculating Video Program Airing Segment Viewing Activity at a second-by-second level by manipulating data in the memory of a computer, according to one embodiment.

After step 783 the program proceeds to Calculate Histogram Viewing 785 (reference code routine D140-TABULATE-HISTOGRAM), Calculate Video Program Viewing 800 (reference code routine E100-CALC-VIDEO-PGM-VIEWS and FIG. 16), Calculate Video Program Airing Viewing 850 (reference code F100-CALC-VIDEO-PGM-AIR-VIEWS and FIG. 18), and calculate Video Program Segment Viewing 900 (reference code G100-CALC-VIDEO-PGM-AIR-SEG-VW and FIG. 20).

Once these steps are done, the Measurement Engine 200 is done working on viewing activity for that combination of Program Airing Id, Demographic-Geographic-Device group, and the Session/Playback id. The system will then clear out the Video Viewing Analysis Data Structure FIG. 2 (reference DVR-REC-PLAYBACK-ACTIVITY-ANAL) in preparation for processing the viewing activity for the new key.

If there is a new record with a new key, code routine D110-PROC-DVR-REC-PB-ACTIVITY is executed as described previously to load that viewing activity to the Video Viewing Analysis Data Structure FIG. 2 (reference program code DVR-REC-PLAYBACK-ACTIVITY-ANAL).

Figure 22:
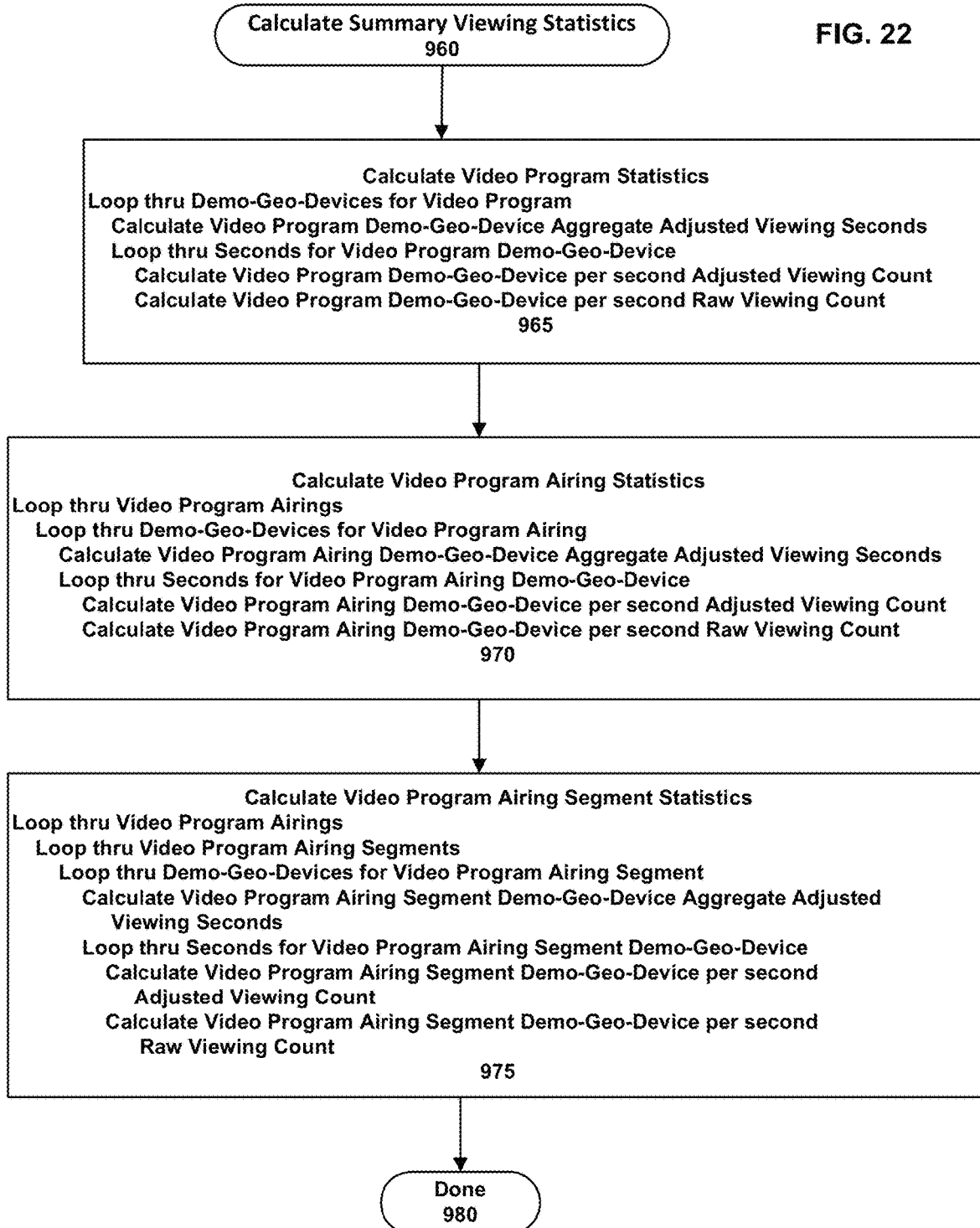
FIG. 22 illustrates an exemplary flowchart for Calculating Summary Viewing Statistics for Video Program Statistics, Video Program Airing Statistics, and Video Program Airing Segment Statistics, by manipulating data in the memory of a computer, according to one embodiment.

If there are no further records because it is end of file on the Video Viewing Event File 170 (Final set of Records 750 is true), then the Measurement Engine 200 proceeds to the final calculations as described in Calculate Summary Viewing Statistics 960 FIG. 22 (reference M100-FINAL-CALCULATIONS) and then to Write Output Files 760 as described above.

FIG. 15 relates to the Video Viewing Event File 170.

FIG. 15-A illustrates an exemplary record layout for Linear Viewing Activity—Video Viewing Event File 170 formatted for use as input to the Measurement Engine 200, according to one embodiment. This file contains detailed information about Linear viewing activity which will be analyzed by the Measurement Engine 200.

FIG. 15-B illustrates an exemplary record layout for DVR and VOD Viewing Activity—Video Viewing Event File 170 formatted for use as input to the Measurement Engine 200, according to one embodiment. This file contains detailed information about DVR/VOD viewing activity which will be analyzed by the Measurement Engine 200.

Note that the fields are named the same in both file formats so that the same Measurement Engine 200 code can process both files. The Linear format is populated with Viewer Interaction Data derived from Linear viewing activity including time-shifted linear viewing. The DVR/VOD format is populated with Viewer Interaction Data derived from DVR/VOD viewing.

In one embodiment the Video Viewing Event File 170 is populated by querying the Media Measurement Data Model. In an alternative embodiment the Video Viewing Event File 170 can be populated from other sources.

Claims Reference: Linear Viewing Activity and DVR and VOD Viewing Activity are Viewer Interaction Data derived from a plurality of viewers interacting with video content that was delivered on a plurality of video asset viewing devices delivering content through a network.

Figure 16:
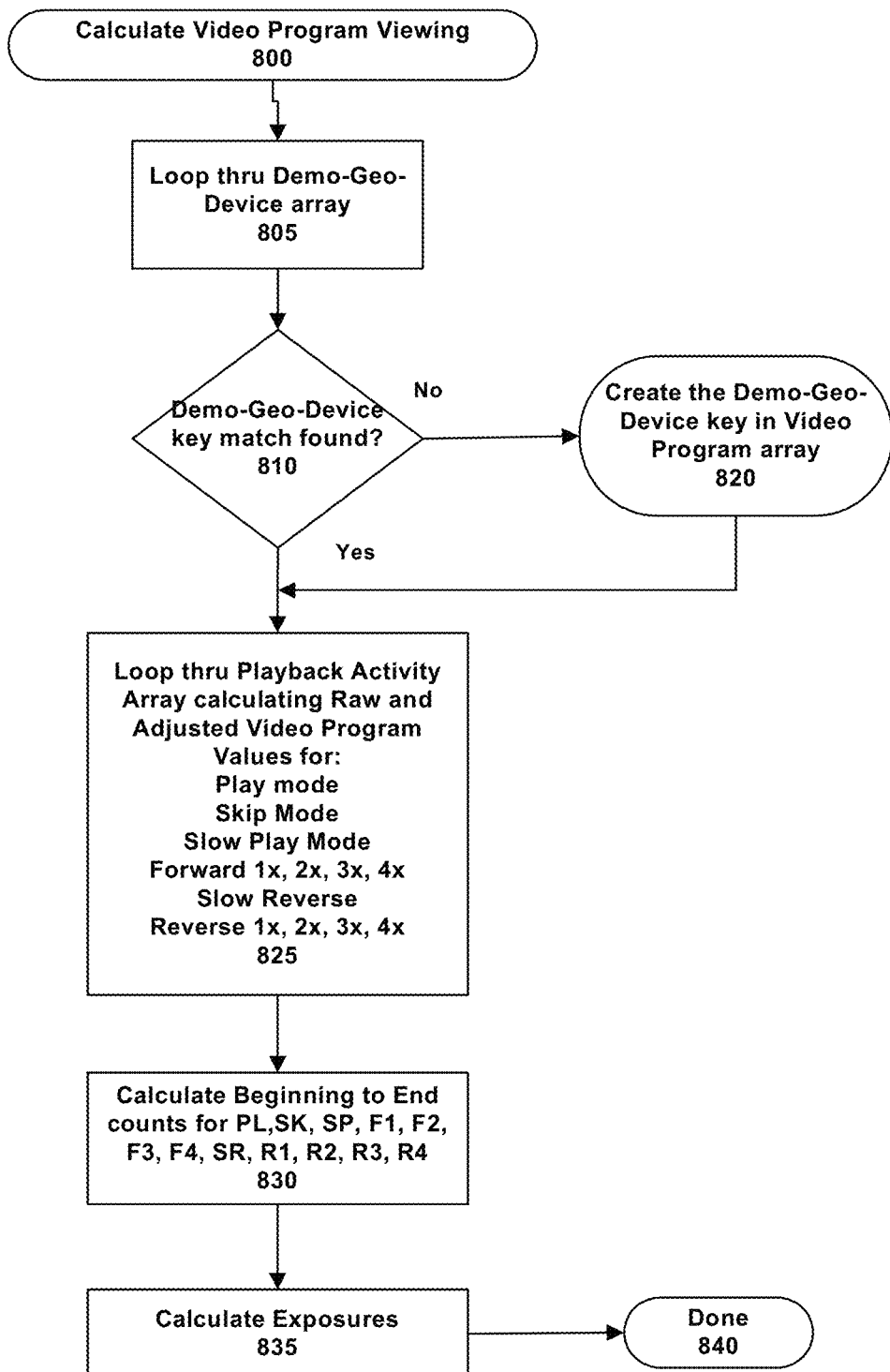
FIG. 16 illustrates an exemplary flowchart for Calculating Video Program Viewing activity at a second-by-second level by manipulating data in the memory of a computer, according to one embodiment.

FIG. 16 illustrates an exemplary flowchart for calculating Video Program Viewing activity at a second-by-second level using data that has been loaded to a Video Viewing Analysis Data Structure (Reference FIG. 2) in the memory of a computer running the Measurement Engine 200. The video program viewing can be the result of either a Linear Viewing Session, a DVR Playback Session, or a VOD play session. The Measurement Engine 200 will calculate metrics using the data that has been loaded to this Data Structure.

The process begins with Calculate Video Program Viewing 800 (reference E100-CALC-VIDEO-PGM-VIEWS and various called routines in the program). The Measurement Engine 200 executes Loop thru Demo-Geo-Device array 805 (reference E140-CHECK-DEMO-GEO-DEVICE-KEY in program) which loops thru the rows in the Video Program Viewing Activity data structure (reference FIG. 17). More particularly, it is looping thru the occurrences of Demographic—Geographic—Device to find a match between the values in Video Viewing Analysis Data Structure (FIG. 2) and those in the Video Program Viewing Activity Data Structure (FIG. 17). The program executes Demo-Geo-Device key match found? 810. When no match is found, the program creates a row in the Video Program Viewing Activity Data Structure (FIG. 17) as per Create the Demo-Geo-Device key in Video Program array 820. After the row is created, processing continues. If Demo-Geo-Device key match found? 810 is true and a match was found, then the program proceeds directly to Looping thru the playback activity array performing calculations. This is done by Loop thru Playback Activity Array calculating Raw and Adjusted Video Program Values and Aggregate Viewing Seconds for: Play mode, Skip Mode, Slow Play Mode, Forward 1×, 2×, 3×, 4×, Slow Reverse, Reverse 1×, 2×, 3×, 4× 825.

Claims Reference: This routine uses the Activity Field Video Viewing Session Mode in the Video Viewing Analysis Data Structure Bucket as input to the calculations which create the Video Program Viewing Metrics.

Claims Reference: This routine uses the Activity Field Viewer Interaction Score in the Video Viewing Analysis Data Structure Bucket as input to the calculations which create the Video Program Viewing Metrics.

Claims Reference: This routine is where Second-by-Second Video Program Viewing Metrics are calculated.

In addition, the program also calculates the Viewing Device Count at a second by second basis.

Next the program checks the beginning to end counts as per Calculate Beginning to End counts for PL, SK, SP, F1, F2, F3, F4, SR, R1, R2, R3, R4 830 where the Measurement Engine 200 is calculating the number of sessions that were in the respective mode (PL, SK, etc.) for the entire duration of the session.

Claims Reference: This routine is where Program Level Video Program Viewing Metrics are calculated.

Claims Reference: This routine is where Video Program Viewing Metrics are summarized from the second-by-second level to create Program Level Metrics.

The next step is to calculate exposures per Calculate Exposures 835 where the Measurement Engine 200 calculates the number of viewing sessions where the number of seconds in Play mode was sufficient to qualify as an exposure.

Claims Reference: This routine calculates the number of exposures into an Exposures Count in the Video Program Viewing Activity Data Structure.

At the completion of this routine, all of the Viewer Interaction Data that was loaded to the Video Viewing Analysis Data Structure has been processed to the Video Program Viewing Activity Data Structure. The program is Done 840 calculating Video Program Metrics.

Claims Reference: FIG. 16 describes performing calculations using the values in the Video Viewing Analysis Data Structure Buckets to create Video Program Viewing Metrics.

Details for Demo-Geo-Device Key Match Found? 810

The identifying fields are compared to find a match between the Video Viewing Analysis Data Structure (FIG. 2) and those in the Video Program Viewing Activity Data Structure (FIG. 17) are as follows:
House Demographic Code PAA-HOUSE-DEMO-GRAPHIC-CODE 4040 and VP-HOUSE-DEMO-GRAPHIC-CODE 5036

House Geographic Code PAA-HOUSE-GEOGRAPHIC-CODE 4045 and VP-HOUSE-GEOGRAPHIC-CODE 5038

Video Viewing Device Type Code PAA-VIDEO-VIEW-DEVICE-TYPE-CD 4050 and VP-VIDEO-VIEW-DEVICE-TYPE-CD 5042

FIG. 17 illustrates an exemplary data structure used for Calculating Video Program Viewing Activity in the memory of a computer, according to one embodiment. The Video Program Viewing Activity Data Structure is used in calculating the Video Program level metrics. These metrics relate to the viewing activity across all of the viewings from the various airings of the program.

When the Viewing Activity Type 5014 is "DVR", then this data structure is recording Digital Video Recording viewing activity (viewing activity that is based on the playback with trick modes, etc.) of a Digital Video Recording.

When the Viewing Activity Type 5014 is "VOD", then this data structure is recording Video On Demand viewing activity.

When the Viewing Activity Type 5014 is "LIN", then this data structure is recording Linear viewing activity.

The Demographic-Geographic-Device information is used to group Viewing Activity of the program by Demographic Geographic and Device combinations.

Claims Reference: In FIG. 17 fields 5010 to 5042 are Video Program Viewing Identifying Fields Claims Reference: In FIG. 17 fields 5046 to 5246 are Video Program Viewing Activity Fields which includes both Program Level metrics and Second-by-Second metrics Claim Reference: by putting the Video Program Viewing Activity Fields in the same Data Structure as child members to the Video Program Viewing Identifying Fields, this creates the correlation between the Identifying fields and the Activity Fields.

Figure 18:
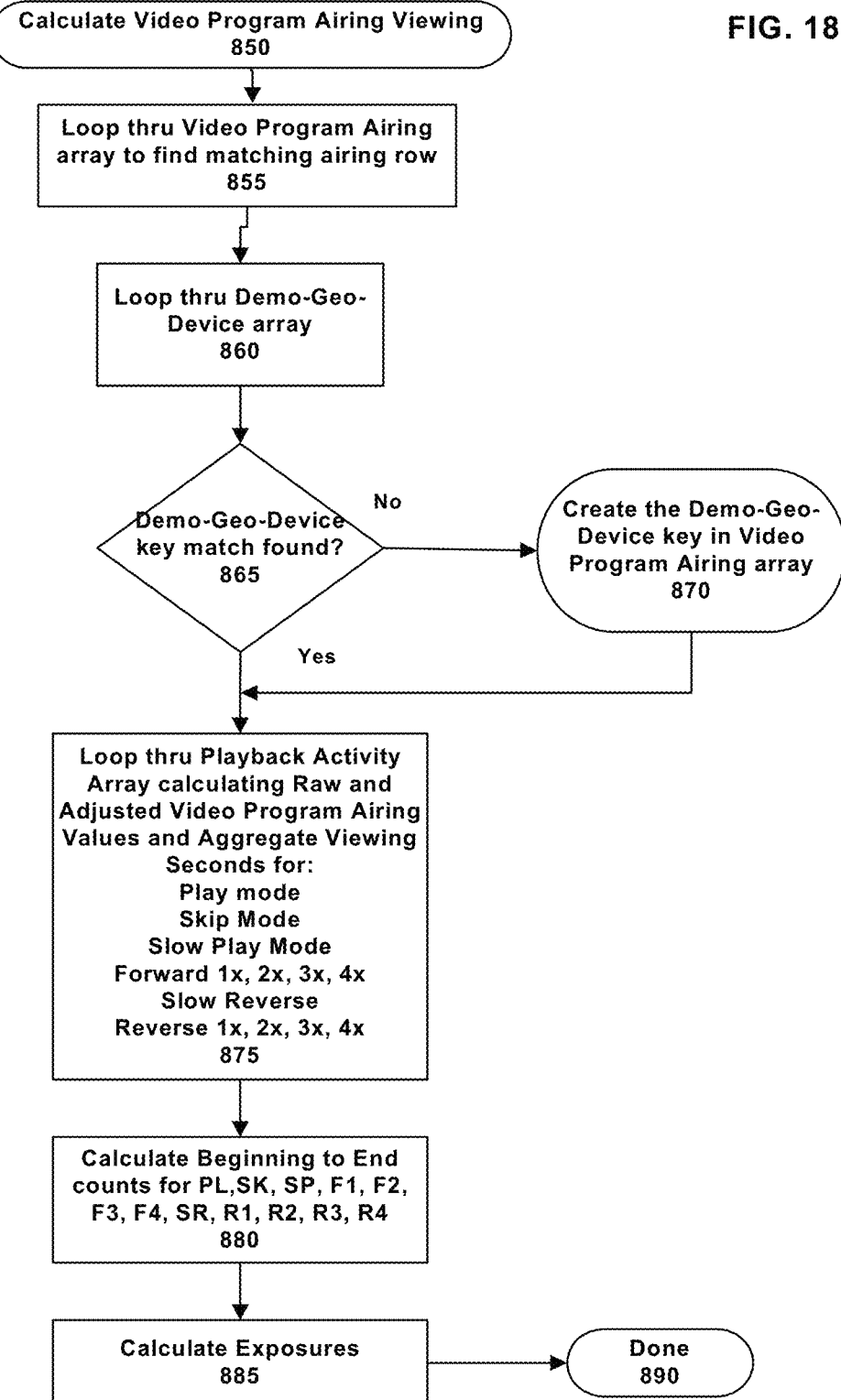
FIG. 18 illustrates an exemplary flowchart for Calculating Video Program Airing Viewing activity at a second-by-second level by manipulating data in the memory of a computer, according to one embodiment.

FIG. 18 illustrates an exemplary flowchart for calculating Video Program Airing Viewing activity at a second-by-second level using data that has been loaded to a Video Viewing Analysis Data Structure (Reference FIG. 2) in the memory of a computer running the Measurement Engine 200. The video program airing viewing can be the result of either a Linear Viewing Session, a DVR Playback Session, or a VOD play session. The Measurement Engine 200 will calculate metrics using the data that has been loaded to this Data Structure.

The process begins with Calculate Video Program Airing Viewing 850 (reference F100-CALC-VIDEO-PGM-AIR-VIEWS and various called routines in the program). The Measurement Engine 200 executes Loop thru Video Program Airing array to find matching airing row 855 (reference F140-CHK-VIDEO-PROG-AIRING-ID in program) which loops thru the rows in the Video Program Airing Viewing Activity data structure (reference FIG. 19). After finding the matching video program airing, the Measurement Engine 200 executes Loop thru Demo-Geo-Device array 860 (reference F240-CHK-DEMO-GEO-DEVICE-KEY in program) which loops thru the rows in the Video Program Airing Viewing Activity Data Structure (reference FIG. 19). More particularly, it is looping thru the occurrences of Demographic—Geographic—Device to find a match between the values in Video Viewing Analysis Data Structure (FIG. 2) and those in the Video Program Airing Viewing Activity Data Structure (FIG. 19). The program executes Demo-Geo-Device key match found? 865. When no match is found, the program creates a row in the Video Program Airing Viewing Activity Data Structure (FIG. 19) as per Create the Demo-Geo-Device key in Video Program Airing array 870. After the row is created, processing continues. If Demo-Geo-Device key match found? 865 is true and a match was found, then the program proceeds directly to Looping thru the playback activity array calculating the values. This is done by Loop thru Playback Activity Array calculating Raw and Adjusted Video Program Airing Values and Aggregate Viewing Seconds for: Play mode, Skip Mode, Slow Play Mode, Forward 1×, 2×, 3×, 4× Slow Reverse, Reverse 1×, 2×, 3×, 4× 875.

Claims Reference: This routine uses the Activity Field Video Viewing Session Mode in the Video Viewing Analysis Data Structure Bucket as input to the calculations which create the Video Program Airing Viewing Metrics.

Claims Reference: This routine uses the Activity Field Viewer Interaction Score in the Video Viewing Analysis Data Structure Bucket as input to the calculations which create the Video Program Airing Viewing Metrics.

Claims Reference: This routine is where Second-by-Second Video Program Airing Viewing Metrics are calculated.

In addition, the program also calculates the Viewing Device Count at a second by second basis.

Next the program creates the beginning to end counts as per Calculate Beginning to End counts for PL, SK, SP, F1, F2, F3, F4, SR, R1, R2, R3, R4 880 where the Measurement Engine 200 is calculating the number of sessions that were in the respective mode (PL, SK, etc.) for the entire duration of the session.

Claims Reference: This routine is where Program Airing Level Video Program Airing Viewing Metrics are calculated.

Claims Reference: This routine is where Video Program Airing Viewing Metrics are summarized from the second-by-second level to create Program Airing Level Metrics.

The next step is to calculate exposures per Calculate Exposures 885 where the Measurement Engine 200 calculates the number of viewing sessions where the number of seconds in Play mode was sufficient to qualify as an exposure.

At the completion of this routine, all of the Viewer Interaction Data that was loaded to the Video Viewing Analysis Data Structure has been processed to the Video Program Airing Viewing Activity Data Structure. The program is Done 890 calculating Video Program Airing Metrics.

Claims Reference: FIG. 18 describes performing calculations using the values in the Video Viewing Analysis Data Structure Buckets to create Video Program Airing Viewing Metrics.

Details for Demo-Geo-Device Key Match Found? 865

The identifying fields are compared to find a match between the Video Viewing Analysis Data Structure (FIG. 2) and those in the Video Program Airing Viewing Activity Data Structure (FIG. 19) are as follows:

House Demographic Code PAA-HOUSE-DEMOGRAPHIC-CODE 4040 and VPA-HOUSE-DEMOGRAPHIC-CODE 5436

House Geographic Code PAA-HOUSE-GEOGRAPHIC-CODE 4045 and VPA-HOUSE-GEOGRAPHIC-CODE 5438

Video Viewing Device Type Code PAA-VIDEO-VIEW-DEVICE-TYPE-CD 4050 and VPA-VIDEO-VIEW-DEVICE-TYPE-CD 5442.

FIG. 19 illustrates an exemplary Video Program Airing Data Structure used for Calculating Video Program Airing Viewing Activity in the memory of a computer, according to one embodiment.

The Video Program Airing Data Structure is used in calculating the Video Program Airing level metrics. These metrics relate to all of the viewing activity for each airing of the program and associated viewings. By analyzing viewing at the individual airing level for a program, the Measurement Engine 200 is able to provide metrics related to viewing for each airing. This can be useful in determining whether or not there are sufficient viewers of an airing to make it worth showing. Also, advertising rates can be set accordingly when viewership is known at the airing level.

Viewing Activity Type

When the Viewing Activity Type 5412 is "DVR", then this record is recording Digital Video Recording viewing activity (viewing activity that is based on the playback with trick modes, etc.) of a Digital Video Recording.

When the Viewing Activity Type 5412 is "VOD", then this record is recording Video On Demand viewing activity.

When the Viewing Activity Type 5412 is "LIN", then this record is recording Linear viewing activity.

The Demographic-Geographic-Device information is used to group Viewing Activity of the program airing by Demographic Geographic and Device combinations.

Claims Reference: In FIG. 19 fields 5410 to 5442 are Video Program Airing Viewing Identifying Fields Claims Reference: In FIG. 19 fields 5446 to 5646 are Video Program Airing Viewing Activity Fields which includes both Program Airing Level metrics and Second-by-Second metrics.

Claim Reference: by putting the Video Program Airing Viewing Activity Fields in the same Data Structure as child members to the Video Program Airing Viewing Identifying Fields, this creates the correlation between the Identifying fields and the Activity Fields.

FIG. 20 illustrates an exemplary flowchart for calculating Video Program Segment Viewing activity at a second-by-second level using data that has been loaded to a Video Viewing Analysis Data Structure (Reference FIG. 2) in the memory of a computer running the Measurement Engine 200. The video program airing segment viewing can be the result of either a Linear Viewing Session, a DVR Playback Session, or a VOD play session. The Measurement Engine 200 will aggregate the data that has been loaded to this Data Structure.

The process begins with Calculate Video Program Airing Segment Viewing 900 (reference G100-CALC-VIDEO-PGM-AIR-SEG-VW and various called routines in the program). The Measurement Engine 200 executes Loop thru Video Program Airing array to find matching airing row 905 (reference G140-CHK-VIDEO-PGM-AIR-SEG in program) which loops thru the rows in the Video Program Airing Segment Viewing Activity Data Structure (ref FIG. 21) to find the matching video program airing. After finding the matching video program airing, the Measurement Engine 200 executes Loop thru Video Program Airing Segment array 910 (reference G200-VIDEO-PGM-AIR-SEG and G240-CHK-VIDEO-PGM-AIR-SEG in program) which loops thru the rows in the Video Program Airing Segment Viewing Activity Data Structure (reference FIG. 21).

After finding the matching video program segment (within the Video Program airing), the Measurement Engine 200 executes Loop thru Demo-Geo-Device array within Video Program Airing Segment 915 (reference G300-TALLY-VIDEO-PGM-AIR-SEG and G340-CHK-VIDEO-PGM-AIR-SEG in program) which loops thru the rows in the Video Program Airing Segment Viewing Activity Data Structure (reference FIG. 21). More particularly, it is looping thru the occurrences of Demographic—Geographic—Device to find a match between the values in Video Viewing Analysis Data Structure (FIG. 2) and those in the Video Program Airing Segment Viewing Activity data structure (FIG. 21). The program executes Demo-Geo-Device key match found within Segment? 920. When no match is found, the program creates a row in the Video Program Airing Segment Viewing Activity Data Structure (FIG. 21) as per Create the Demo-Geo-Device key in Video Program Airing Segment array 925 (reference G340-CHK-VIDEO-PGM-AIR-SEG in program). After the row is created, processing continues. If Demo-Geo-Device key match found within Segment? 920 is true and a match was found, then the program proceeds directly to Looping thru the playback activity array performing calculations. This is done by Loop thru Playback Activity Array calculating Video Program Airing Segment Raw and Adjusted Video Program Values and Aggregate Viewing Seconds for this Demo-Geo-Device: Play mode, Skip Mode, Slow Play Mode, Forward 1x, 2x, 3x, 4x, Slow Reverse, Reverse 1x, 2x, 3x, 4x 930.

Claims Reference: This routine uses the Activity Field Video Viewing Session Mode in the Video Viewing Analysis Data Structure Bucket as input to the calculations which create the Video Program Airing Segment Viewing Metrics.

Claims Reference: This routine uses the Activity Field Viewer Interaction Score in the Video Viewing Analysis Data Structure Bucket as input to the calculations which create the Video Program Airing Segment Viewing Metrics.

Claims Reference: This routine is where Second-by-Second Video Program Airing Segment Viewing Metrics are calculated.

In addition, the program also calculates the Viewing Device Count at a second by second basis.

Next the program creates the beginning to end counts as per Calculate Beginning to End counts for PL, SK, SP, F1, F2, F3, F4, SR, R1, R2, R3, R4 935 where the Measurement Engine 200 is calculating the number of sessions that were in the respective mode (PL, SK, etc.) for the entire duration of the segment.

Claims Reference: This routine is where Program Airing Segment Level Video Program Airing Segment Viewing Metrics are calculated.

Claims Reference: This routine is where Video Program Airing Segment Viewing Metrics are summarized from the second-by-second level to create Program Airing Segment Level Metrics.

The next step is to calculate exposures per Calculate Exposures 940 where the Measurement Engine 200 calculates the number of viewing sessions where the number of seconds in Play mode was sufficient to qualify as an exposure.

Claims Reference: This routine calculates the number of exposures into an Exposures Count in said Video Program Airing Segment Viewing Activity Data Structure.

At the completion of this routine, all of the Viewer Interaction Data that was loaded to the Video Viewing Analysis Data Structure has been processed to the Video Program Airing Segment Viewing Activity Data Structure. The program is Done 950 calculating Video Program Airing Segment Metrics.

Claims Reference: FIG. 20 describes performing calculations using the values in said Video Viewing Analysis Data Structure Buckets to create Video Program Airing Segment Viewing Metrics.

Details for Demo-Geo-Device Key Match Found? 920

The identifying fields are compared to find a match between the Video Viewing Analysis Data Structure (FIG. 2) and those in the Video Program Airing Segment Viewing Activity Data Structure (FIG. 21) are as follows:

House Demographic Code PAA-HOUSE-DEMOGRAPHIC-CODE 4040 and VPAS-HOUSE-DEMOGRAPHIC-CODE 5836

House Geographic Code PAA-HOUSE-GEOGRAPHIC-CODE 4045 and VPAS-HOUSE-GEOGRAPHIC-CODE 5838

Video Viewing Device Type Code PAA-VIDEO-VIEW-DEVICE-TYPE-CD 4050 and VPAS-VIDEO-VIEW-DEVICE-TYPE-CD 5842.

FIG. 21 illustrates an exemplary Video Program Airing Segment Data Structure used for Calculating Video Program Airing Segment Viewing Activity in the memory of a computer, according to one embodiment.

The Video Program Airing Segment Data Structure is used in calculating the Video Program Airing Segment level metrics. These metrics relate to all of the viewing activity for each segment in each airing of the program and associated viewings. This data allows the Analyst to analyze viewing against a segment that aired during a certain airing of a program. A segment may define a commercial break or any other program part. By analyzing viewing at the segment level for the individual airing level for a program, the Measurement Engine 200 is able to provide metrics related to segment level viewing for each airing. Recall that the Analyst can define multiple segments for a video program. A segment may define a commercial break. By tracking segment level viewing, the Measurement Engine 200 is able to collect viewing statistics for the various ads that ran during each airing of the program for Linear viewing sessions, or a DVR playback sessions, or a VOD sessions.

The segment definitions are read from the input file Video Program Segment File 160 (Reference FIG. 12) and then copied to each airing of the program in the Video Program Airing Segment Viewing Activity Data Structure (FIG. 21) at the start of processing (reference routine C146-COPY-SEG-DATA-TO-PGM-AIR).

The Demographic-Geographic-Device information is used to group Viewing Activity of the aired segment of the program by Demographic Geographic and Device combinations. As a nonlimiting example of how this information can be used, if the segment defines an ad break in the program, and if the same program airs at 5:00 PM and 9:00 PM, the Measurement Engine 200 can provide viewership counts of the ad from the 5:00 PM airing and from the 9:00 PM airing. This can be useful in determining whether or not it makes sense to run an ad during each of those airing times. Additionally, because the Measurement Engine 200 is tracking Demographic information about the viewer, the Analyst can determine which ad to place during each airing based on the demographics of the viewers. Similarly, if there are geographically based ad placements, by knowing the viewership by geographic area, the Analyst can determine where to direct the ad placement. By knowing viewership by device characteristic, the Analyst can determine when to place an ad if he desires to reach users that view content using a certain device type such as a tablet vs. a STB with television.

In all of these examples, advertising rates can be set according to the viewership information.

Viewing Activity Type

When the Viewing Activity Type 5812 is "DVR", then this record is recording Digital Video Recording viewing activity (viewing activity that is based on the playback with trick modes, etc.) of a Digital Video Recording.

When the Viewing Activity Type 5812 is "VOD", then this record is recording Video On Demand viewing activity.

When the Viewing Activity Type 5812 is "LIN", then this record is recording Linear viewing activity.

The Demographic-Geographic-Device information is used to group Viewing Activity of the program airing segment by Demographic Geographic and Device combinations.

Claims Reference: In FIG. 21 Fields 5810 to 5842 are Video Program Airing Segment Viewing Identifying Fields Claims Reference: In FIG. 21 fields 5846 to 6046 are Video Program Airing Segment Viewing Activity Fields which includes both Program Level metrics and Second-by-Second metrics.

Claim Reference: by putting the Video Program Airing Segment Viewing Activity Fields in the same Data Structure as child members to the Video Program Airing Segment Viewing Identifying Fields, this creates the correlation between the Identifying Fields and the Activity Fields.

FIG. 22 illustrates an exemplary flowchart for calculating the Summary Viewing Statistics. These statistics are calculated on three levels: (1) the Video Program level, (2) the Video Program Airing level, and (3) the Video Program Airing Segment level. At each level the Measurement Engine 200 is calculating various values that span the details in the respective Data Structures.

The process begins with Calculate Summary Viewing Statistics 960. The first step is Calculate Video Program Statistics 965 in which the following actions take place:
  Loop thru Demo-Geo-Devices for Video Program
  Calculate Video Program Demo-Geo-Device Aggregate Adjusted Viewing Seconds
  Loop thru Seconds for Video Program Demo-Geo-Device
    Calculate Video Program Demo-Geo-Device per second Adjusted Viewing Count
    Calculate Video Program Demo-Geo-Device per second Raw Viewing Count To recap, in this step the Measurement Engine 200 loops thru all of the Demo-Geo-Device combinations for this Video Program and calculates the Aggregate Adjusted Viewing Seconds. The aggregate adjusted viewing seconds is the sum of all the aggregate viewing seconds of each playback mode (PL, SK, SP, F1, etc.) for this Demo-Geo-Device in the context of this Video Program.

Once this part is complete, the program will then loop thru the viewing seconds and calculate the adjusted viewing count and the raw viewing count. The Adjusted total viewing count is the sum across all the seconds of the adjusted PL, SK, SP, F1, etc. counts. The Raw total viewing count is the sum across all the seconds of the Raw PL, SK, SP, F1, etc. counts. Reference M100-FINAL-CALCULATIONS for the program code.

The process then continues with Calculate Video Program Airing Statistics 970 in which the following actions take place:
  Loop thru Video Program Airings
  Loop thru Demo-Geo-Devices for Video Program Airing
    Calculate Video Program Airing Demo-Geo-Device Aggregate Adjusted Viewing Seconds
    Loop thru Seconds for Video Program Airing Demo-Geo-Device
      Calculate Video Program Airing Demo-Geo-Device per second Adjusted Viewing Count
      Calculate Video Program Airing Demo-Geo-Device per second Raw Viewing Count To recap, in this step the Measurement Engine 200 loops thru each of the Program Airings and then for each Airing, it loops thru all of the Demo-Geo-Device combinations for this Video Program Airing and calculates the Aggregate Adjusted Viewing Seconds at the Program Airing level. The aggregate adjusted viewing seconds is the sum of all the aggregate viewing seconds of each playback mode (PL, SK, SP, F1, etc.) for this Demo-Geo-Device in the context of this Program Airing.

Once this part is complete, the program will then loop thru the viewing seconds and calculate the adjusted viewing count and the raw viewing count for this Demo-Geo-Device in the context of this Program Airing. The Adjusted total viewing count is the sum across all the seconds of the adjusted PL, SK, SP, F1, etc. counts. The Raw total viewing count is the sum across all the seconds of the Raw PL, SK, SP, F1, etc. counts. Reference M100-FINAL-CALCULATIONS for the program code.

The process then continues with Calculate Video Program Airing Segment Statistics 975 in which the following actions take place.:
  Loop thru Video Program Airings
  Loop thru Video Program Airing Segments
    Loop thru Demo-Geo-Devices for Video Program Airing Segment
      Calculate Video Program Airing Segment Demo-Geo-Device Aggregate Adjusted Viewing Seconds
      Loop thru Seconds for Video Program Airing Segment Demo-Geo-Device
        Calculate Video Program Airing Segment Demo-Geo-Device per second Adjusted Viewing Count
        Calculate Video Program Airing Segment Demo-Geo-Device per second Raw Viewing Count To recap, in this step the Measurement Engine 200 loops thru each of the Program Airings and then for each Airing, it loops thru all of the Program Airing Segments and then for each Segment it loops thru all of the Demo-Geo-Device combinations for this Video Program Airing Segment and calculates the Aggregate Adjusted Viewing Seconds at the Program Airing Segment level. The aggregate adjusted viewing seconds is the sum of all the aggregate viewing seconds of each playback mode (PL, SK, SP, F1, etc.) for this Demo-Geo-Device in the context of the Program Segment in the context of the Program Airing.

Once this part is complete, the program will then loop thru the viewing seconds and calculate the adjusted viewing count and the raw viewing count for this Demo-Geo-Device in the context of this Program Segment in the context of this Program Airing. The Adjusted total viewing count is the sum across all the seconds of the Adjusted PL, SK, SP, F1, etc. counts. The Raw total viewing count is the sum across all the seconds of the Raw PL, SK, SP, F1, etc. counts. Reference M100-FINAL-CALCULATIONS for the program code.

After step 975 is complete, the program is done Done 980 with the calculation of summary viewing statistics.

Ready to Write Output Files

At this point, the Measurement Engine 200 has completed all of the calculations and it is now ready to create the output files. Creation of the output files is discussed in FIGS. 23 to 31. In the program routine X100-WRITE-DVR-REC-PB-STATS controls the writing of the output files.

Note to the reader: As read the program source code, you will see that for each output file, the Measurement Engine 200 has the ability to write the file in either pipe delimited format or in commas separated value format.

Figure 23:
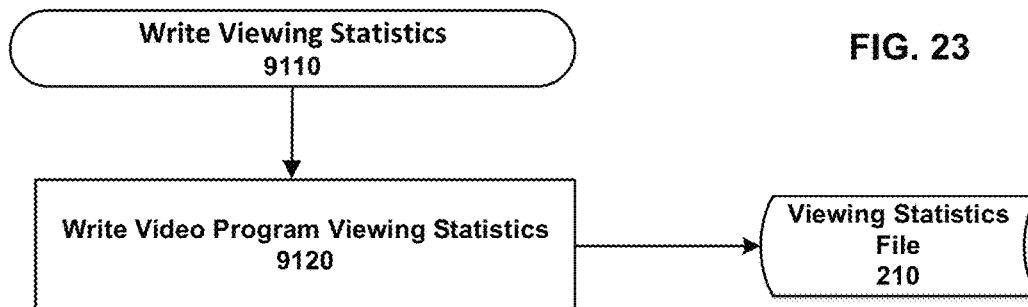
FIG. 23 illustrates an exemplary process for writing the Viewing Statistics file 210, according to one embodiment.

FIG. 23 illustrates an exemplary flowchart for writing the summary statistics related to the entire run. The process begins with Write Viewing Statistics 9110. The Measurement Engine 200 then formats the record and writes the file per step Write Video Program Viewing Statistics 9120 which writes file Viewing Statistics File 210. The record layout for this file is described in FIG. 32.

Reference X100-WRITE-DVR-REC-PB-STATS for the program code.

Figure 24:
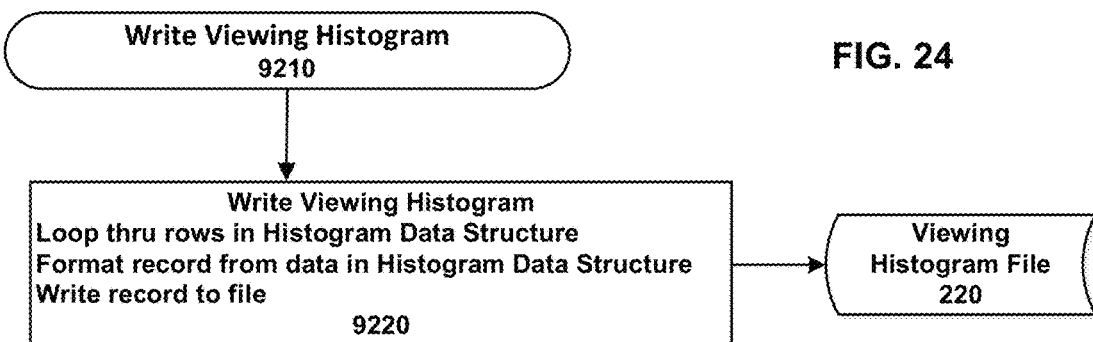
FIG. 24 illustrates an exemplary process for writing the Viewing Histogram file, 220 according to one embodiment.

FIG. 24 illustrates an exemplary flowchart for writing the viewing histogram data for the entire run. The process begins with Write Viewing Histogram 9210. The Measurement Engine 200 then proceeds to Write Viewing Histogram 9220 where it does the following:

Loop thru rows in Histogram Data Structure

Format record from data in Histogram Data Structure

Write record to file

Step 9220 writes file Viewing Histogram File 220. The record layout for this file is described in FIG. 33.

When all of the histogram rows have been written to the file, the process is done.

Reference X200-WRITE-DVR-REC-PB-HISTG for the program code.

Figure 25:
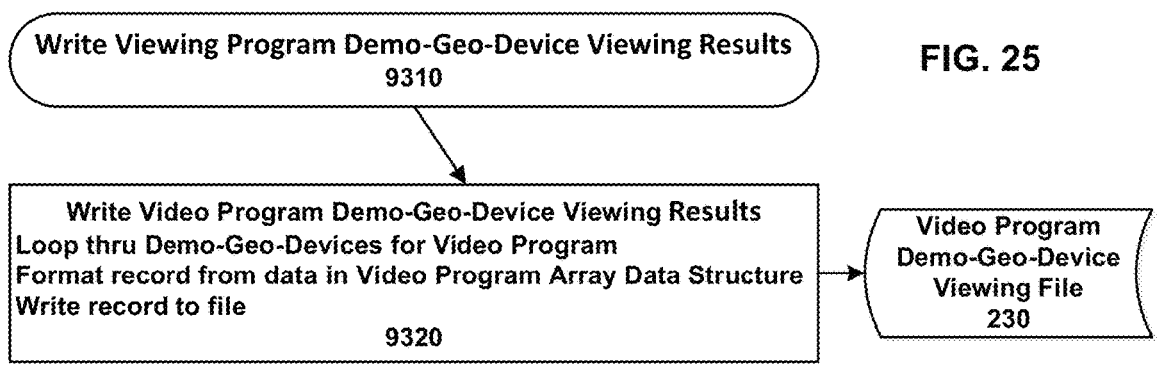
FIG. 25 illustrates an exemplary process for writing the Viewing Program Demo-Geo-Device Viewing file 230, according to one embodiment.

FIG. 25 illustrates an exemplary flowchart for writing the Video Program Demo-Geo-Device level results for the entire run. The process begins with Write Viewing Program Demo-Geo-Device Viewing Results 9310. The Measurement Engine 200 then proceeds to Write Video Program Demo-Geo-Device Viewing Results 9320 where it does the following:

Loop thru Demo-Geo-Devices for Video Program

Format record from data in Video Program Array Data Structure

Write record to file

Step 9320 writes file Video Program Demo-Geo-Device Viewing File 230. The record layout for this file is described in FIG. 34.

When all of the Video Program Demo-Geo-Device have been written to the file, the process is done.

Reference X300-WRITE-VID-PGM-DEM-GEO-DEV for the program code.

Figure 26:
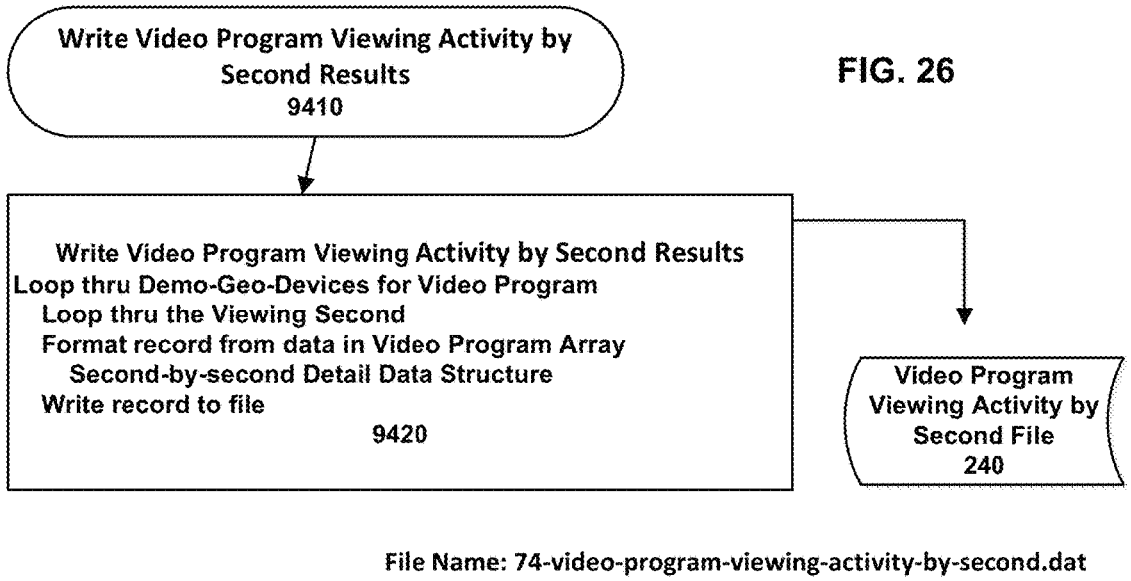
FIG. 26 illustrates an exemplary process for writing the Video Program Viewing Activity by Second file 240, according to one embodiment.

FIG. 26 illustrates an exemplary flowchart for writing the Video Program Demo-Geo-Device activity at a second-by-second level for the entire run. The process begins with Write Video Program Viewing Activity by Second Results 9410. The Measurement Engine 200 then proceeds to Write Video Program Viewing Activity by Second Results 9420 where it does the following:

Loop thru Demo-Geo-Devices for Video Program

Loop thru the Viewing Second

Format record from data in Video Program Array Second-by-second Detail Data Structure Write record to file Step 9420 writes file Video Program Viewing Activity by Second File 240. The record layout for this file is described in FIG. 35.

When all of the Video Program Demo-Geo-Device second-by-second activity has been written to the file, the process is done.

Reference X400-WRITE-VID-PGM-VW-ACT-BY-S for the program code.

Figure 27:
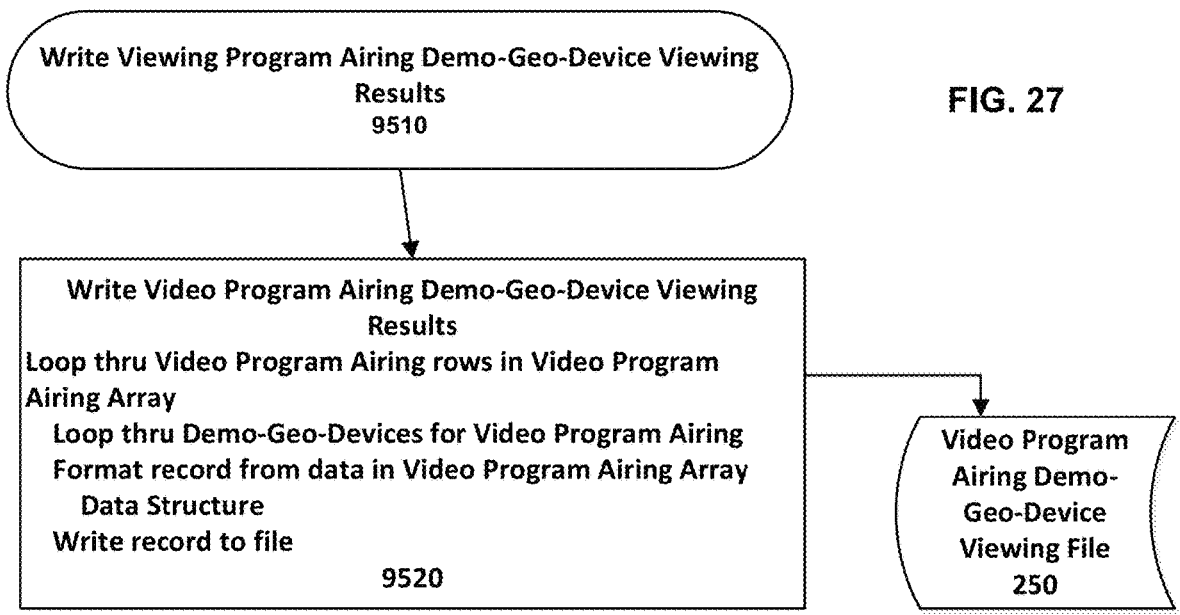
FIG. 27 illustrates an exemplary process for writing the Viewing Program Airing Demo-Geo-Device Viewing file 250, according to one embodiment.

FIG. 27 illustrates an exemplary flowchart for writing the Video Program Airing Demo-Geo-Device level results for the entire run. The process begins with Write Viewing Program Airing Demo-Geo-Device Viewing Results 9510. The Measurement Engine 200 then proceeds to Write Video Program Airing Demo-Geo-Device Viewing Results 9520 where it does the following:

Loop thru Video Program Airing rows in Video Program Airing Array

Loop thru Demo-Geo-Devices for Video Program Airing

Format record from data in Video Program Airing Array Data Structure

Write record to file

Step 9520 writes file Video Program Airing Demo-Geo-Device Viewing File 250. The record layout for this file is described in FIG. 36.

When all of the Video Program Airing Demo-Geo-Device data has been written to the file, the process is done.

Reference X500-WRITE-VIDEO-PGM-AIR-DGD for the program code.

Figure 28:
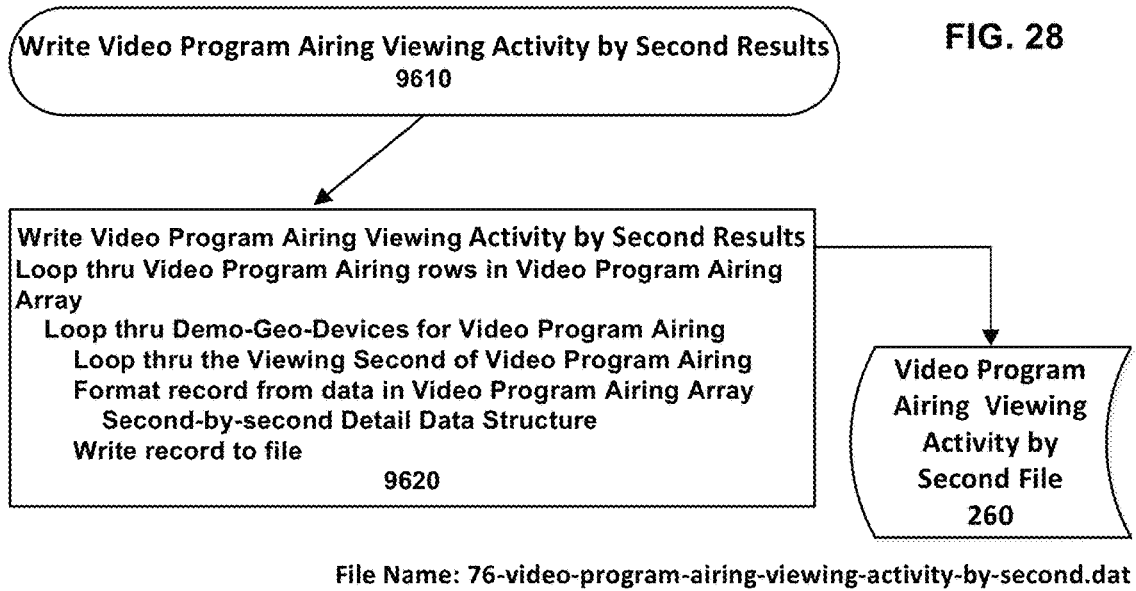
FIG. 28 illustrates an exemplary process for writing the Viewing Program Airing Viewing Activity by Second file 260, according to one embodiment.

FIG. 28 illustrates an exemplary flowchart for writing the Video Program Airing Demo-Geo-Device activity at a second-by-second level for the entire run. The process begins with Write Video Program Airing Viewing Activity by Second Results 9610. The Measurement Engine 200 then proceeds to Write Video Program Airing Viewing Activity by Second Results 9620 where it does the following:

Loop thru Video Program Airing rows in Video Program Airing Array

Loop thru Demo-Geo-Devices for Video Program Airing

Loop thru the Viewing Second of Video Program Airing

Format record from data in Video Program Airing Array Second-by-second

Detail Data Structure

Write record to file

Step 9620 writes file Video Program Airing Viewing Activity by Second File 260. The record layout for this file is described in FIG. 37.

When all of the Video Program Airing Demo-Geo-Device second-by-second activity has been written to the file, the process is done.

Reference X600-WRITE-VIDEO-PGM-AIR-VABS for the program code.

Figure 29:
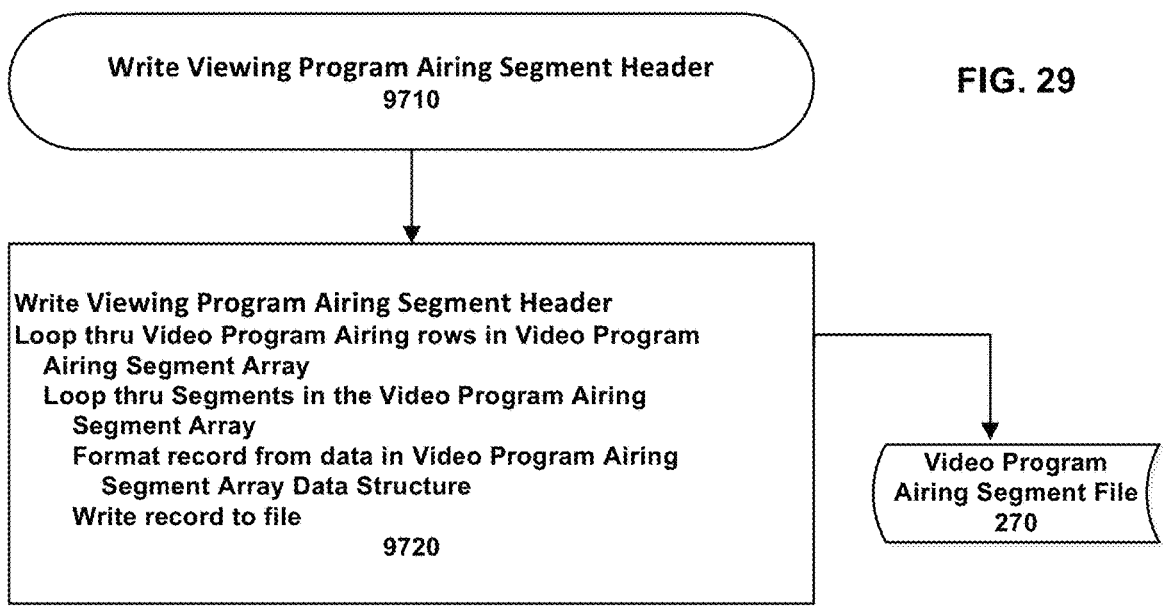
FIG. 29 illustrates an exemplary process for writing the Video Program Airing Segment file 270, according to one embodiment.

FIG. 29 illustrates an exemplary flowchart for writing the Video Program Airing Segment Header data for each Video Program Airing Segment that was processed during the run.

The process begins with Write Viewing Program Airing Segment Header 9710. The Measurement Engine 200 then proceeds to Write Viewing Program Airing Segment Header 9720 where it does the following:

Loop thru Video Program Airing rows in Video Program Airing Segment Array
  Loop thru Segments in the Video Program Airing Segment Array
    Format record from data in Video Program Airing Segment Array Data Structure
    Write record to file Step 9720 writes file Video Program Airing Segment File 270. The record layout for this file is described in FIG. 38.

When all of the Program Airing Segment Header data has been written to the file, the process is done.

Reference X700-WRITE-VIDEO-PGM-AIR-SEG for the program code.

Figure 30:
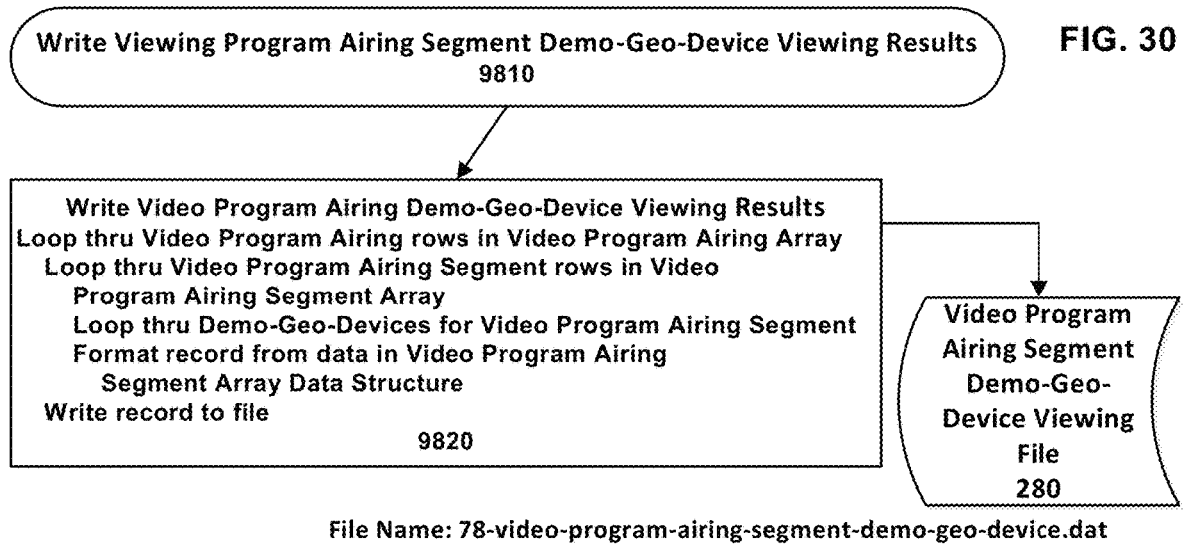
FIG. 30 illustrates an exemplary process for writing the Viewing Program Airing Segment Demo-Geo-Device Viewing file 280, according to one embodiment.

FIG. 30 illustrates an exemplary flowchart for writing the Video Program Airing Segment Demo-Geo-Device level results for the entire run. The process begins with Write Viewing Program Airing Segment Demo-Geo-Device Viewing Results 9810. The Measurement Engine 200 then proceeds to Write Video Program Airing Demo-Geo-Device Viewing Results 9820 where it does the following:

Loop thru Video Program Airing rows in Video Program Airing Segment Array
  Loop thru Video Program Airing Segment rows in Video Program Airing Segment Array
    Loop thru Demo-Geo-Devices for Video Program Airing Segment
      Format record from data in Video Program Airing Segment Array Data Structure Write record to file Step 9820 writes file Video Program Airing Segment Demo-Geo-Device Viewing File 280. The record layout for this file is described in FIG. 39.

When all of the Video Program Airing Segment Demo-Geo-Device data has been written to the file, the process is done.

Reference X800-VIDEO-PGM-AIR-SEGMENT for the program code.

Figure 31:
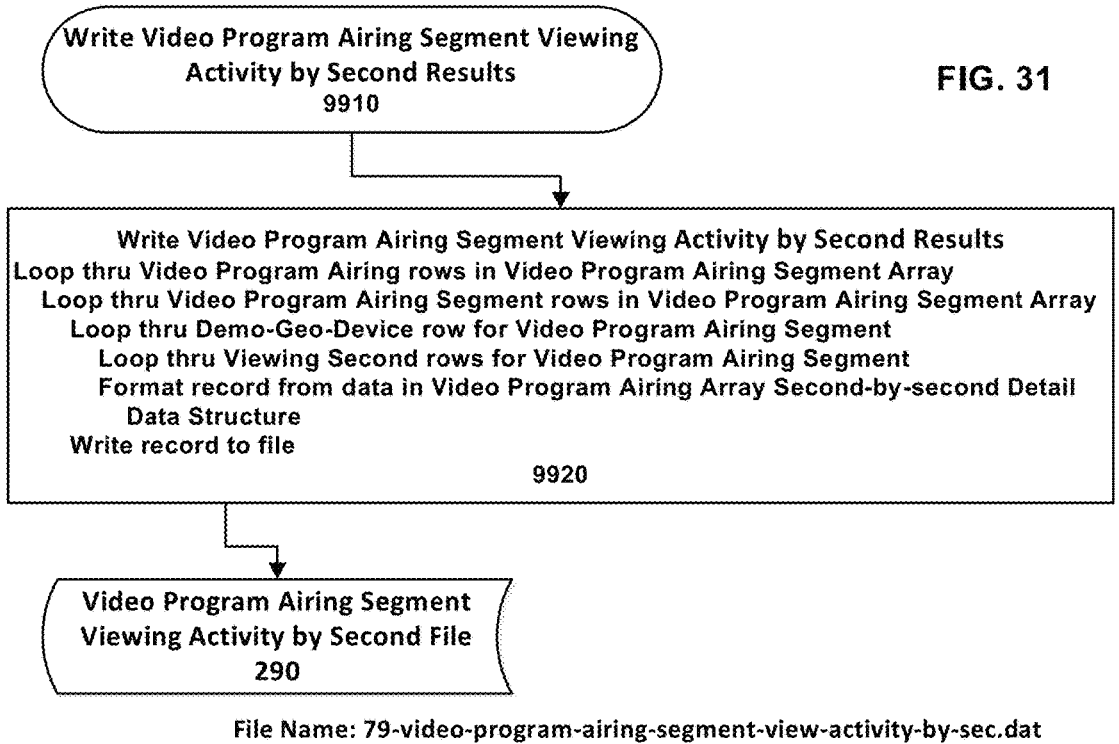
FIG. 31 illustrates an exemplary process for writing the Video Program Airing Segment Viewing Activity by Second file 290, according to one embodiment.

FIG. 31 illustrates an exemplary flowchart for writing the Video Program Airing Segment viewing activity at a second-by-second level for the entire run. The process begins with Write Video Program Airing Segment Viewing Activity by Second Results 9910. The Measurement Engine 200 then proceeds to Write Video Program Airing Segment Viewing Activity by Second Results 9920 where it does the following:

Loop thru Video Program Airing rows in Video Program Airing Segment Array
  Loop thru Video Program Airing Segment rows in Video Program Airing Segment Array
    Loop thru Demo-Geo-Device row for Video Program Airing Segment
      Loop thru Viewing Second rows for Video Program Airing Segment
        Format record from data in Video Program Airing Array Second-by-second Detail Data Structure
        Write record to file Step 9920 writes file Video Program Airing Segment Viewing Activity by Second File 290. The record layout for this file is described in FIG. 40.

When all of the Video Program Airing Segment second-by-second activity has been written to the file, the process is done.

Reference X900-WRITE-VID-PGM-AIR-SEG-DGD for the program code.

Review of FIGS. 32-40

I will now review FIGS. 32-40.

These figures provide the record layouts for the various files that are created by the Measurement Engine 200 as a result of calculating video asset viewing activity. These files are structured such that they can be loaded to a database where a reporting application can be developed. To assist the reader in implementing such a system I have provided suggested Table names. I have also indicated the Parent table name to show how each table fits within the context of a Media Measurement Data Model. The reader will note that while this embodiment shows that these outputs are created as flat files, another embodiment may insert to or update a data base table to record this information. Yet another embodiment may show XML messages or any other computer readable format.

The reader will find a block of information entitled Summary Information for each of FIGS. 32-40. It provides a Short name of the file/data, a Table Name which is a suggested name which can be assigned to the table to which this file is loaded in the database, a Parent table name in the context of a Media Measurement Data Model, the Output file name assigned by Measurement Engine 200, a Record description, and the Specification File Name. With these various elements, the reader has an start-to-finish view of each file.

After the Summary Information, the reader will find the Record Layout which lists the individual fields, data type, size, and description or definition for each field in the file.

For each file, in the DESCRIPTION field under the Record Layout, I have specified how the field is populated or where the field is populated from. Additionally, because the source field contains the definition I have not included it the record layouts in FIGS. 32-40.

FIG. 32 illustrates summary information and an exemplary record layout for the Viewing Statistics file 210 which is produced by the Measurement Engine 200 as a result of calculating video asset viewing activity.

FIG. 33 illustrates summary information and an exemplary record layout for the Viewing Histogram file 220 which are produced by the Measurement Engine 200 as a result of calculating video program viewing activity.

FIG. 34 illustrates summary information and an exemplary record layout for the Video Program Demographic Geographic Device Viewing file 230 which are produced by the Measurement Engine 200 as a result of calculating video program viewing activity.

FIG. 35 illustrates summary information and an exemplary record layout for the Video Program Viewing Activity by Second file 240 which are produced by the Measurement Engine 200 as a result of calculating video program viewing activity.

FIG. 36 illustrates summary information and an exemplary record layout for the Video Program Airing Demographic Geographic Device Viewing file 250 which are produced by the Measurement Engine 200 as a result of calculating video program viewing activity.

FIG. 37 illustrates summary information and an exemplary record layout for the Viewing Program Airing Viewing Activity by Second file 260 which are produced by the Measurement Engine 200 as a result of calculating video program viewing activity.

FIG. 38 illustrates summary information and an exemplary record layout for the Video Program Airing Segment file 270 which are produced by the Measurement Engine 200 as a result of calculating video program viewing activity.

FIG. 39 illustrates summary information and an exemplary record layout for the Video Program Airing Segment Demographic Geographic Device file 280 which are produced by the Measurement Engine 200 as a result of calculating video program viewing activity.

FIG. 40 illustrates summary information and an exemplary record layout for the Video Program Airing Segment Viewing Activity by Second file 290 which are produced by the Measurement Engine 200 as a result of calculating video program viewing activity.

Figure 41:
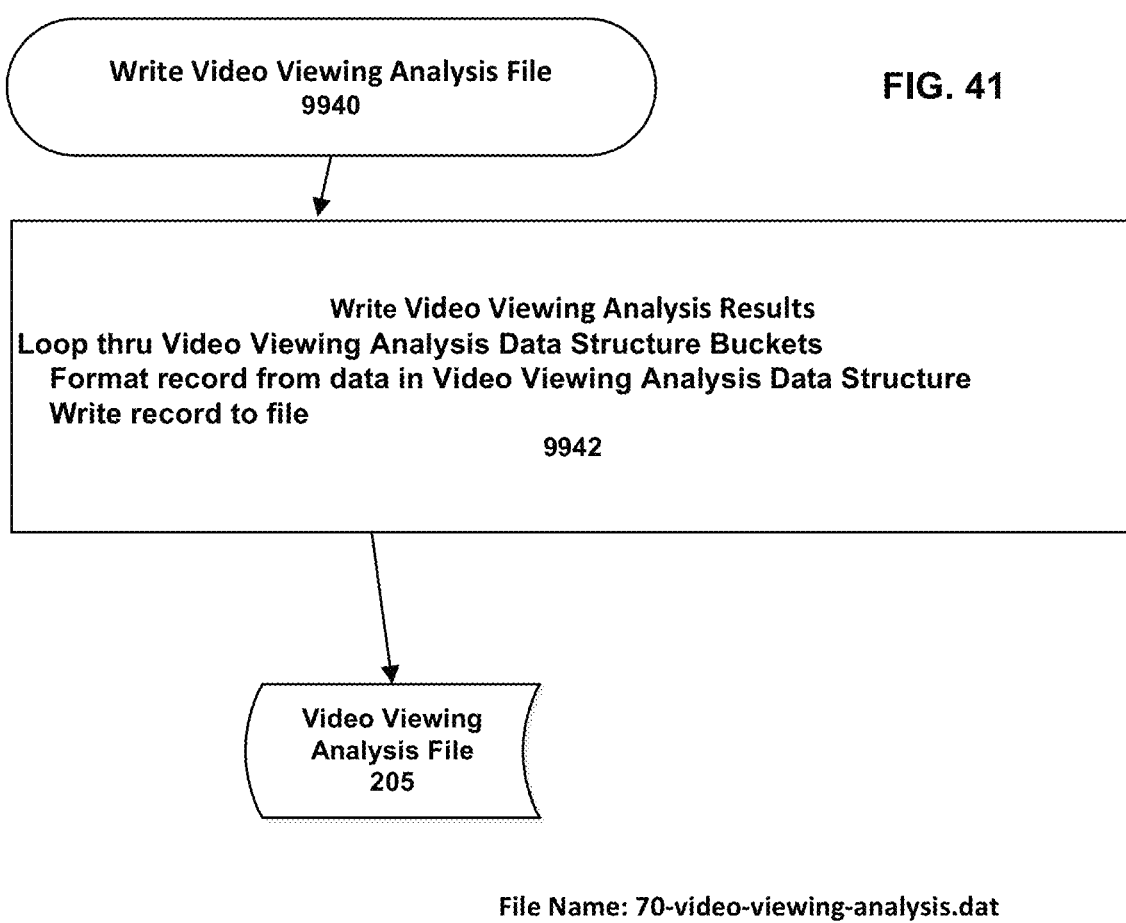
FIG. 41 illustrates an exemplary process for writing the data in the Video Viewing Analysis Data Structure to the Video Viewing Analysis File 205, according to one embodiment.

FIG. 41 illustrates an exemplary flowchart which describes the process for writing the Video Viewing Analysis File 205. The process maps the fields in the Video Viewing Analysis Data Structure (FIG. 2) to the record layout in FIG. 41 and then it writes the record. As part of the process the system loops through the Video Viewing Analysis Data Structure Buckets and writes one record for each Bucket that has viewing activity represented in it.

The process begins with Write Video Viewing Analysis File 9940. It continues to Write Video Viewing Analysis Results 9942 where it Loops thru Video Viewing Analysis Data Structure Buckets, Formats the output record FIG. 42 from data in Video Viewing Analysis Data Structure (FIG. 2), and then Writes the record to file thus creating Video Viewing Analysis File 205. The process is done when it has looped thru all the Buckets in the Video Viewing Analysis Data Structure (FIG. 2).

FIG. 42 illustrates an exemplary record layout for the Video Viewing Analysis File 205 which is produced by the Measurement Engine 200. This is the analyzed detail data which was used as input to the summarization process. This provides the picture of the analyzed viewing activity data at a session level. This data can be used for additional analysis.

Alternative Embodiments

Note that the specification and drawings and program code use certain terms interchangeably. The reader will note this most frequently with the terms set-top box and video asset viewing device. The reader will appreciate that a set-top box is merely a specific kind of video asset viewing device. A smart phone, a tablet device, a gaming console are all examples of video asset viewing device. Thus any reference to a set-top box should be read to also include any kind of a video asset viewing device.

Although the description above contains much specificity, this should not be construed as limiting the scope of the embodiments but as merely providing illustrations of some of several embodiments. As a nonlimiting example, additional qualifiers may be added along with demographic and geographic codes. Additional Histograms may be created based on other metrics. Additional calculations can be done once the data is loaded to the various data structures.

Scope of Viewer Interaction Data Loaded

I presently contemplate that the Measurement Engine 200 will process viewer interaction data for one Video Program at a time. Another embodiment may process more than one program, or only one airing of a program or some other combination.

Viewing Activity

I presently contemplate tracking the viewing activity (play, skip, fast forward, reverse, etc.) identified herein. Another embodiment may track fewer kinds of viewing activity or other similar activity.

Methods for Receiving Data

I presently contemplate Playback Mode File 110, the Playback Delay Penalty Factor File 120, the Histogram Definition File 130 all being provided in flat files, but another embodiment may provide this data in any computer readable format including but not limited to data base tables, XML messages, or other messaging constructs.

I presently contemplate Video Program Airing File 150 data and the Video Program Airing Segment File 160 data being provided in flat files, but another embodiment may provide this data in any computer readable format including but not limited to data base tables, XML messages, or other messaging constructs.

I presently contemplate Video Viewing Event File 170 data data being provided as a flat file, but another embodiment may provide this data in any computer readable format including but not limited to data base tables, XML messages, or other messaging constructs.

I presently contemplate that the Video Viewing Event File 170 data being sorted as part of extracting that data from the Media Measurement Data Base 100, but another embodiment may sort this data as a separate step once it is extracted from the Media Measurement Data Base 100.

Playback Delay Penalty

I presently contemplate one Playback Delay Penalty definition that is applicable for all activity related to the Video Program. Another embodiment may specify differing playback delay penalty definitions depending on program type, content type, etc. As a nonlimiting example, a sports program may have one playback delay penalty definition while a movie may have a different playback delay penalty definition.

Identifiers for Data

I presently contemplate using a combination of numeric and mnemonics for the various identifiers such as market, demographic code, geographic code, channel call sign, video program id, video program airing id, industry program id, industry asset id, and other similar fields, but another embodiment could use only numeric values as identifiers with links to reference tables for the descriptions of the numeric identifiers or only mnemonic identifiers.

Data Structure Specifications

I presently contemplate allowing multiple, up to 4, video program airings for each video program, but another embodiment may allow a different number of video program airings.

I presently contemplate allowing multiple, up to 20, demographic-geographic-device combinations at the various levels, but another embodiment may allow a different number of such combinations.

I presently contemplate allowing multiple, up to 30, histogram buckets, but another embodiment may allow a different number of histogram buckets.

I presently contemplate allowing a video program and its corresponding airings to be up to 4 hours in length (14400 seconds), but another embodiment may allow a shorter or longer video program durations.

I presently contemplate allowing multiple, up to 60, one minute video program segments for a video program, but another embodiment may allow a different number of segments.

I presently contemplate each video program segment will be one minute (60 seconds) in duration, but another embodiment may allow a shorter or longer segments.

I presently contemplate allowing multiple, up to 20, playback delay penalty factors, but another embodiment may allow a different number of such factors.

Programming Algorithm Scope

I presently contemplate executing the algorithms described herein separately in some sequence, but another embodiment could combine multiple simple algorithms into fewer complex algorithms.

Receiving Date and Time Information

I presently contemplate that the various file formats which provide date and time information will provide such data in the format indicated whether this be (a) a date format such as YYYY-MM-DD HH:MM:SS AM/PM, or (b) a number format identifying the second of the program, or (c) the second since the true beginning of the program. Another embodiment may provide similar values that can be used to accomplish a similar result. Nonlimiting examples include UTC time, Epoch time (seconds since Jan. 1, 1970), etc. Either embodiment can be used as input to create the metrics.

I presently contemplate receiving all of the date and time values in local time, but another embodiment may provide these in Coordinated Universal Time (UTC time).

Usage of the Media Measurement Model Data Model

I presently contemplate that the video program data, video program airing data, video program airing segment data, the viewing data, and the various supporting elements will be provided in a format similar to that shown herein, but another embodiment may capture the viewing data in some other format and make that data available to the Measurement Engine 200 for analysis while still working within the spirit and scope of this disclosure.

General Information

I presently contemplate using variables having the data types and field sizes shown, but another embodiment may use variables with different data types and field sizes to accomplish a similar result.

I presently contemplate tracking viewing activity at the granularity of one second, but another embodiment may track viewing activity at a finer granularity, perhaps half-second, or tenth-second, or millisecond. Yet another embodiment may receive data at a granularity finer than one second and round to the nearest second for use by the Measurement Engine 200.

I presently contemplate using Data Structures similar to those defined herein, but another embodiment may use a different Data Structure or Data Structures to accomplish a similar result. As a nonlimiting example, another embodiment may use database tables or other objects instead of Data Structures similar to those I have defined herein to accomplish a similar result while still working within the spirit and scope of this disclosure.

Implementation Information

I presently contemplate using the WINDOWS 7 Professional operating system from MICROSOFT Corporation, but another embodiment may use a different operating system.

I presently contemplate using FUJITSU® NetCOBOL® for WINDOWS® version 10.1 developed by FUJITSU® and distributed by Alchemy Solutions Inc, but another embodiment may use a different programming language or a different version of COBOL.

General Remarks

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described hereinabove may be implemented in computer software using any suitable computer software language type such as, for example, C, C#, or C++ using, for example, conventional or object-oriented techniques. Such software may be stored on any type of suitable computer-readable medium or media such as, for example, a magnetic or optical storage medium. Thus, the operation and behavior of the embodiments are described in COBOL style pseudocode purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, a compact disk, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, memory sticks, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means or a method for performing a specified function is intended to encompass any way of performing that function including, for example, a combination of elements that performs that function. Therefore, any means or method that can provide such functionalities may be considered equivalents to the means or methods shown herein.

While I have developed this embodiment on a personal computer, it can be appreciated that the "data analysis computer system" may be, for example, a wireless or wire line variety of a microcomputer, minicomputer, server, mainframe, laptop, personal data assistant (PDA), smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means or method for storing software, including a hard disk, an optical disk, floppy disk, ROM (read only memory), RAM (random access memory), PROM (programmable ROM), EEPROM (electrically erasable PROM), and other computer-readable media.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

CONCLUSIONS, RAMIFICATIONS, AND SCOPE

In my previous Applications, I have identified numerous Conclusions, Ramifications, and Scope items. Many of those are similar for this application. The Conclusions, Ramifications, and Scope items from my Application U.S. application Ser. No. 12/981,301 filed on Dec. 29, 2010, and my U.S. application Ser. No. 13/052,026 filed on Mar. 18, 2011, and my U.S. application Ser. No. 13/360,704 filed on Jan. 28, 2012 are included herein by reference but not admitted to be prior art.

In this discussion below, I will focus on new ramifications introduced by this Application.

From the description above, a number of advantages of some embodiments of my Measurement Engine 200 and its supporting processes become evident:

In this specification I have taught how to measure Linear Viewing activity, and Digital Video Recorder recording and viewing activity, and Video On Demand viewing activity. Within this context, I have taught how to measure such viewing activity at multiple levels: (a) the Video Program Level, (b) the Video Program Airing level, and (c) the Video Program Airing Segment level. Within these three levels, I have taught how to calculate metrics across the level and for each second within the level. Regarding the 'across the level' metrics, I have taught how to calculate metrics that will provide a summary view of the viewing activity related to the relevant level. In order to provide a deeper look, I have also taught how to calculate metrics at a second-by-second level in the video content.

All of these metrics can be loaded to a database for longitudinal analysis. As a nonlimiting example, the program level metrics can be tracked to identify week-to-week activity. Then the more detailed metrics can provide additional insight into the causes behind the overall trends.

By having a Measurement Engine 200 that is able to measure Linear viewing activity and DVR and VOD viewing activity, I can provide insight into viewing patterns across these viewing modes.

Additionally, by having a Measurement Engine 200 that is able to measure second-by-second activity, I can provide insight into the use of trick modes and how viewers use such modes to skip past content that is not of interest to them.

In the case of DVR viewing, by having the ability to discount viewing of DVR recordings based on elapsed time since the recording, I can reflect the reduce value of the ads as they become stale.

By having a Measurement Engine 200 that is able to measure Linear Viewing activity, and Digital Video Recorder recording and viewing activity, and Video On Demand viewing activity, I have introduced the ability to measure viewing activity of various video assets with attention also being given to measuring linear viewing activity and time shifted viewing activity. Thus I am able to accurately measure ad viewership during playback of a DVR or VOD asset. I have also taught how to value that viewership based on the amount of time that has elapsed between the original recording of the asset and the subsequent playback of the asset. I have also taught how to measure ad impressions which may occur during playback, including playback that involved a variety of trick plays.

Additionally, I have taught how to distinguish viewing activity by various demographic groups, geographic areas, and devices based on characteristics. These measures can provide valuable insight into viewer behavior.

The ability to produce metrics that were not previously possible will provide information that is valuable to advertisers and content providers and service providers.

This method of tracking viewing activity on a second-by-second basis is contrary to the teaching of those who work with start time and duration (seconds viewed) in a relational data base model. Thus I am able to solve problems previously found insolvable when limited to using the existing techniques. I am able to provide metrics that could not be produced using existing techniques.

Subsequent Usage of the Metrics

The metrics produced by the Measurement Engine 200 readily lend themselves to dimensional analysis using contemporary data warehouse methods. A Fact table in such an application may contain viewing data for an video program or a video program airing or a video program airing segment. Multiple Dimension tables can readily be envisioned by those skilled in the art. As non-limiting examples, various values including demographic group, geographic group, viewing device type, program genre, viewing date, viewing time, viewing day of week, etc. could be Dimensions. Additionally, other attributes regarding the program content could be included in such an analysis by using the industry program id to join to other reference data that may be available to the analyst.

The metrics produced by the Measurement Engine 200 can be loaded to a data warehouse to support additional longitudinal analysis beyond what is done by the Engine. Thus we can readily envision a myriad of uses for the metrics produced by the Measurement Engine 200.

All of this could be done using anonymous and/or de-identified identifiers for video viewing device, for household, and for viewer all to protect viewer privacy.

Numerous additional metrics can readily be identified by those skilled in the art. Additionally, numerous additional uses for the metrics identified herein will be readily evident to those skilled in the art.

Other Ramifications

In today's world where the number of media viewing choices is vast, it is often difficult for the viewer to locate the content that he or she might be most interested in receiving. To assist in solving this problem, a content provider could develop viewing profiles that could then be used to suggest content to a viewer. Such profiles can be developed by tracking the viewing history of various groups of viewers. As an example, the Measurement Engine 200 can produce metrics which identify the viewing behavior of various groups of people. Perhaps a video asset that represents a classic movie earns very high viewing rates with one group while a video asset that represents a mystery movie earns very high viewing rates with another group. Then a system could be setup to suggest candidate movies based on the viewer's viewing group so that a viewer in the first viewing group may be presented with a list of classic movie titles while a viewer in the second group would be presented with a list of mystery movies. The viewer is thus assisted in choosing content.

SUMMARY

In accordance with one embodiment, I have disclosed a computer-implemented method of using video asset viewing data that has been loaded to a media measurement data model as input to a measurement engine which then calculates Linear, DVR, and VOD asset viewing activity at three levels: (a) Video Program, (b) Video Program Airing, (c) Video Program Airing Segment, where each level provides summary metrics for groupings of Demographic Code, Geographic, and/or Device Characteristic, and also second-by-second viewing metrics within the Demographic, Geographic, Device groupings. Together these metrics provide detailed information on customer viewing behavior which can be used to drive business decisions for service providers, advertisers, and content producers. Additionally, a viewing histogram file is produced. Other embodiments can produce similar results using data from a source other than the media measurement data model as long as that data is properly formatted for my Measurement Engine.

These viewing metrics meet pressing needs for detailed audience viewership information that is not presently available and thus the metrics will be of great value to the industry.

The invention claimed is:

1. An apparatus comprising:
one or more processors; and
memory storing instructions that, when executed by the one or more processors, cause the apparatus to:
determine, for a segment of a plurality of segments of a video asset, a video-viewing mode via which a first video-asset-viewing device outputted the segment;
determining, for the segment of the plurality of segments, and based on the video-viewing mode, a first value;
determining, for the segment of the plurality of segments, and based on a video-viewing mode via which a second video-asset-viewing device outputted the segment, a second value, wherein the first value is different from the second value;
based on determining that the video-viewing mode via which the first video-asset-viewing device outputted the segment corresponds to playback of one or more segments of the video asset, adjusting a first video viewing count, associated with the segment, by the first value; and
based on determining that the video-viewing mode via which the second video-asset-viewing device outputted the segment corresponds to fast-forwarding one or more segments of the video asset, adjusting a second video viewing count, associated with the segment, by the second value.

2. The apparatus of claim 1, wherein the instructions, when executed by the one or more processors, further cause the apparatus to:
determine, based on the video-viewing mode via which the first video-asset-viewing device outputted the segment, a count of a number of segments with respect to which playback was employed by the first video-asset-viewing device.

3. The apparatus of claim 1, wherein the instructions, when executed by the one or more processors, further cause the apparatus to determine the second value by causing:
determining a speed at which the second video-asset-viewing device outputted the segment of the plurality of segments of the video asset.

4. The apparatus of claim 1, wherein the instructions, when executed by the one or more processors, further cause the apparatus to determine the video-viewing mode, via which the first video-asset-viewing device outputted the segment, by causing:
determining an amount of time between when the video asset was made available for output and when the first video-asset-viewing device outputted the segment of the plurality of segments of the video asset.

5. The apparatus of claim 1, wherein the instructions, when executed by the one or more processors, further cause the apparatus to:
group a plurality of values based on the video-viewing mode via which the first video-asset-viewing device outputted the plurality of segments and a plurality of values based on the video-viewing mode via which the second video-asset-viewing device outputted the plurality of segments with a set of values associated with the video asset; and
determine, based on the set of values, a video-viewing-activity metric for the video asset.

6. The apparatus of claim 5, wherein the instructions, when executed by the one or more processors, further cause the apparatus to:
determine that each value in a subset of the set corresponds to one or more criteria for the video-viewing-activity metric.

7. The apparatus of claim 6, wherein the one or more criteria comprise a viewer-demographic criterion, and wherein the instructions, when executed by the one or more processors, further cause the apparatus to determine that each value in the subset corresponds to the one or more criteria by causing determining that each value in the subset corresponds to the viewer-demographic criterion, and wherein the instructions, when executed by the one or more processors, further cause the apparatus to determine the video-viewing-activity metric by causing determining a video-viewing-activity metric for the viewer-demographic criterion.

8. The apparatus of claim 6, wherein the one or more criteria comprise a geographic criterion, wherein the instructions, when executed by the one or more processors, further cause the apparatus to determine that each value in the subset corresponds to the one or more criteria by causing determining that each value in the subset corresponds to the geographic criterion, and wherein the instructions, when executed by the one or more processors, further cause the apparatus to determine the video-viewing-activity metric by causing determining a video-viewing-activity metric for the geographic criterion.

9. A system comprising:
a first video-asset-viewing device, of a plurality of video-asset-viewing devices, comprising:
one or more first processors; and
first memory storing first instructions that, when executed by the one or more first processors, cause the first video-asset-viewing device to output a segment, of a plurality of segments, of a video asset;
a second video-asset-viewing device, of the plurality of video-asset-viewing devices, comprising:
one or more second processors; and
second memory storing second instructions that, when executed by the one or more second processors, cause the second video-asset-viewing device to output the segment, of the plurality of segments, of the video asset; and
a computing device comprising:
one or more third processors; and
third memory storing third instructions that, when executed by the one or more third processors, cause the computing device to:
determine, for the segment of the plurality of segments of the video asset, a video-viewing mode via which the first video-asset-viewing device outputted the segment;
determine, for the segment of the plurality of segments, and based on the video-viewing mode, a first value;
determine, for the segment of the plurality of segments, and based on a video-viewing mode via which the second video-asset-viewing device outputted the segment, a second value, wherein the first value is different from the second value;
based on determining that the video-viewing mode via which the first video-asset-viewing device outputted the segment corresponds to playback of one or more segments of the video asset, adjusting a first video viewing count, associated with the segment, by the first value; and
based on determining that the video-viewing mode via which the second video-asset-viewing device outputted the segment corresponds to fast-forwarding one or more segments of the video asset, adjusting a second video viewing count, associated with the segment, by the second value.

10. The system of claim 9, wherein the third instructions, when executed by the one or more third processors, cause the computing device to:
determine, based on the video-viewing mode via which the first video-asset-viewing device outputted the segment, a count of a number of segments with respect to which playback was employed by the first video-asset-viewing device.

11. The system of claim 9, wherein the third instructions, when executed by the one or more third processors, cause the computing device to determine the second value by causing:
determining a speed at which the second video-asset-viewing device outputted the segment of the plurality of segments of the video asset.

12. The system of claim 9, wherein the third instructions, when executed by the one or more third processors, cause the computing device to determine the video-viewing mode, via which the first video-asset-viewing device outputted the segment, by causing:
determining an amount of time between when the video asset was made available for output and when the first video-asset-viewing device outputted the segment of the plurality of segments of the video asset.

13. The system of claim 9, wherein the third instructions, when executed by the one or more third processors, cause the computing device to:
group a plurality of values based on the video-viewing mode via which the first video-asset-viewing device outputted the plurality of segments and a plurality of values based on the video-viewing mode via which the second video-asset-viewing device outputted the plurality of segments with a set of values associated with the video asset; and
determine, based on the set of values, a video-viewing-activity metric for the video asset.

14. The system of claim 13, wherein the third instructions, when executed by the one or more third processors, cause the computing device to:
determine that each value in a subset of the set corresponds to one or more criteria for the video-viewing-activity metric.

15. The system of claim 14, wherein the one or more criteria comprise a viewer-demographic criterion, and wherein the third instructions, when executed by the one or more third processors, cause the computing device to determine that each value in the subset corresponds to the one or more criteria by causing determining that each value in the subset corresponds to the viewer-demographic criterion, and wherein the third instructions, when executed by the one or more third processors, cause the computing device to determine the video-viewing-activity metric by causing determining a video-viewing-activity metric for the viewer-demographic criterion.

16. The system of claim 14, wherein the one or more criteria comprise a geographic criterion, wherein the third instructions, when executed by the one or more third processors, cause the computing device to determine that each value in the subset corresponds to the one or more criteria by causing determining that each value in the subset corresponds to the geographic criterion, and wherein the third instructions, when executed by the one or more third processors, cause the computing device to determine the video-viewing-activity metric by causing determining a video-viewing-activity metric for the geographic criterion.

17. A method comprising:
    determining, by a computing system and for a segment of a plurality of segments of a video asset, a video-viewing mode via which a first video-asset-viewing device outputted the segment;
    determining, by the computing system, for the segment of the plurality of segments, and based on the video-viewing mode, a first value;
    determining, by the computing system, for the segment of the plurality of segments, and based on a video-viewing mode via which a second video-asset-viewing device outputted the segment, a second value, wherein the first value is different from the second value;
    based on determining that the video-viewing mode via which the first video-asset-viewing device outputted the segment corresponds to playback of one or more segments of the video asset, adjusting, by the computing system, a first video viewing count, associated with the segment, by the first value; and
    based on determining that the video-viewing mode via which the second video-asset-viewing device outputted the segment corresponds to recording one or more segments of the video asset, adjusting, by the computing system, a second video viewing count, associated with the segment, by the second value.

18. The method of claim 17, further comprising:
    determining, by the computing system and based on the video-viewing mode via which the second video-asset-viewing device outputted the segment, a count of a number of segments with respect to which recording was employed by the second video-asset-viewing device.

19. The method of claim 17, further comprising:
    determining, by the computing system and based on the video-viewing mode via which the first video-asset-viewing device outputted the segment, a count of a number of segments with respect to which playback was employed by the first video-asset-viewing device.

20. The method of claim 17, wherein the determining the video-viewing mode comprises determining an amount of time between when the video asset was made available for output and when the first video-asset-viewing device outputted the segment of the plurality of segments of the video asset.

21. The method of claim 17, further comprising:
    determining, by the computing system, for the segment of the plurality of segments, and based on aggregating the first value and the second value, a third video viewing count associated with the segment.

22. The method of claim 21, further comprising:
    determining, by the computing system and for the segment of the plurality of segments of the video asset, a count of a number of video-asset-viewing devices that outputted the segment of the plurality of segments of the video asset;
    wherein the third video viewing count comprises the count modified by the first value and by the second value.

23. An apparatus comprising:
    one or more processors; and
    memory storing instructions that, when executed by the one or more processors, cause the apparatus to:
        determine, for a segment of a plurality of segments of a video asset, a video-viewing mode via which a first video-asset-viewing device outputted the segment;
        determine, for the segment of the plurality of segments, and based on the video-viewing mode, a first value;
        determine, for the segment of the plurality of segments, and based on a video-viewing mode via which a second video-asset-viewing device outputted the segment, a second value, wherein the first value is different from the second value;
        based on determining that the video-viewing mode via which the first video-asset-viewing device outputted the segment corresponds to playback of one or more segments of the video asset, adjust a first video viewing count, associated with the segment, by the first value; and
        based on determining that the video-viewing mode via which the second video-asset-viewing device outputted the segment corresponds to recording one or more segments of the video asset, adjust a second video viewing count, associated with the segment, by the second value.

24. The apparatus of claim 23, wherein the instructions, when executed by the one or more processors, further cause the apparatus to:
    determine, based on the video-viewing mode via which the second video-asset-viewing device outputted the segment, a count of a number of segments with respect to which recording was employed by the second video-asset-viewing device.

25. The apparatus of claim 23, wherein the instructions, when executed by the one or more processors, further cause the apparatus to:
    determine, based on the video-viewing mode via which the first video-asset-viewing device outputted the segment, a count of a number of segments with respect to which playback was employed by the first video-asset-viewing device.

26. The apparatus of claim 23, wherein the instructions, when executed by the one or more processors, further cause the apparatus to determine the video-viewing mode, via which the first video-asset-viewing device outputted the segment, by causing determining an amount of time between when the video asset was made available for output and when the first video-asset-viewing device outputted the segment of the plurality of segments of the video asset.

27. The apparatus of claim 23, wherein the instructions, when executed by the one or more processors, further cause the apparatus to:
    determine, for the segment of the plurality of segments, and based on aggregating the first value and the second value, a third video viewing count associated with the segment.

28. The apparatus of claim 27, wherein the instructions, when executed by the one or more processors, further cause the apparatus to:
    determine, for the segment of the plurality of segments of the video asset, a count of a number of video-asset-viewing devices that outputted the segment of the plurality of segments of the video asset;
    wherein the third video viewing count comprises the count modified by the first value and by the second value.

29. A system comprising:
a first video-asset-viewing device, of a plurality of video-asset-viewing devices, comprising:
one or more first processors; and
first memory storing first instructions that, when executed by the one or more first processors, cause the first video-asset-viewing device to output a segment, of a plurality of segments, of a video asset;
a second video-asset-viewing device, of the plurality of video-asset-viewing devices, comprising:
one or more second processors; and
second memory storing second instructions that, when executed by the one or more second processors, cause the second video-asset-viewing device to output the segment, of the plurality of segments, of the video asset; and
a computing device comprising:
one or more third processors; and
third memory storing third instructions that, when executed by the one or more third processors, cause the computing device to:
determine, for the segment of the plurality of segments of the video asset, a video-viewing mode via which the first video-asset-viewing device outputted the segment;
determine, for the segment of the plurality of segments, and based on the video-viewing mode, a first value;
determine, for the segment of the plurality of segments, and based on a video-viewing mode via which the second video-asset-viewing device outputted the segment, a second value, wherein the first value is different from the second value;
based on determining that the video-viewing mode via which the first video-asset-viewing device outputted the segment corresponds to playback of one or more segments of the video asset, adjust a first video viewing count, associated with the segment, by the first value; and
based on determining that the video-viewing mode via which the second video-asset-viewing device outputted the segment corresponds to recording one or more segments of the video asset, adjust a second video viewing count, associated with the segment, by the second value.

30. The system of claim 29, wherein the third instructions, when executed by the one or more third processors, cause the computing device to:
determine, based on the video-viewing mode via which the second video-asset-viewing device outputted the segment, a count of a number of segments with respect to which recording was employed by the second video-asset-viewing device.

31. The system of claim 29, wherein the third instructions, when executed by the one or more third processors, cause the computing device to:
determine, based on the video-viewing mode via which the first video-asset-viewing device outputted the segment, a count of a number of segments with respect to which playback was employed by the first video-asset-viewing device.

32. The system of claim 29, wherein the third instructions, when executed by the one or more third processors, cause the computing device to determine the video-viewing mode, via which the first video-asset-viewing device outputted the segment, by causing determining an amount of time between when the video asset was made available for output and when the first video-asset-viewing device outputted the segment of the plurality of segments of the video asset.

33. The system of claim 29, wherein the third instructions, when executed by the one or more third processors, cause the computing device to:
determine, for the segment of the plurality of segments, and based on aggregating the first value and the second value, a third video viewing count associated with the segment.

34. The system of claim 33, wherein the third instructions, when executed by the one or more third processors, cause the computing device to:
determine, for the segment of the plurality of segments of the video asset, a count of a number of video-asset-viewing devices that outputted the segment of the plurality of segments of the video asset;
wherein the third video viewing count comprises the count modified by the first value and by the second value.

35. A method comprising:
determining, by a computing system and for a segment of a plurality of segments of a video asset, a video-viewing mode via which a first video-asset-viewing device outputted the segment;
determining, by the computing system, for the segment of the plurality of segments, and based on the video-viewing mode, a first value;
determining, by the computing system, for the segment of the plurality of segments, and based on a video-viewing mode via which a second video-asset-viewing device outputted the segment, a second value, wherein the first value is different from the second value;
based on determining that the video-viewing mode via which the first video-asset-viewing device outputted the segment corresponds to playback of one or more segments of the video asset, adjusting, by the computing system, a first video viewing count, associated with the segment, by the first value; and
based on determining that the video-viewing mode via which the second video-asset-viewing device outputted the segment corresponds to pausing one or more segments of the video asset, adjusting, by the computing system, a second video viewing count, associated with the segment, by the second value.

36. The method of claim 35, further comprising:
determining, by the computing system and based on the video-viewing mode via which the first video-asset-viewing device outputted the segment, a count of a number of segments with respect to which playback was employed by the first video-asset-viewing device.

37. The method of claim 35, wherein the determining the video-viewing mode comprises determining an amount of time between when the video asset was made available for output and when the first video-asset-viewing device outputted the segment of the plurality of segments of the video asset.

38. The method of claim 35, wherein the determining the video-viewing mode comprises determining the video-viewing mode via which the first video-asset-viewing device outputted the segment during a first viewing event, the method further comprising:
determining a second video-viewing mode via which the first video-asset-viewing device outputted the segment during a second viewing event; and
adjusting, based on the second video-viewing mode, the first value.

39. The method of claim 35, further comprising:
determining, by the computing system, for the segment of the plurality of segments, and based on aggregating the first value and the second value, a third video viewing count associated with the segment.

40. The method of claim 35, wherein the determining the first value comprises determining a speed at which the first video-asset-viewing device outputted the segment of the plurality of segments of the video asset.

41. An apparatus comprising:
one or more processors; and
memory storing instructions that, when executed by the one or more processors, cause the apparatus to:
determine, for a segment of a plurality of segments of a video asset, a video-viewing mode via which a first video-asset-viewing device outputted the segment;
determine, for the segment of the plurality of segments, and based on the video-viewing mode, a first value;
determine, for the segment of the plurality of segments, and based on a video-viewing mode via which a second video-asset-viewing device outputted the segment, a second value, wherein the first value is different from the second value;
based on determining that the video-viewing mode via which the first video-asset-viewing device outputted the segment corresponds to playback of one or more segments of the video asset, adjust a first video viewing count, associated with the segment, by the first value; and
based on determining that the video-viewing mode via which the second video-asset-viewing device outputted the segment corresponds to pausing one or more segments of the video asset, adjust a second video viewing count, associated with the segment, by the second value.

42. The apparatus of claim 41, wherein the instructions, when executed by the one or more processors, further cause the apparatus to:
determine, based on the video-viewing mode via which the first video-asset-viewing device outputted the segment, a count of a number of segments with respect to which playback was employed by the first video-asset-viewing device.

43. The apparatus of claim 41, wherein the instructions, when executed by the one or more processors, further cause the apparatus to determine the video-viewing mode, via which the first video-asset-viewing device outputted the segment, by causing determining an amount of time between when the video asset was made available for output and when the first video-asset-viewing device outputted the segment of the plurality of segments of the video asset.

44. The apparatus of claim 41, wherein the instructions, when executed by the one or more processors, further cause the apparatus to determine the video-viewing mode, via which the first video-asset-viewing device outputted the segment, by causing determining the video-viewing mode via which the first video-asset-viewing device outputted the segment during a first viewing event, and wherein the instructions, when executed by the one or more processors, further cause the apparatus to:
determine a second video-viewing mode via which the first video-asset-viewing device outputted the segment during a second viewing event; and
adjust, based on the second video-viewing mode, the first value.

45. The apparatus of claim 41, wherein the instructions, when executed by the one or more processors, further cause the apparatus to:
determine, for the segment of the plurality of segments, and based on aggregating the first value and the second value, a third video viewing count associated with the segment.

46. The apparatus of claim 41, wherein the instructions, when executed by the one or more processors, further cause the apparatus to determine the first value by causing determining a speed at which the first video-asset-viewing device outputted the segment of the plurality of segments of the video asset.

47. A system comprising:
a first video-asset-viewing device, of a plurality of video-asset-viewing devices, comprising:
one or more first processors; and
first memory storing first instructions that, when executed by the one or more first processors, cause the first video-asset-viewing device to output a segment, of a plurality of segments, of a video asset;
a second video-asset-viewing device, of the plurality of video-asset-viewing devices, comprising:
one or more second processors; and
second memory storing second instructions that, when executed by the one or more second processors, cause the second video-asset-viewing device to output the segment, of the plurality of segments, of the video asset; and
a computing device comprising:
one or more third processors; and
third memory storing third instructions that, when executed by the one or more third processors, cause the computing device to:
determine, for the segment of the plurality of segments of the video asset, a video-viewing mode via which the first video-asset-viewing device outputted the segment;
determine, for the segment of the plurality of segments, and based on the video-viewing mode, a first value;
determine, for the segment of the plurality of segments, and based on a video-viewing mode via which the second video-asset-viewing device outputted the segment, a second value, wherein the first value is different from the second value;
based on determining that the video-viewing mode via which the first video-asset-viewing device outputted the segment corresponds to playback of one or more segments of the video asset, adjust a first video viewing count, associated with the segment, by the first value; and
based on determining that the video-viewing mode via which the second video-asset-viewing device outputted the segment corresponds to pausing one or more segments of the video asset, adjust a second video viewing count, associated with the segment, by the second value.

48. The system of claim 47, wherein the third instructions, when executed by the one or more third processors, cause the computing device to:
   determine, based on the video-viewing mode via which the first video-asset-viewing device outputted the segment, a count of a number of segments with respect to which playback was employed by the first video-asset-viewing device.

49. The system of claim 47, wherein the third instructions, when executed by the one or more third processors, cause the computing device to determine the video-viewing mode, via which the first video-asset-viewing device outputted the segment, by causing determining an amount of time between when the video asset was made available for output and when the first video-asset-viewing device outputted the segment of the plurality of segments of the video asset.

50. The system of claim 47, wherein the third instructions, when executed by the one or more third processors, cause the computing device to determine the video-viewing mode, via which the first video-asset-viewing device outputted the segment, by causing determining the video-viewing mode via which the first video-asset-viewing device outputted the segment during a first viewing event, and wherein the third instructions, when executed by the one or more third processors, cause the computing device to:
   determine a second video-viewing mode via which the first video-asset-viewing device outputted the segment during a second viewing event; and
   adjust, based on the second video-viewing mode, the first value.

51. The system of claim 47, wherein the third instructions, when executed by the one or more third processors, cause the computing device to:
   determine, for the segment of the plurality of segments, and based on aggregating the first value and the second value, a third video viewing count associated with the segment.

52. The system of claim 47, wherein the third instructions, when executed by the one or more third processors, cause the computing device to determine the first value by causing determining a speed at which the first video-asset-viewing device outputted the segment of the plurality of segments of the video asset.

* * * * *

UNITED STATES PATENT AND TRADEMARK OFFICE
CERTIFICATE OF CORRECTION

Page 1 of 2

PATENT NO. : 11,671,638 B2
APPLICATION NO. : 17/532563
DATED : June 6, 2023
INVENTOR(S) : Orlowski It is certified that error appears in the above-identified patent and that said Letters Patent is hereby corrected as shown below:

In the Drawings

Sheet 1 of 83, Fig. 1, Reference Numeral 9204, Line 4:
Delete "video video" and insert --video-- therefor Sheet 76 of 83, Fig. 38 - Continued, Line 4:
Delete "the the" and insert --the-- therefor In the Specification Column 11, Summary, Line 24:
After "messages", insert --,-- therefor Column 20, Detailed Description of the Drawings, Line 32:
Delete "video video" and insert --video-- therefor Column 24, Detailed Description of the Drawings, Line 6:
Delete "the the" and insert --the-- therefor Column 24, Detailed Description of the Drawings, Line 24:
Delete "160." and insert --270.-- therefor Column 26, Detailed Description of the Drawings, Line 39:
Delete "the the" and insert --the-- therefor Column 27, Detailed Description of the Drawings, Line 50:
Delete "the the" and insert --the-- therefor Column 28, Detailed Description of the Drawings, Line 46:
Delete "the the" and insert --the-- therefor Signed and Sealed this
Twenty-seventh Day of August, 2024

Katherine Kelly Vidal
*Director of the United States Patent and Trademark Office*

CERTIFICATE OF CORRECTION (continued)
U.S. Pat. No. 11,671,638 B2

Column 34, Detailed Description of the Drawings, Line 48:
Delete "video video" and insert --video-- therefor Column 45, Detailed Description of the Drawings, Line 1:
Delete "done Done" and insert --done-- therefor Column 50, Detailed Description of the Drawings, Line 13:
Delete "160" and insert --270-- therefor Column 50, Detailed Description of the Drawings, Line 19:
Delete "data data" and insert --data-- therefor In the Claims Column 56, Line 10, in Claim 1:
Delete "determining" and insert --determine--

Column 56, Line 13, in Claim 1:
Delete "determining" and insert --determine--